US011379691B2

(12) United States Patent
Ghosh et al.

(10) Patent No.: US 11,379,691 B2
(45) Date of Patent: Jul. 5, 2022

(54) BURDEN SCORE FOR AN OPAQUE MODEL

(71) Applicant: Cognitive Scale, Inc., Austin, TX (US)

(72) Inventors: Joydeep Ghosh, Austin, TX (US);
Jessica Henderson, Austin, TX (US);
Matthew Sanchez, Austin, TX (US)

(73) Assignee: Cognitive Scale, Inc., Austin, TX (US)

( * ) Notice: Subject to any disclaimer, the term of this patent is extended or adjusted under 35 U.S.C. 154(b) by 523 days.

(21) Appl. No.: 16/663,617

(22) Filed: Oct. 25, 2019

(65) Prior Publication Data
US 2020/0293839 A1 Sep. 17, 2020

Related U.S. Application Data

(60) Provisional application No. 62/838,831, filed on Apr. 25, 2019, provisional application No. 62/819,092, filed on Mar. 15, 2019.

(51) Int. Cl.
*G06V 10/774* (2022.01)
*G06K 9/62* (2022.01)
(Continued)

(52) U.S. Cl.
CPC ....... *G06K 9/6257* (2013.01); *G06F 16/9535* (2019.01); *G06K 9/6215* (2013.01);
(Continued)

(58) Field of Classification Search
None
See application file for complete search history.

(56) References Cited

U.S. PATENT DOCUMENTS 7,814,367 B1 10/2010 Squibb et al.
8,798,363 B2 8/2014 Bhardwaj et al.
(Continued)

OTHER PUBLICATIONS

Hendricks et al., Generating Counterfactual Explanations with Natural Language, (pp. 1-4) (Year: 2018).
(Continued)

*Primary Examiner* — Anand P Bhatnagar
(74) *Attorney, Agent, or Firm* — Terrile, Cannatti & Chambers; Stephen A. Terrile

(57) ABSTRACT

A method, system and computer-readable storage medium for performing a cognitive information processing operation. The cognitive information processing operation includes: receiving data from a plurality of data sources; processing the data from the plurality of data sources to provide cognitively processed insights via an augmented intelligence system, the augmented intelligence system executing on a hardware processor of an information processing system, the augmented intelligence system and the information processing system providing a cognitive computing function; performing an impartiality assessment operation via an impartiality assessment engine, the impartiality assessment operation detecting a presence of bias in an outcome of the cognitive computing function, the impartiality assessment operation generating a burden score representing the presence of bias in the outcome; and, providing the cognitively processed insights to a destination, the destination comprising a cognitive application, the cognitive application enabling a user to interact with the cognitive insights.

18 Claims, 29 Drawing Sheets

(51) Int. Cl.
*G06N 20/00* (2019.01)
*G06N 5/04* (2006.01)
*G06N 5/02* (2006.01)
*G06F 16/9535* (2019.01)
*G06N 99/00* (2019.01)
*G06Q 10/10* (2012.01)
*G06T 19/00* (2011.01)
*H04L 67/00* (2022.01)
*G06V 10/75* (2022.01)

(52) U.S. Cl.
CPC ......... *G06K 9/6229* (2013.01); *G06K 9/6234* (2013.01); *G06K 9/6264* (2013.01); *G06K 9/6267* (2013.01); *G06K 9/6276* (2013.01); *G06K 9/6298* (2013.01); *G06N 5/02* (2013.01); *G06N 5/04* (2013.01); *G06N 5/043* (2013.01); *G06N 5/045* (2013.01); *G06N 20/00* (2019.01); *G06N 99/007* (2013.01); *G06Q 10/10* (2013.01); *G06T 19/006* (2013.01); *G06V 10/757* (2022.01); *H04L 67/34* (2013.01)

(56) References Cited

U.S. PATENT DOCUMENTS

| | | | |
|---|---|---|---|
| 8,855,427 B2 | 10/2014 | Yates et al. | |
| 9,015,093 B1 * | 4/2015 | Commons | B60W 30/00 706/26 |
| 9,213,991 B2 | 12/2015 | Bhardwaj et al. | |
| 9,489,635 B1 | 11/2016 | Zhu | |
| 9,613,296 B1 | 4/2017 | Rosen et al. | |
| 9,741,170 B2 | 8/2017 | Park et al. | |
| 9,875,440 B1 * | 1/2018 | Commons | G01C 21/3602 |
| 10,458,809 B2 | 10/2019 | Flores et al. | |
| 10,743,068 B2 | 8/2020 | Cruz Huertas et al. | |
| 10,891,445 B2 | 1/2021 | Starks et al. | |
| 10,909,606 B2 | 2/2021 | DeLuca et al. | |
| 10,984,644 B1 * | 4/2021 | Alsahlawi | G08B 25/10 |
| 11,295,251 B2 | 4/2022 | Chang et al. | |
| 11,315,024 B2 * | 4/2022 | Gil Bulacio | H04L 63/16 |
| 2003/0120681 A1 | 6/2003 | Baclawski | |
| 2003/0216919 A1 | 11/2003 | Roushar | |
| 2005/0240424 A1 | 10/2005 | Lin et al. | |
| 2005/0250082 A1 | 11/2005 | Baldwin et al. | |
| 2007/0172099 A1 | 7/2007 | Park et al. | |
| 2007/0185801 A1 | 8/2007 | Harrison et al. | |
| 2010/0250196 A1 | 9/2010 | Lawler et al. | |
| 2010/0290700 A1 | 11/2010 | Yokono | |
| 2011/0085728 A1 | 4/2011 | Gao et al. | |
| 2011/0258049 A1 | 10/2011 | Ramer et al. | |
| 2014/0081652 A1 | 3/2014 | Klindworth | |
| 2014/0188362 A1 | 7/2014 | Zadeh | |
| 2014/0293069 A1 | 10/2014 | Lazar et al. | |
| 2014/0344013 A1 | 11/2014 | Karty et al. | |
| 2014/0376823 A1 | 12/2014 | Cui et al. | |
| 2015/0139536 A1 | 5/2015 | Jin et al. | |
| 2015/0294216 A1 | 10/2015 | Baughman et al. | |
| 2015/0324459 A1 | 11/2015 | Chhichhia et al. | |
| 2016/0098621 A1 | 4/2016 | Tahmasebi Maraghoosh et al. | |
| 2016/0285999 A1 | 9/2016 | Koonce et al. | |
| 2017/0017760 A1 | 1/2017 | Freese et al. | |
| 2017/0234694 A1 | 8/2017 | Flores et al. | |
| 2018/0165598 A1 | 6/2018 | Saxena et al. | |
| 2018/0293103 A1 | 10/2018 | Kalmus et al. | |
| 2019/0303867 A1 | 10/2019 | Nair | |
| 2019/0362430 A1 | 11/2019 | Jass | |
| 2019/0385212 A1 | 12/2019 | DeLuca et al. | |
| 2020/0092608 A1 | 3/2020 | Cruz Huertas et al. | |
| 2020/0118029 A1 * | 4/2020 | DeBraal | G06N 20/20 |
| 2020/0151651 A1 | 5/2020 | Chang et al. | |
| 2020/0234605 A1 * | 7/2020 | Shuart | G06F 21/316 |
| 2020/0265356 A1 | 8/2020 | Lee et al. | |
| 2020/0279023 A1 | 9/2020 | Starks et al. | |
| 2020/0293827 A1 * | 9/2020 | Ghosh | G06T 19/006 |
| 2020/0293919 A1 * | 9/2020 | Ghosh | G06N 3/126 |
| 2020/0293933 A1 * | 9/2020 | Ghosh | G06Q 10/10 |
| 2021/0089895 A1 | 3/2021 | Munoz Delgado | |
| 2021/0169417 A1 * | 6/2021 | Burton | A61B 5/4857 |
| 2021/0176601 A1 * | 6/2021 | Alsahlawi | G06Q 50/08 |
| 2021/0232621 A1 | 7/2021 | Jain et al. | |
| 2021/0390606 A1 | 12/2021 | Moosaei et al. | |
| 2022/0001238 A1 * | 1/2022 | Kwatra | G06F 3/011 |
| 2022/0130143 A1 | 4/2022 | Rodriguez Lopez et al. | |

OTHER PUBLICATIONS

Neal et al., Open Set Learning with Counterfactual Images, (pp. 1-16) (Year: 2018).

Haigh et al., Can Artificial Intelligence meet the Cognitive Networking Challenge?, EURASIP Journal on Wireless Communications and Networking, Special Issue on 2011, pp. 1-11.

Kopcke, Hanna et al., Frameworks for Entity Matching: A Comparison, Data & Knowledge Engineering 69.2 (2010), pp. 197-210.

Gubbi, Jayavardhana et al., Internet of Things (IoT): A Vision, Architectural Elements, and Future Directions, Future Generation Computer Systems 29.7 (2013), pp. 1645-1660.

Wu et al, Towards a Cloud-Based Design and Manufacturing Paradigm: Looking Backward, Looking Forward, ASME 2012 International Design Engineering Technical Conferences and Computers and Information in Engineering Conference, American Society of Mechanical Engineers, 2012.

Adler et al., Auditing Black-box Models by Obscuring Features, arXiv: 1602.07043v1, Feb. 23, 2016, 16 pages.

\* cited by examiner

Cognitive Process Foundation 310

Augmented Intelligence System (AIS) Composition Platform 120

AIS Composition UI 522

| Cognitive Skill Composition Platform 122 | Cognitive Agent Composition Platform (UI 522) 124 |
|---|---|
| Skill Composition 530<br>• Develop, Test, And Define Cognitive Skills<br>• Develop Cognitive Model Algorithm<br>• Define Cognitive Model Actions<br>• Identify Data Sources<br>• Define Required Datasets | Agent Composition 532<br>• Develop Datasets<br>• Curate And Upload Training Data<br>• Create Agent Record<br>• Add And Configure Cognitive Skills<br>• Define Input/Output Services<br>• Define Dataset Connections<br>• Create Cognitive Agent Data Flow<br>• Map Agent Data Flow<br>• Test Agent Services |
| Skill Client Library 540 | Agent Client Library 542 |
| Skill API 550 | Agent API 552 |

Cognitive Process Orchestration Platform 126

| AIS Admin Console 524 | AIS CLI 526 |
|---|---|
| Data Orchestration 534<br>• Define Data Sources In Each Region<br>• Define Data Variables In Each Region | |
| Cognitive Agent Orchestration 536<br>• Create Cognitive Agent Snapshot<br>• Promote Cognitive Agent Snapshot<br>• Create Cognitive Agent Instance<br>• Enable Start Triggers<br>• Invoke Instance<br>• Query And Filter The Response | |
| Console Client Library 544 | CLI Client Library 546 |
| Console API 554 | CLI API 556 |

*Figure 5*

| Patient Profile 1402 | |
|---|---|
| Patient ID: Subject Patient 1404 | |
| Predicted Diagnosis: Diabetic 1406 | |
| Patient Attribute 1408 | Result 1410 |
| Age 1412 | 33 |
| Pregnancies 1414 | 0 |
| Skin Thickness 1416 | 35 |
| Glucose 1418 | 137 |
| Blood Pressure 1420 | 120/80 |
| Insulin 1422 | 168 |
| BMI 1424 | 30.1 |

1428 Non-Modifiable Diabetes Factors: Age, Pregnancies, Skin Thickness

1430 Modifiable Diabetes Factors: Glucose, Blood Pressure, Insulin, BMI

| Counterfactual Patient Profile 1432 | |
|---|---|
| Patient ID: Subject Patient 1404 | |
| Predicted Diagnosis: Non-Diabetic 1436 | |
| Patient Attribute 1408 | Result 1434 |
| Age 1412 | 33 |
| Pregnancies 1414 | 0 |
| Skin Thickness 1416 | 35 |
| Glucose 1418 | 88 |
| Blood Pressure 1420 | 120/80 |
| Insulin 1422 | 168 |
| BMI 1424 | 29.3 |

1440 Most Optimal Diabetes Counterfactual
1438 Less Optimal Diabetes Counterfactual

BURDEN SCORE FOR AN OPAQUE MODEL

BACKGROUND OF THE INVENTION

Field of the Invention

The present invention relates in general to the field of computers and similar technologies, and in particular to software utilized in this field. Still more particularly, it relates to a method, system and computer-usable medium for providing augmented intelligence system (AIS) assurance.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent of companies such as Facebook. An example of data that is being collected, but may be difficult to access at the right time and place, includes the side effects of certain spider bites while an affected individual is on a camping trip. As another example, data that is collected and available, but has not yet been productized or fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

A method, system and computer-usable medium are disclosed for performing cognitive inference and learning operations.

In one embodiment, the invention relates to a method for performing a cognitive information processing operation, the method comprising: receiving data from a plurality of data sources; processing the data from the plurality of data sources to provide cognitively processed insights via an augmented intelligence system, the augmented intelligence system executing on a hardware processor of an information processing system, the augmented intelligence system and the information processing system providing a cognitive computing function; performing an impartiality assessment operation via an impartiality assessment engine, the impartiality assessment operation detecting a presence of bias in an outcome of the cognitive computing function, the impartiality assessment operation generating a burden score representing the presence of bias in the outcome; and, providing the cognitively processed insights to a destination, the destination comprising a cognitive application, the cognitive application enabling a user to interact with the cognitive insights.

In another embodiment, the invention relates to a system comprising: a hardware processor; a data bus coupled to the hardware processor; and a non-transitory, computer-readable storage medium embodying computer program code, the non-transitory, computer-readable storage medium being coupled to the data bus, the computer program code interacting with a plurality of computer operations and comprising instructions executable by the hardware processor and configured for: receiving data from a plurality of data sources; processing the data from the plurality of data sources to provide cognitively processed insights via an augmented intelligence system, the augmented intelligence system executing on a hardware processor of an information processing system, the augmented intelligence system and the information processing system providing a cognitive computing function; performing an impartiality assessment operation via an impartiality assessment engine, the impartiality assessment operation detecting a presence of bias in an outcome of the cognitive computing function, the impartiality assessment operation generating a burden score representing the presence of bias in the outcome; and, providing the cognitively processed insights to a destination, the destination comprising a cognitive application, the cognitive application enabling a user to interact with the cognitive insights.

In another embodiment, the invention relates to a non-transitory, computer-readable storage medium embodying computer program code, the computer program code comprising computer executable instructions configured for: receiving data from a plurality of data sources; processing the data from the plurality of data sources to provide cognitively processed insights via an augmented intelligence system, the augmented intelligence system executing on a hardware processor of an information processing system, the augmented intelligence system and the information processing system providing a cognitive computing function; performing an impartiality assessment operation via an impartiality assessment engine, the impartiality assessment operation detecting a presence of bias in an outcome of the cognitive computing function, the impartiality assessment operation generating a burden score representing the presence of bias in the outcome; and, providing the cognitively processed insights to a destination, the destination comprising a cognitive application, the cognitive application enabling a user to interact with the cognitive insights.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows a simplified block diagram of components associated with a cognitive process foundation;

FIG. 14 shows a chart of input data points used to generate counterfactuals;

DETAILED DESCRIPTION

Figure 1:
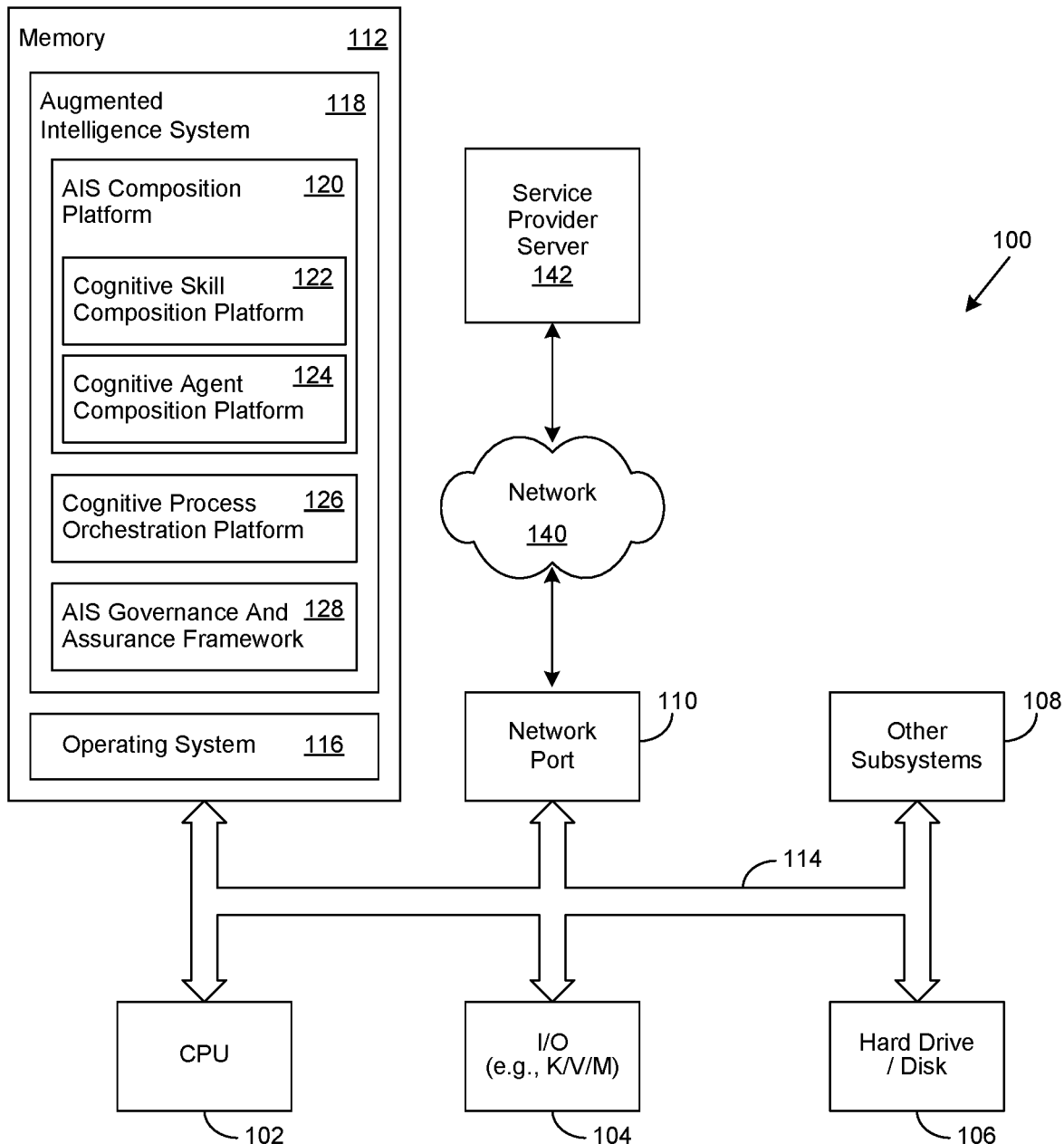
FIG. 1 depicts an exemplary client computer in which the present invention may be implemented.

A method, system and computer-usable medium are disclosed for providing augmented intelligence system (AIS) assurance. Certain aspects of the invention reflect an appreciation that augmented intelligence is not technically different from what is generally regarded as general artificial intelligence (AI). However, certain aspects of the invention likewise reflect an appreciation that typical implementations of augmented intelligence are more oriented towards complementing, or reinforcing, the role human intelligence plays when discovering relationships and solving problems. Likewise, various aspects of the invention reflect an appreciation that certain advances in general AI approaches may provide different perspectives on how computers and software can participate in tasks that have previously been thought of being exclusive to humans.

Certain aspects of the invention reflect an appreciation that processes and applications employing AI models have become common in recent years. However, certain aspects of the invention likewise reflect an appreciation that known approaches to building, deploying, and maintaining such processes, applications and models at significant scale can be challenging. More particularly, various technical hurdles can prevent operational success in AI application development and deployment. As an example, empowering development teams to more easily develop AI systems and manage their end-to-end lifecycle can prove challenging.

Accordingly, certain aspects of the invention may reflect an appreciation that the ability to orchestrate a pipeline of AI components not only facilitates chained deployment of an AI system, but will likely reduce implementation intervals while simultaneously optimizing the use of human and computing resources. Likewise, certain aspects of the invention reflect an appreciation that achieving consistency across AI implementations may be facilitated by easily sharing machine learning (ML) models within the context of a standardized application modeling and execution language. In particular, such an approach may be advantageous when it is agnostic to common application development platforms and database conventions.

Certain aspects of the invention likewise reflect an appreciation that the development of ML models is often a small, but important part of the AI development process. However, getting ML models developed by data scientists and then putting them into production requires time and resources, both of which may be limited. Likewise, certain aspects of the invention reflect that AI systems are generally complex. Accordingly, a repeatable approach that reduces the skill required to develop and deploy AI systems can assist in achieving scalability of AI initiatives.

Likewise, certain aspects of the invention reflect an appreciation that AI, and the ML models they employ, has begun to play an increasingly important role in our society. Certain aspects of the invention likewise reflect an appreciation that a number of questions arise from the use of ML models and the consequences of the decisions they make. For example, how did the model arrive at its outcome? If an individual receives an unfavorable outcome from the model, what is their recourse? Is there something in their personal lives that can be changed to result in a different outcome? Likewise, has the model been unfair to a particular group? How easily can the model be deceived?

Accordingly, certain aspects of the invention likewise reflect there are ethical, moral, and social obligations for researchers, developers, and organizations alike to ensure their ML models are designed, implemented, and maintained responsibly. Various aspects of the invention likewise reflect an appreciation that one approach to achieving responsible design, implementation, and maintenance of ML models is to provide auditability of their fairness, robustness, transparency, and interpretability.

Certain aspects of the invention likewise reflect an appreciation that known approaches to providing such auditability can prove to be cumbersome, time-consuming, and at times, error-prone, especially when the internal design particulars of an ML model are unknown. Furthermore, certain aspects of the invention likewise reflect an appreciation that known approaches to ML model auditability typically focus on issues individually, not in a unified manner. Moreover, such approaches likewise lack the ability to audit an ML model acting as a black box, whose internal design particulars are unknown.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In certain embodiments, the information processing system 100 may also include a network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in certain embodiments may also comprise an augmented intelligence system (AIS) 118. In these and other embodiments, the AIS 118 may likewise comprise a cognitive agent composition platform 120, a cognitive process orchestration platform 126, and an AIS governance and assurance framework 128. In certain embodiments, the cognitive agent composition platform 120 may include a cognitive skill composition platform 122. In certain embodiments, the information processing system 100 may be implemented to download the AIS 118 from the service provider server 142. In another embodiment, the functionality of the AIS 118 may be provided as a service from the service provider server 142.

In certain embodiments, the AIS governance and assurance framework 128 may be implemented to perform an AIS assurance operation, described in greater detail herein. In certain embodiments, the AIS assurance operation may include the performance of an AIS impartiality assessment operation, an AIS robustness assessment operation, an AIS explainability operation, an AIS explainability with recourse operation, or a combination thereof, as likewise described in greater detail herein. In certain embodiments, the AIS assurance operation may be performed on a service provider server 142. In certain embodiments, performance of the AIS assurance operation may be provided as an AIS assurance service. In certain embodiments, the AIS assurance service may be referred to as AIS Trust as a Service (TaaS).

In certain embodiments, the AIS 118 may be implemented to perform various cognitive computing operations. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-interpretation, insight-extracting, problem-solving, recommendation-making systems that have more in common with the structure of the human brain than with the architecture of contemporary, instruction-driven computers.

To further differentiate these distinctions, traditional computers must first be programmed by humans to perform specific tasks, while cognitive computing systems learn from their interactions with data and humans alike, and in a sense, program themselves to perform new tasks. To summarize the difference between the two, traditional computers are designed to calculate rapidly. In contrast, cognitive computing systems are designed to quickly draw inferences from data and gain new knowledge.

Cognitive computing systems achieve these abilities by combining various aspects of artificial intelligence, natural language processing, dynamic learning, and hypothesis generation to render vast quantities of intelligible data to assist humans in making better decisions. As such, cognitive computing systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive processes.

As used herein, a cognitive process broadly refers to an instantiation of one or more associated cognitive computing operations, described in greater detail herein. In certain embodiments, a cognitive process may be implemented as a cloud-based, big data interpretive process that learns from user engagement and data interactions. In certain embodiments, such cognitive processes may be implemented to extract patterns and insights from dark data sources that are currently almost completely opaque. Examples of dark data include disease insights from population-wide healthcare records and social media feeds, or from new sources of information, such as sensors monitoring pollution in delicate marine environments.

In certain embodiments, a cognitive process may be implemented to include a cognitive application. As used herein, a cognitive application broadly refers to a software application that incorporates one or more cognitive processes. In certain embodiments, a cognitive application may be implemented to incorporate one or more cognitive processes with other functionalities, as described in greater detail herein.

Over time, it is anticipated that cognitive processes and applications will fundamentally change the ways in which many organizations operate as they invert current issues associated with data volume and variety to enable a smart, interactive data supply chain. Ultimately, cognitive processes and applications hold the promise of receiving a user query and immediately providing a data-driven answer from a masked data supply chain in response. As they evolve, it is likewise anticipated that cognitive processes and applications may enable a new class of "sixth sense" processes and applications that intelligently detect and learn from relevant data and events to offer insights, predictions and advice rather than wait for commands. Just as web and mobile applications have changed the way people access data, cognitive processes and applications may change the way people consume, and become empowered by, multi-structured data such as emails, social media feeds, doctors' notes, transaction records, and call logs.

However, the evolution of such cognitive processes and applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
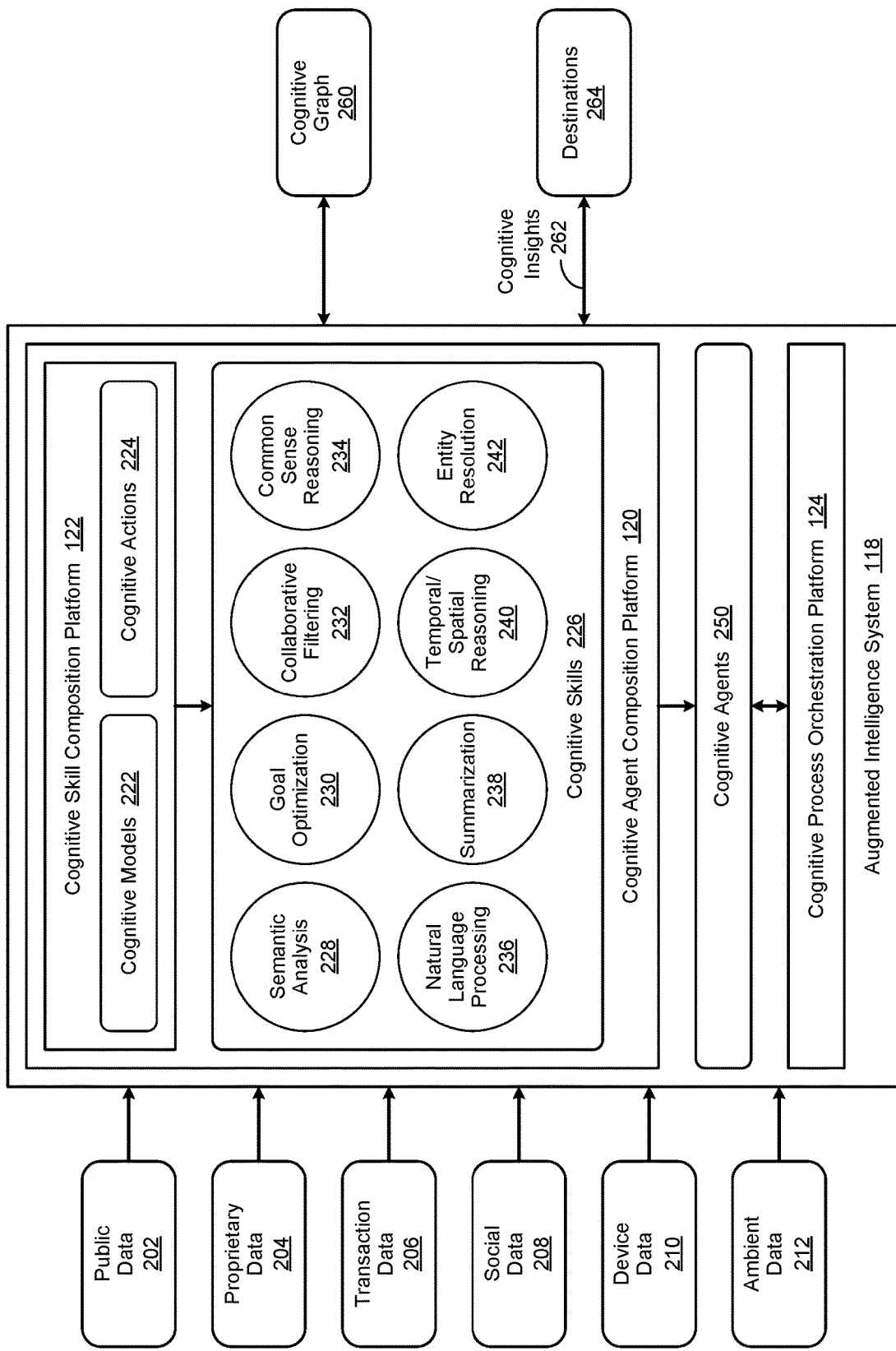
FIG. 2 is a simplified block diagram of an augmented intelligence system (AIS)

FIG. 2 is a simplified block diagram of an augmented intelligence system (AIS) implemented in accordance with an embodiment of the invention. As used herein, augmented intelligence broadly refers to an alternative conceptualization of general artificial intelligence (AI) oriented to the use of AI in an assistive role, with an emphasis on the implementation of cognitive computing, described in greater detail herein, to enhance human intelligence rather than replace it. In certain embodiments, an AIS 118 may be implemented to include a cognitive agent composition platform 120 and a cognitive process orchestration platform 126.

In certain embodiments, the cognitive agent composition platform 120 may be implemented to compose cognitive agents 250, which are in turn orchestrated by the cognitive process orchestration platform 126 to generate one or more cognitive insights 262, likewise described in greater detail herein. As used herein, a cognitive agent 250 broadly refers to a computer program that performs a task with minimal guidance from users and learns from each interaction with data and human users. As used herein, as it relates to a cognitive agent 250 performing a particular task, minimal guidance broadly refers to the provision of non-specific guidelines, parameters, objectives, constraints, procedures, or goals, or a combination thereof, for the task by a user. For example, a user may provide specific guidance to a cognitive agent 250 by asking, "How much would I have to improve my body mass index (BMI) to lower my blood pressure by twenty percent?" Conversely, a user may provide minimal guidance to the cognitive agent 250 by asking, "Given the information in my current health profile, what effect would improving my BMI have on my overall health?

In certain embodiments, one or more cognitive agents 250 may be implemented as deployable modules that aggregate the logic, data and models required to implement an augmented intelligence operation. In certain embodiments, a particular cognitive agent 250 may be implemented to be triggered by other cognitive agents 250, timers, or by external requests. In certain embodiments, a cognitive agent 250 may be composed from other cognitive agents 250 to create new functionalities. In certain embodiments, a cognitive agent 250 may be implemented to expose its functionality through a web service, which can be used to integrate it into a cognitive process or application, described in greater detail herein. In certain embodiments, cognitive agents 250 may be implemented to ingest various data, such as public 202, proprietary 204, transaction, social 208, device 210, and ambient 212 data, to provide a cognitive insight 262 or make a recommendation.

In certain embodiments, the cognitive agent composition platform 120 may be implemented to use cognitive skills 226, input/output services, datasets, and data flows, or a combination thereof, to compose a cognitive agent 250. In certain embodiments, a cognitive agent 250 may be implemented with an integration layer. In certain embodiments, the integration layer may be implemented to provide data to a particular cognitive agent 250 from a various data sources, services, such as a web service, other cognitive agents 250, or a combination thereof. In certain embodiments, the integration layer may be implemented to provide a user interface (UI) to a cognitive agent 250. In certain embodiments, the UI may include a web interface, a mobile device interface, or stationary device interface.

In certain embodiments, the cognitive agent composition platform 120 may be implemented to include a cognitive skill composition platform 122. In certain embodiments, the cognitive skill composition platform 122 may be implemented to compose a cognitive skill 226. As used herein, a cognitive skill 226 broadly refers to the smallest distinct unit of functionality in a cognitive agent 250 that can be invoked by one or more inputs to produce one or more outputs.

In certain embodiments, a cognitive skill 226 may be implemented to execute an atomic unit of work, which can be triggered by one or more inputs to produce one or more outputs. In certain embodiments, the inputs and outputs may include services, managed content, database connections, and so forth. In certain embodiments, cognitive skills 226 may be implemented to be connected via input/output units, or synapses, which control the flow of data through an associated cognitive agent 250.

In certain embodiments, one or more cognitive skills 226 may be implemented to provide various disjointed functionalities in a cognitive agent 250. In certain embodiments, such functionalities may include ingesting, enriching, and storing data from a data stream, training and testing a machine learning (ML) algorithm to generate an ML model, and loading data from an external source, such as a file. In certain embodiments, such functionalities may likewise include transforming the raw data into a dataset for further processing, extracting features from a dataset, or invoking various services, such as web services familiar to those of skill in the art.

As used herein, a cognitive model 222 broadly refers to a machine learning model that serves as a mathematical representation of a real-world process that can be facilitated by a cognitive computing operation. In certain embodiments, the cognitive skill composition platform 122 may be implemented to compose a cognitive skill 226 from one or more cognitive models 222. In certain embodiments, the implementation of a cognitive model 222 may involve the implementation of two cognitive actions 224. In certain embodiments, the first cognitive action 224 may be implemented to train the cognitive model 222 and the second cognitive action 224 may be implemented to make predictions based upon a set of unlabeled data to provide a cognitive insight 262.

In certain embodiments, a cognitive action 224 may be implemented as a function, a batch job, or a daemon, all of which will be familiar to skilled practitioners of the art. In certain embodiments, cognitive actions 224 may be implemented to be decoupled from a particular cognitive skill 226 such that they may be reused by other cognitive skills 226. In various embodiments, a cognitive action 224 implemented as a batch job may be configured to run at certain intervals or be triggered to run when a certain event takes place.

In certain embodiments, a cognitive skill 226 may be implemented to include a definition identifying various dataset input requirements, cognitive insight 262 outputs, and datasets needed to complete the cognitive skill's 226 associated cognitive actions 224. In certain embodiments, an output of one cognitive skill 226 may be used as the input to another cognitive skill 226 to build complex cognitive agents 250. In various embodiments, certain cognitive skills 226 may be implemented to control the flow of data through an associated cognitive agent 250. In various embodiments, a cognitive skill 226 may be implemented as a modular entity to interface a particular cognitive agent 250 to certain external applications and Application Program Interfaces (APIs). In certain embodiments, a cognitive skill 226 may be implemented to perform extract, transform, load (ETL) operations upon the output of another cognitive skill 226, thereby serving as a wrapper for an ML classifier or regressor.

As used herein, an input/output service broadly refers to a live link that is implemented to send and receive data. In certain embodiments, input/output services may be defined in input/output pairs that require and deliver a payload to and from a cognitive agent 250. In certain embodiments, public 202, proprietary 204, transaction, social 208, device 210, and ambient 212 data may be ingested and processed by the AIS 118 to generate one or more datasets. As used herein, a dataset broadly refers to a type of data input a cognitive agent 250 may be implemented to ingest. In certain embodiments, such a dataset may be implemented to include a definition that includes the source of the data and its corresponding schema.

Various embodiments of the invention reflect an appreciation that the implementation of cognitive skills 226 in certain embodiments may streamline, or otherwise facilitate, the construction of certain cognitive agents 250. In various embodiments, certain cognitive skills 226 may be implemented as micro services and published in a repository of AIS components, described in greater detail herein, as ready-to-use units, which can be mixed and matched between cognitive computing projects. Certain embodiments of the invention reflect an appreciation that the ability to adopt an assembly model that supports the mixing and matching of cognitive skills 226 between cognitive computing projects may minimize the effort required to rewrite code for new cognitive agents 250, and by extension, shorten development cycles.

As shown in FIG. 2, examples of cognitive skills 226 used by the cognitive agent composition platform 1202 to generate cognitive agents 250 include semantic analysis 228, goal optimization 230, collaborative filtering 232, and common sense reasoning 234. Other examples of such cognitive skills 226 include natural language processing 236, summarization 238, temporal/spatial reasoning 240, and entity resolution 242. As used herein, semantic analysis broadly refers to performing various analysis operations to achieve a semantic level of understanding about language by relating syntactic structures.

In certain embodiments, various syntactic structures may be related from the levels of phrases, clauses, sentences, and paragraphs to the level of the body of content as a whole, and to its language-independent meaning. In certain embodiments, the semantic analysis 228 cognitive skill may include processing a target sentence to parse it into its individual parts of speech, tag sentence elements that are related to certain items of interest, identify dependencies between individual words, and perform co-reference resolution. For example, if a sentence states that the author really enjoys the hamburgers served by a particular restaurant, then the name of the "particular restaurant" is co-referenced to "hamburgers."

As likewise used herein, goal optimization broadly refers to performing multi-criteria decision making operations to achieve a given goal or target objective. In certain embodiments, one or more goal optimization 230 cognitive skills may be orchestrated by the cognitive composition platform 122 to generate a cognitive agent 250 for defining predetermined goals, which in turn contribute to the generation of an associated cognitive insight 262. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight 262 provided by the AIS 118 to a traveler may indicate that hotel accommodations by a beach may cost more than they care to spend.

Collaborative filtering, as used herein, broadly refers to the process of filtering for information or patterns through the collaborative involvement of multiple cognitive agents, viewpoints, data sources, and so forth. In certain embodiments, the application of such collaborative filtering 232 cognitive skills may involve very large and different kinds of data sets, including sensing and monitoring data, financial data, and user data of various kinds. In certain embodiments, collaborative filtering may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In certain embodiments, the collaborative filtering 206 cognitive skill may be implemented with various recommendation engines familiar to those of skill in the art to make recommendations.

As used herein, common sense reasoning broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, certain common sense reasoning 234 cognitive skills may be composed by the cognitive agent composition platform 120 to generate a cognitive agent 250 that assists the AIS 118 in understanding and disambiguating words within a predetermined context. In certain embodiments, the common sense reasoning 234 cognitive skill may be used by the cognitive agent composition platform 120 to generate a cognitive agent 250 that allows the AIS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, the better or more accurate understanding of the context of a word, and its related information, allows the AILS 118 to make more accurate deductions, which are in turn used to generate cognitive insights 262.

As likewise used herein, natural language processing (NLP) broadly refers to interactions with a system, such as the AIS 118, through the use of human, or natural, languages. In certain embodiments, various NLP 210 cognitive skills may be implemented by the AIS 118 to achieve natural language understanding, which enables it to not only derive meaning from human or natural language input, but to also generate natural language output.

Summarization, as used herein, broadly refers to processing a set of information, organizing and ranking it, and then generating a corresponding summary. As an example, a news article may be processed to identify its primary topic and associated observations, which are then extracted, ranked, and presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using certain summarization 238 cognitive skills to generate sentences and phrases that describes the content of the EMR. In certain embodiments, various summarization 238 cognitive skills may be used by the cognitive agent composition platform 120 to generate to generate a cognitive agent 250 that provides summarizations of content streams, which are in turn used by the AIS 118 to generate cognitive insights 262.

As used herein, temporal/spatial reasoning broadly refers to reasoning based upon qualitative abstractions of temporal and spatial aspects of common sense knowledge, described in greater detail herein. For example, it is not uncommon for a particular set of data to change over time. Likewise, other attributes, such as its associated metadata, may also change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home. In certain embodiments, various temporal/spatial reasoning 214 cognitive skills may be used by the cognitive agent composition platform 120 to generate a cognitive agent 250 for determining the context of queries, and associated data, which are in turn used by the AIS 118 to generate cognitive insights 262.

As likewise used herein, entity resolution broadly refers to the process of finding elements in a set of data that refer to the same entity across different data sources (e.g., structured, non-structured, streams, devices, etc.), where the target entity does not share a common identifier. In certain embodiments, various entity resolution 216 cognitive skills may be used by the cognitive agent composition platform 120 to generate a cognitive agent 250 that can be used to identify significant nouns, adjectives, phrases or sentence elements that represent various predetermined entities within one or more domains. From the foregoing, it will be appreciated that the generation of one or more of the semantic analysis 228, goal optimization 230, collaborative filtering 232, common sense reasoning 234, natural language processing 236, summarization 238, temporal/spatial reasoning 240, and entity resolution 240 cognitive skills by the cognitive process orchestration platform 126 can facilitate the generation of a semantic, cognitive model.

In certain embodiments, the AIS 118 may receive public 202, proprietary 204, transaction, social 208, device 210, and ambient 212 data, or a combination thereof, which is then processed by the AIS 118 to generate one or more cognitive graphs 230. As used herein, public 202 data broadly refers to any data that is generally available for consumption by an entity, whether provided for free or at a cost. As likewise used herein, proprietary 204 data broadly refers to data that is owned, controlled, or a combination thereof, by an individual user, group, or organization, which is deemed important enough that it gives competitive advantage to that individual or organization. In certain embodiments, the organization may be a governmental, non-profit, academic or social entity, a manufacturer, a wholesaler, a retailer, a service provider, an operator of an AIS 118, and others. In certain embodiments, the public data 202 and proprietary 204 data may include structured, semi-structured, or unstructured data.

As used herein, transaction 206 data broadly refers to data describing an event, and is usually described with verbs. In typical usage, transaction data includes a time dimension, a numerical value, and certain reference data, such as references to one or more objects. In certain embodiments, the transaction 206 data may include credit or debit card transaction data, financial services data of all kinds (e.g., mortgages, insurance policies, stock transfers, etc.), purchase order data, invoice data, shipping data, receipt data, or any combination thereof. In certain embodiments, the transaction data 206 may include blockchain-associated data, smart contract data, or any combination thereof. Skilled practitioners of the art will realize that many such examples of transaction 206 data are possible. Accordingly, the foregoing is not intended to limit the spirit, scope or intent of the invention.

As used herein, social 208 data broadly refers to information that social media users publicly share, which may include metadata such as the user's location, language spoken, biographical, demographic or socio-economic information, and shared links. As likewise used herein, device 210 data broadly refers to data associated with, or generated by, an apparatus. Examples of device 210 data include data associated with, or generated by, a vehicle, home appliance, security systems, and so forth, that contain electronics, software, sensors, actuators, and connectivity, or a combination thereof, that allow the collection, interaction and provision of associated data.

As used herein, ambient 212 data broadly refers to input signals, or other data streams, that may contain data providing additional insight or context to public 202, proprietary 204, transaction 206, social 208, and device 210 data received by the AIS 118. For example, ambient signals may allow the AIS 118 to understand that a user is currently using their mobile device, at location 'x', at time 'y', doing activity 'z'. To continue the example, there is a difference between the user using their mobile device while they are on an airplane versus using their mobile device after landing at an airport and walking between one terminal and another.

To extend the example, ambient 212 data may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the AIS 118 can perform various cognitive operations and provide a cognitive insight 262 that includes a recommendation for where the user can eat.

To extend the example even further, the user may receive a notification while they are eating lunch at a recommended restaurant that their next flight has been canceled due to the previously-scheduled aircraft being grounded. As a result, the user may receive two cognitive insights 262 suggesting alternative flights on other carriers. The first cognitive insight 262 may be related to a flight that leaves within a half hour. The second cognitive insight 262 may be related to a second flight that leaves in an hour but requires immediate booking and payment of additional fees. Knowing that they would be unable to make the first flight in time, the user elects to use the second cognitive insight 262 to automatically book the flight and pay the additional fees through the use of a digital currency transaction.

In certain embodiments, the AIS 118 may be implemented to represent knowledge in the cognitive graph 260, such that the knowledge can be used to perform reasoning and inference operations. In certain embodiments, the resulting reasoning and inference operations may be implemented to provide self-assurance. Accordingly, such approaches may be implemented in certain embodiments as a cognitive inference and learning system (CILS). In certain embodiments, the self-assurance resulting from such reasoning and inference operations may be implemented to provide cognitive insights 262 with associated explainability. In these embodiments, such explainability may be implemented to provide a rationale for their associated cognitive insights 262. As used herein, as it relates to explainability, described in greater detail herein, rationale broadly refers to an explanation of the basis, or the set of reasons, or a combination thereof, used to generate a particular cognitive insight 262.

As used herein, a cognitive graph 260 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries. In various embodiments, the information contained in, and referenced by, a cognitive graph 260 may be derived from many sources, such as public 202, proprietary 204, transaction, social 208, device 210, and ambient 212 data, or a combination thereof. In certain of these embodiments, the cognitive graph 260 may be implemented to assist in the identification and organization of information associated with how people, places and things are related to one other. In various embodiments, the cognitive graph 260 may be implemented to enable automated cognitive agents 250, described in greater detail herein, to access the Web more intelligently, enumerate inferences through utilization of various data sources, and provide answers to questions by serving as a computational knowledge engine.

In certain embodiments, the cognitive graph 260 may be implemented to not only elicit and map expert knowledge by deriving associations from data, but to also render higher level insights and accounts for knowledge creation through collaborative knowledge modeling. In certain embodiments, the cognitive graph 260 may be implements as a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 260 may know that a given airport is a place, and that there is a list of related places such as hotels, restaurants and departure gates. Furthermore, the cognitive graph 260 may know that people such as business travelers, families and college students use the airport to board flights from various carriers, eat at various restaurants, or shop at certain retail stores. The cognitive graph 260 may also have knowledge about the key attributes from various retail rating sites that travelers have used to describe the food and their experience at various venues in the airport over the past six months.

In various embodiments, the cognitive process orchestration platform 126 may be implemented to orchestrate certain cognitive agents 250 to generate one or more cognitive insights 262. In certain embodiments, the resulting cognitive insights 262 may be delivered to one or more destinations 264, described in greater detail herein. As used herein, a cognitive insight 262 broadly refers to an actionable, real-time recommendation tailored to a particular user, as described in greater detail herein. Examples of such recommendations include getting an immunization, correcting a billing error, taking a bus to an appointment, considering the purchase of a particular item, selecting a recipe, eating a particular food item, and so forth.

In certain embodiments, cognitive insights 262 may be generated from various data sources, such as public 202, proprietary 204, transaction, social 208, device 210, and ambient 212 data, a cognitive graph 260, or a combination thereof. For example, if a certain percentage of the population in a user's community is suffering from the flu, then the user may receive a recommendation to get a flu shot. In this example, determining the afflicted percentage of the population, or determining how to define the community itself, may prove challenging. Accordingly, generating meaningful insights or recommendations may be difficult for an individual user, especially when related datasets are large.

In certain embodiments, a resulting cognitive insight 262 stream may be implemented to be bidirectional, supporting flows of information both too and from various destinations 264. In these embodiments, a first flow of cognitive insights 262 may be generated in response to receiving a query, and subsequently delivered to one or more destinations 264. Likewise, a second flow of cognitive insights 262 may be generated in response to detecting information about a user of one or more of the destinations 264.

Such use may result in the provision of information to the AIS 118. In response, the AIS 118 may process that information, in the context of what it knows about the user, and provide additional information to the user, such as a recommendation. In certain embodiments, a stream of cognitive insights 262 may be configured to be provided in a "push" stream configuration familiar to those of skill in the art. In certain embodiments, a stream of cognitive insights 262 may be implemented to use natural language approaches familiar to skilled practitioners of the art to support interactions with a user.

In certain embodiments, a stream of cognitive insights 262 may be implemented to include a stream of visualized insights. As used herein, visualized insights broadly refer to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the stream of cognitive insights 262 may be generated by various cognitive agents 250, which are applied to various sources, datasets, and cognitive graphs.

In certain embodiments, the AIS 118 may be implemented to deliver Cognition as a Service (CaaS). As such, it provides a cloud-based development and execution platform that allow various cognitive applications and services to function more intelligently and intuitively. In certain embodiments, cognitive applications powered by the AIS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the AIS 118 may be implemented to operate as an analytics platform to process big data, and dark data as well, to provide data analytics through a public, private or hybrid cloud environment, described in greater detail herein. As used herein, cloud analytics broadly refers to a service model wherein data sources, data models, processing applications, computing power, analytic models, and sharing or storage of results are implemented within a cloud environment to perform one or more aspects of analytics.

In certain embodiments, users may submit queries and computation requests in a natural language format to the AIS 118. In response, they are provided with a ranked list of relevant answers and aggregated information with useful links and pertinent visualizations through a graphical representation. In these embodiments, the cognitive graph 230 may be implemented to generate semantic and temporal maps to reflect the organization of unstructured data and to facilitate meaningful learning from potentially millions of lines of text, much in the same way as arbitrary syllables strung together create meaning through the concept of language.

In certain embodiments, the AIS 118 may be implemented to represent knowledge in the cognitive graph 260, such that the knowledge can be used to perform reasoning and inference operations. In certain embodiments, the resulting reasoning and inference operations may be implemented to provide self-assurance. Accordingly, such approaches may be implemented in certain embodiments as a cognitive inference and learning system (CILS). In certain embodiments, the self-assurance resulting from such reasoning and inference operations may be implemented to provide cognitive insights with associated explainability. In these embodiments, such explainability may be implemented to provide a rationale for their associated cognitive insights.

Figure 3:
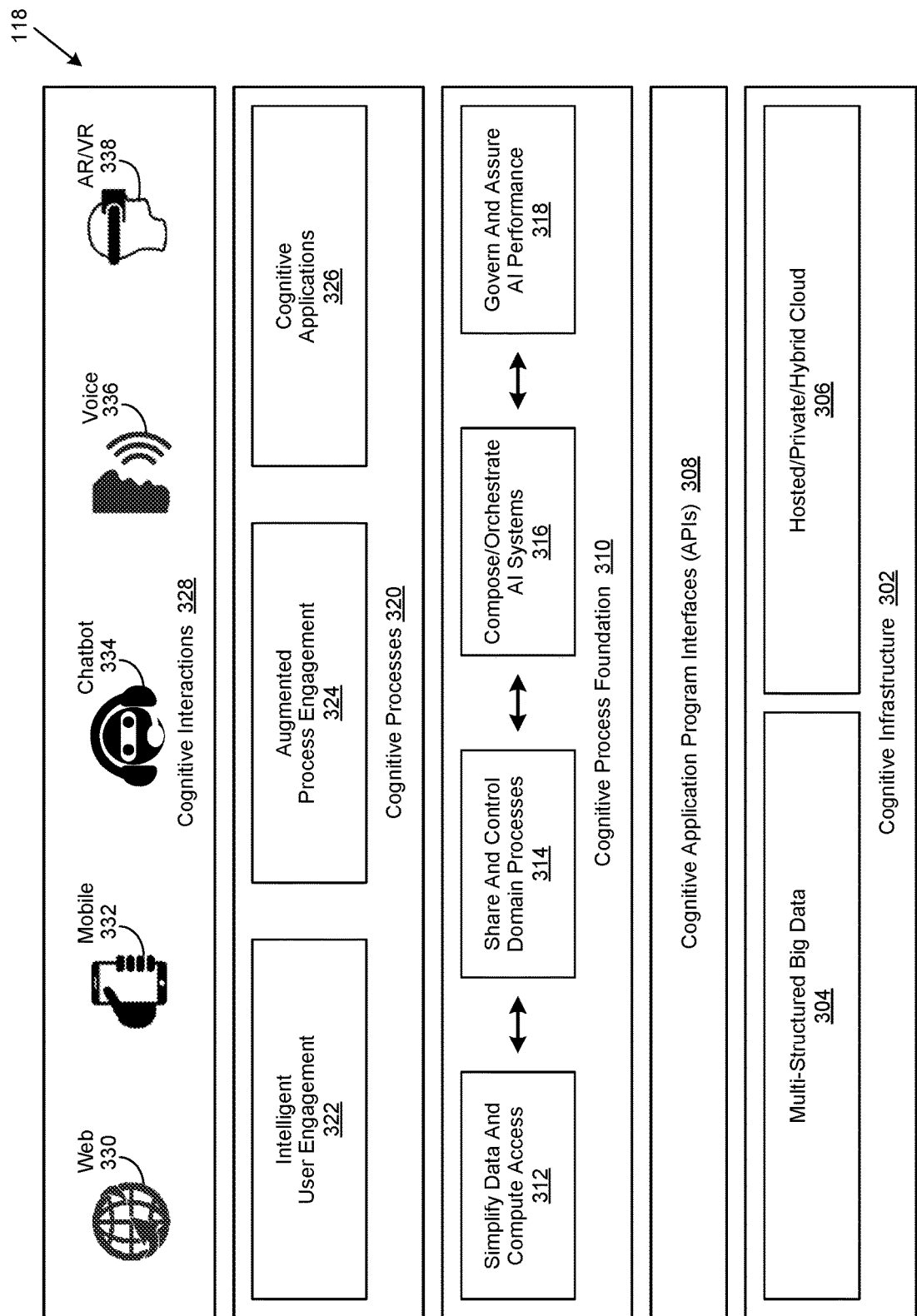
FIG. 3 is a simplified block diagram of an AIS reference model.

FIG. 3 is a simplified block diagram of an augmented intelligence system (AIS) reference model implemented in accordance with an embodiment of the invention. In various embodiments, the AIS 118 reference model shown in FIG. 3 may be implemented as a reference for certain components included in, and functionalities performed by, an AIS 118, described in greater detail herein. In certain embodiments, these components and functionalities may include a cognitive infrastructure 302, one or more cognitive Application Program Interfaces (APIs) 308, a cognitive process foundation 310, various cognitive processes 320, and various cognitive interactions 328. In certain embodiments, the cognitive infrastructure 302 may include various sources of multi-structured big data 304 and a hosted/private/hybrid cloud infrastructure, both of which are described in greater detail herein.

In certain embodiments, the cognitive process foundation 310, likewise described in greater detail herein, may be implemented to provide various cognitive computing functionalities. In certain embodiments, these cognitive computing functionalities may include the simplification of data and compute resource access 312. In certain embodiments, these cognitive computing functionalities may likewise include various sharing and control 314 operations commonly associated with domain processes. Likewise, in certain embodiments these cognitive computing functionalities may include the composition and orchestration 316 of various artificial intelligence (AI) systems.

In certain embodiments, the composition and orchestration 316 of various artificial intelligence (AI) systems may include the composition of cognitive skills and cognitive agents, as described in greater detail herein. In certain embodiments, the composition and orchestration 316 may include the orchestration of various cognitive agents, and associated AIS components, to generate one or more cognitive processes, likewise described in greater detail herein. In certain embodiments, these cognitive computing functionalities may include AI governance and assurance 318 operations associated with ensuring the integrity and transparency of an AI system in the context of various cognitive computing operations it may perform.

As used herein, AI governance broadly refers to the management of the availability, consistency, integrity, usability, security, privacy, and compliance of data and processes used to perform a cognitive computing operation. Certain embodiments of the invention reflect an appreciation that practices and processes associated with AI governance ideally provide an effective foundation, strategy, and framework to ensure that data can be managed as an asset and transformed into meaningful information as a result of a cognitive computing operation. Certain aspects of the invention likewise reflect an appreciation that implementation of various AI governance programs may include a governing body or council, a defined set of procedures, and a plan to execute those procedures.

Certain embodiments of the invention reflect an appreciation that AI governance typically includes other concepts, such as data stewardship and data quality, which may be used to improve control over various components of an AIS 118. In various embodiments, certain AI governance 318 operations may be implemented to improve control over other components of the cognitive process foundation 310. In these embodiments, the AI governance and assurance 318 operations may be implemented to improve control over the simplification of data and compute access 312, sharing and controlling domain processes 314, and composing and orchestrating AI systems 316.

In certain embodiments, the AI governance and assurance 318 operations may likewise be implemented to improve control over a cognitive infrastructure 302, cognitive APIs 308, cognitive processes 320, and cognitive interactions 328. Various embodiments of the invention likewise reflect an appreciation that improving control over such components of an AIS 118 may include certain methods, technologies, and behaviors, described in greater detail herein. Likewise, various embodiments of the invention reflect an appreciation that effective AI governance generally involves the exercise of authority and control (e.g., planning, monitoring, enforcement, etc.) over the management of AIS 118 components used in the performance of certain cognitive computing operation.

Furthermore, certain embodiments of the invention reflect an appreciation that the lack of adequate AI governance may result in poor data quality. Moreover, various embodiments of the invention reflect an appreciation that the lack of adequate AI governance may result in poor, unexpected, or otherwise undesirable performance of certain cognitive skills and cognitive agents, described in greater detail herein. Accordingly, certain embodiments of the invention likewise reflect an appreciation that poor data quality, unexpected, or otherwise undesirable performance of certain cognitive skills and cognitive agents, or a combination thereof, may have an adverse effect upon the results of an associated cognitive computing operation.

As likewise used herein, AI assurance broadly refers to ensuring the transparency, interpretability, impartiality, accountability, and trustworthiness of the cognitive computing operations an AIS 118 performs to produce a resulting outcome, such as a cognitive insight. Certain embodiments of the invention reflect an appreciation that practices and processes associated with AI assurance generally provide an effective foundation, strategy, and framework to ensure that an AIS 118 can perform its intended function free from deliberate or inadvertent manipulation. Certain embodiments of the invention reflect an appreciation that such practices and processes can likewise assist in ensuring cognitive computing operations performed by an AIS 118 adhere to its operational and technical parameters within prescribed limits. In certain embodiments, various cognitive computing functionalities may be implemented to work individually, or in concert with one another. In these embodiments, the method by which these various cognitive computing functionalities is a matter of design choice.

As used herein, a cognitive process broadly refers to an instantiation of a cognitive computing operation, described in greater detail herein. In certain embodiments, the cognitive process 320 may be implemented as an intelligent user engagement 322. As used herein, an intelligent user engagement 322 broadly refers to the application of certain cognitive operations to assist in more meaningful cognitive interactions 328 between a user and certain cognitive processes 320. In certain embodiments, the cognitive process 320 may be implemented as an augmented process engagement 324. As used herein, an augmented process engagement broadly refers to the application of cognitive operations to improve interaction between certain cognitive processes 320. In certain embodiments, the cognitive process 320 may be implemented as one or more cognitive applications 326, described in greater detail herein. In certain embodiments, cognitive interactions 328 may be implemented to support user interactions with an AIS 118 through web 330 applications, mobile 332 applications, chatbot 334 interactions, voice 336 interactions, augmented reality (AR) and virtual reality (VR) interactions 338, or a combination thereof.

Figure 4:
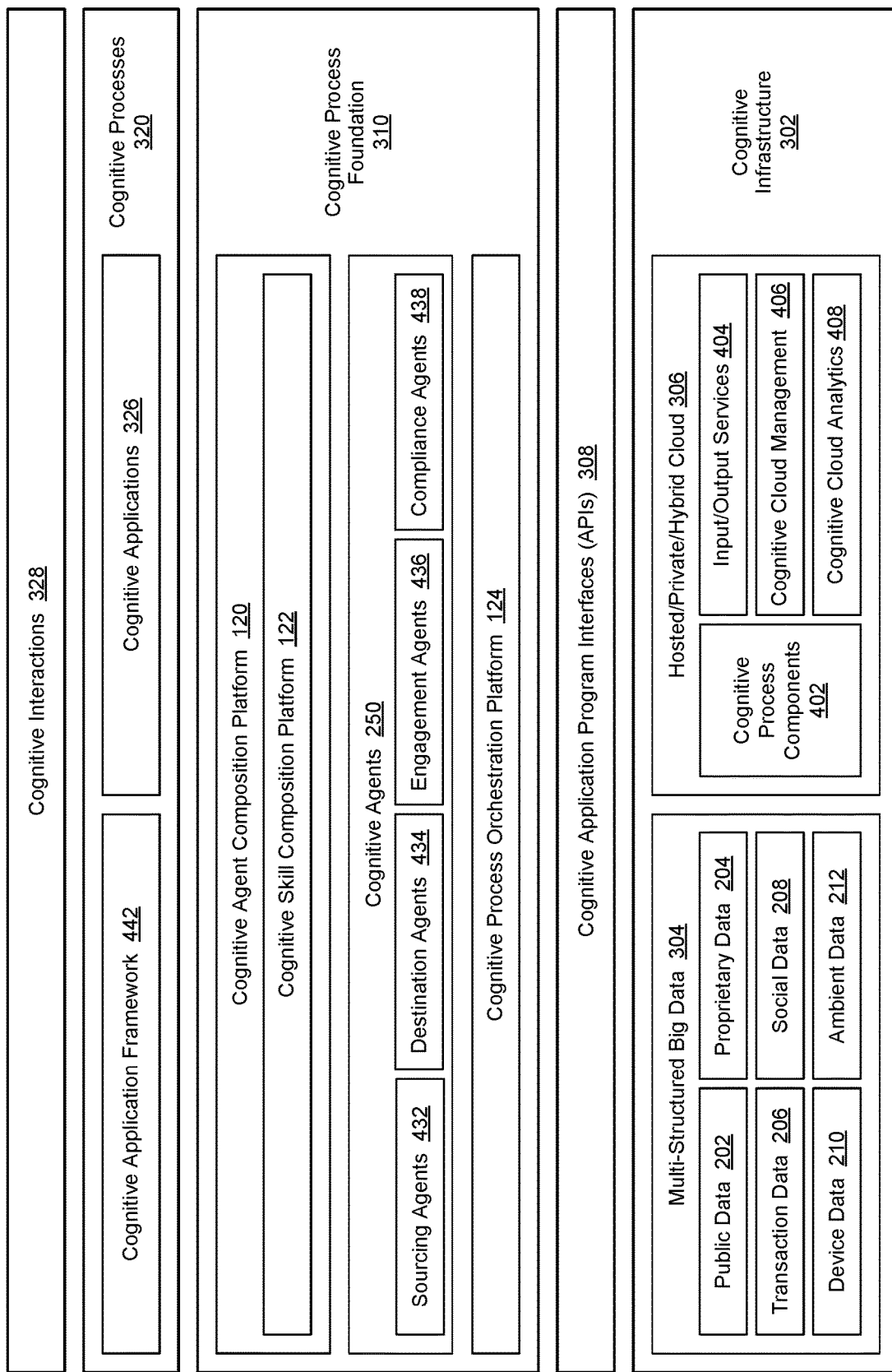
FIG. 4 is a simplified block diagram of an AIS platform.

FIG. 4 is a simplified block diagram of an augmented intelligence system (AIS) platform implemented in accordance with an embodiment of the invention. In certain embodiments, the AIS platform may be implemented to include various cognitive processes 320, a cognitive process foundation 310, various Cognitive Application Program Interfaces (APIs) 308, and an associated cognitive infrastructure 302. In certain embodiments, the cognitive processes 320 may be implemented to understand and adapt to the user, not the other way around, by natively accepting and understanding human forms of communication, such as natural language text, audio, images, video, and so forth.

In these and other embodiments, the cognitive processes 320 may be implemented to possess situational and temporal awareness based upon ambient signals from users and data, which facilitates understanding the user's intent, content, context and meaning to drive goal-driven dialogs and outcomes. Further, they may be designed to gain knowledge over time from a wide variety of structured, non-structured, transactional, and device data sources, continuously interpreting and autonomously reprogramming themselves to better understand a given domain. As such, they are well-suited to support human decision making, by proactively providing trusted advice, offers and recommendations while respecting user privacy and permissions.

In certain embodiments, the cognitive processes 320 may be implemented in concert with a cognitive application framework 442. In certain embodiments, the cognitive processes 320 and the cognitive application framework 442 may be implemented to support plug-ins and components that facilitate the creation of various cognitive applications 326, described in greater detail herein. In certain embodiments, the cognitive processes 320 may be implemented to include widgets, user interface (UI) components, reports, charts, and back-end integration components familiar to those of skill in the art.

As likewise shown in FIG. 4, the cognitive process foundation 310 may be implemented in certain embodiments to include a cognitive process orchestration platform 126, a cognitive process composition platform 122, and various cognitive agents 250, all of which are described in greater detail herein. In certain embodiments, the cognitive orchestration platform 126 may be implemented to orchestrate various cognitive agents 250 to enable one or more cognitive processes 320. In certain embodiments, the cognitive orchestration platform 126 may be implemented to manage accounts and projects, along with user-specific metadata that is used to drive processes and operations within the cognitive process foundation 310 for a particular project.

In certain embodiments, the cognitive agent composition platform 120 may be implemented to compose one or more cognitive agents 250. In certain embodiments, the cognitive agents 250 may include a sourcing agent 432, a destination agent 434, an engagement agent 436, a compliance agent 438, or a combination thereof. In certain embodiments, the sourcing agent 432 may be implemented to source a variety of multi-site, multi-structured source streams of data described in greater detail herein.

In various embodiments, the destination agent 436 may be implemented to publish cognitive insights to a consumer of cognitive insight data. Examples of such consumers of cognitive insight data include target databases, public or private blockchains, business intelligence applications, and mobile applications. It will be appreciated that many such examples of cognitive insight data consumers are possible. In certain embodiments, the engagement agents 436 may be implemented to define various cognitive interactions 328 between a user and a particular cognitive process 320. In certain embodiments, the compliance agents 438 may be implemented to ensure compliance with certain business and technical guidelines, rules, regulations or other parameters associated with an organization.

In certain embodiments, the resulting cognitive agents 250 may be orchestrated by the cognitive process orchestration platform 126 to create cognitive insights, described in greater detail herein. In certain embodiments, the resulting cognitive agents 250 may be orchestrated by the cognitive process orchestration platform 126 to create custom extensions to the AIS 118 shown in FIG. 2. In certain embodiments, the cognitive process foundation 310 may be implemented for the development of a cognitive application 326, which may subsequently be deployed in a public, private or hybrid cloud 306 cloud environment.

In various embodiments, the APIs 308 may be implemented for use by the cognitive process orchestration platform 126 to orchestrate certain cognitive agents 250, described in greater detail herein, which are then executed by the AIS 118 to generate cognitive insights. In certain embodiments, the APIs 308 may be implemented to access various cognitive infrastructure 302 components. In certain embodiments, the infrastructure components may include repositories of multi-structured big data 304, a hosted/private/hybrid cloud 306 environment, or both. In certain embodiments, the repositories of multi-structured big data 304 may be accessed by the AIS platform to generate cognitive insights.

In certain embodiments, the repositories of multi-structured big data 304 may include individual repositories of public 202, proprietary 204, transaction 206, social 208, device 210, and ambient 212 data, or some combination thereof. In certain embodiments, the repositories of transaction data 206 may include blockchain data associated with one or more public blockchains, one or more private blockchains, or a combination thereof. In certain embodiments, the repositories of transaction data 206 may be used to generate a blockchain-associated cognitive insight.

In certain embodiments, as described in greater detail herein, the cognitive infrastructure 302 environment may include various input/output services 404, described in greater detail herein, a cognitive cloud management 406 platform, and various cognitive cloud analytics 408 components, or a combination thereof. In certain embodiments, hosted/private/hybrid cloud 306 may include a repository of cognitive process components 402. In certain embodiments, the repository of cognitive process components 402 may be implemented to store cognitive agents, cognitive skills, cognitive models, cognitive algorithms, and cognitive actions.

In various embodiments, the contents of the cognitive process components 402 may be used by the cognitive skill composition platform 122 to compose certain cognitive skills. In various embodiments, the contents of the cognitive process components 402 may be used by the cognitive agent composition platform 120 to compose certain cognitive agents. In various embodiments, the contents of the cognitive process components 402 may be used by the cognitive process orchestration platform 126 to orchestrate certain cognitive processes 320.

FIG. 5 shows a simplified block diagram of components associated with a cognitive process foundation implemented in accordance with an embodiment of the invention. In certain embodiments, the cognitive process foundation 310 may be implemented to include an augmented intelligence system (AIS) composition platform 120 and a cognitive process orchestration platform 126. In certain embodiments, the cognitive agent composition platform 120 may be implemented to include an AIS composition user interface (UI) 522, a cognitive skill composition platform 122, and a cognitive agent composition platform 124, all of which are described in greater detail herein. In certain embodiments, the cognitive composition UI 522 may be implemented to receive user input, and provide a visual representation of the execution of individual operations, associated with the cognitive skill composition 122 and cognitive agent composition 124 platforms. In certain embodiments, the AIS composition UI 522 may be implemented as a Graphical User Interface (GUI).

In various embodiments, the cognitive skill composition platform 122 may be implemented to perform certain cognitive skill composition 530 operations associated with the composition of a particular cognitive skill. In certain embodiments, the cognitive skill composition 530 operations may include the development, testing, and definition of a cognitive skill, as described in greater detail herein. In certain embodiments, the cognitive skill composition 530 operations may include the development of one or more cognitive algorithms, as likewise described in greater detail herein. In certain embodiments, the cognitive skill composition 530 operations may include the definition of various cognitive model actions. In certain embodiments, the cognitive skill composition 530 operations may include the identification of data sources, such as the public 202, proprietary 204, transaction, social 208, device 210, and ambient 212 data sources described in the descriptive text associated with FIG. 2. In certain embodiments, the cognitive skill composition 530 operations may include the definition of required datasets, described in greater detail herein.

In certain embodiments, the cognitive skill composition platform 122 may be implemented with an associated cognitive skill client library 540 and one or more cognitive skill Application Program Interfaces (APIs) 550. In certain embodiments, the cognitive skill client library 540, and one or more cognitive skill Application Program Interfaces (APIs) 550, may be implemented by the cognitive skill composition platform 122 to compose a particular cognitive skill.

In various embodiments, the cognitive agent composition platform 124 may be implemented to perform certain cognitive agent composition 532 operations associated with the composition of a particular cognitive skill. In certain embodiments, the cognitive agent composition 532 operations may include the development of various datasets used by a particular cognitive agent during its execution. In various embodiments, the cognitive agent composition 532 operations may include the curation and uploading of certain training data used by a cognitive model associated with a particular cognitive agent. In certain embodiments, the development of the various datasets and the curation and uploading of certain training data may be performed via a data engineering operation.

In certain embodiments, the cognitive agent composition 532 operations may include creation of a cognitive agent record. In certain embodiments, the cognitive agent record may be implemented by an AIS to track a particular cognitive agent. In certain embodiments, the cognitive agent record may be implemented by an AIS to locate and retrieve a particular cognitive agent stored in a repository of AIS components, described in greater detail herein. In certain embodiments, the cognitive agent composition 532 operations may include the addition, and configuration of, one or more cognitive skills associated with a particular cognitive agent.

In certain embodiments, the cognitive agent composition 532 operations may include the definition of various input/output services, described in greater detail herein, associated with a particular cognitive agent. In certain embodiments, the cognitive agent composition 532 operations may include the definition of various dataset connections associated with a particular cognitive agent. In certain embodiments, the definition of various dataset connections may be performed via a data engineering operation. In certain embodiments, the cognitive agent composition 532 operations may include the creation of one or more data flows associated with a particular cognitive agent. In certain embodiments, the cognitive agent composition 532 operations may include the mapping of one or more data flows associated with a particular cognitive agent. In certain embodiments, the mapping of data flows may be performed via a date engineering operation. In certain embodiments, the cognitive agent composition 532 operations may include the testing of various services associated with a particular cognitive agent.

In certain embodiments, the cognitive agent composition platform 120 may be implemented with an associated cognitive agent client library 542 and one or more cognitive agent APIs 552. In certain embodiments, the cognitive agent library 542, and one or more cognitive agent APIs 552, may be implemented by the cognitive agent composition platform 120 to compose a particular cognitive agent.

In certain embodiments, the cognitive process foundation 310 may be implemented to include a cognitive process orchestration platform 126. In certain embodiments, the cognitive process orchestration platform 126 may be implemented to include an AIS administration console 524, an AIS command line interface (CLI) 526, or both. In certain embodiments, the AIS administration console 524 may be implemented as a GUI.

In certain embodiments, the AIS administration console 524 and the AIS CLI 526, individually or in combination, may be implemented to manage the building blocks of a particular cognitive process, described in greater detail herein. In certain embodiments, the building blocks of a particular cognitive process may include one or more cognitive agents, likewise described in greater detail herein. In certain embodiments, the AIS administration console 524 and the AIS CLI 526, individually or in combination, may be implemented to manage lifecycle of a cognitive agent, described in greater detail herein.

In certain embodiments, the AIS administration console 524 may be implemented to manage a cognitive process user account. In certain embodiments, the AIS administration console 524 may be implemented view various AIS logs and metrics. In certain embodiments, the AIS administration console 524 may be implemented as a web interface familiar to those of skill in the art.

In certain embodiments, the AIS CLI 526 may be implemented to generate and deploy cognitive skills, created and save dataset definitions, invoke cognitive agent services, and configure cognitive action batch jobs and connections, or a combination thereof. In certain embodiments, the AIS CLI 526 may be implemented to add cognitive agent building blocks to the cognitive agent composition platform 120. In certain embodiments, the AIS CLI 526 may be implemented to execute cognitive agent lifecycle commands.

In certain embodiments, the AIS administration console 524 and the AIS CLI 526, individually or in combination, may be implemented to perform various data orchestration 534 operations. In certain embodiments, the data orchestration 534 operations may include the definition of data sources associated with a particular AIS region, described in greater detail herein. In certain embodiments, the data orchestration 534 operations may include the definition of various data variables associated with a particular AIS region.

In certain embodiments, the AIS administration console 524 and the AIS CLI 526, individually or in combination, may be implemented to perform various cognitive agent orchestration 536 operations. In certain embodiments, the cognitive agent orchestration 536 operations may include the creation of a cognitive agent snapshot. As used herein, a cognitive agent snapshot broadly refers to a depiction of the operational state of a cognitive agent at a particular instance in time during the execution of a cognitive process.

In certain embodiments, the cognitive agent orchestration 536 operations may include the promotion of a cognitive agent snapshot. As likewise used herein, promotion broadly refers to the transition of a cognitive agent, or a cognitive process, from one operational environment to another. As an example, the cognitive process orchestration platform 126 may be implemented in a development environment to generate a cognitive process by orchestrating certain cognitive agents, as described in greater detail herein. Once development has been completed, the resulting cognitive process may be promoted to a test environment. Thereafter, once testing of the cognitive process has been completed, it may be promoted to a user acceptance environment, and once the user acceptance phase has been completed, it may be promoted to a production environment.

In certain embodiments, the cognitive agent orchestration 536 operations may include the creation of a cognitive agent instance. In certain embodiments, the cognitive agent orchestration 536 operations may include enablement of start triggers for a particular cognitive agent. In certain embodiments, the cognitive agent orchestration 536 operations may include the invocation of a particular instance of a cognitive agent. In certain embodiments, the cognitive agent orchestration 536 operations may include querying and filtering responses received from a particular cognitive agent. In certain embodiments, the cognitive process orchestration platform 126 may be implemented with an associated AIS console client library 544, one or more AIS console APIs 554, an AIS CLI client library 546, one or more AIS CLI APIs 556, or a combination thereof.

Figure 6:
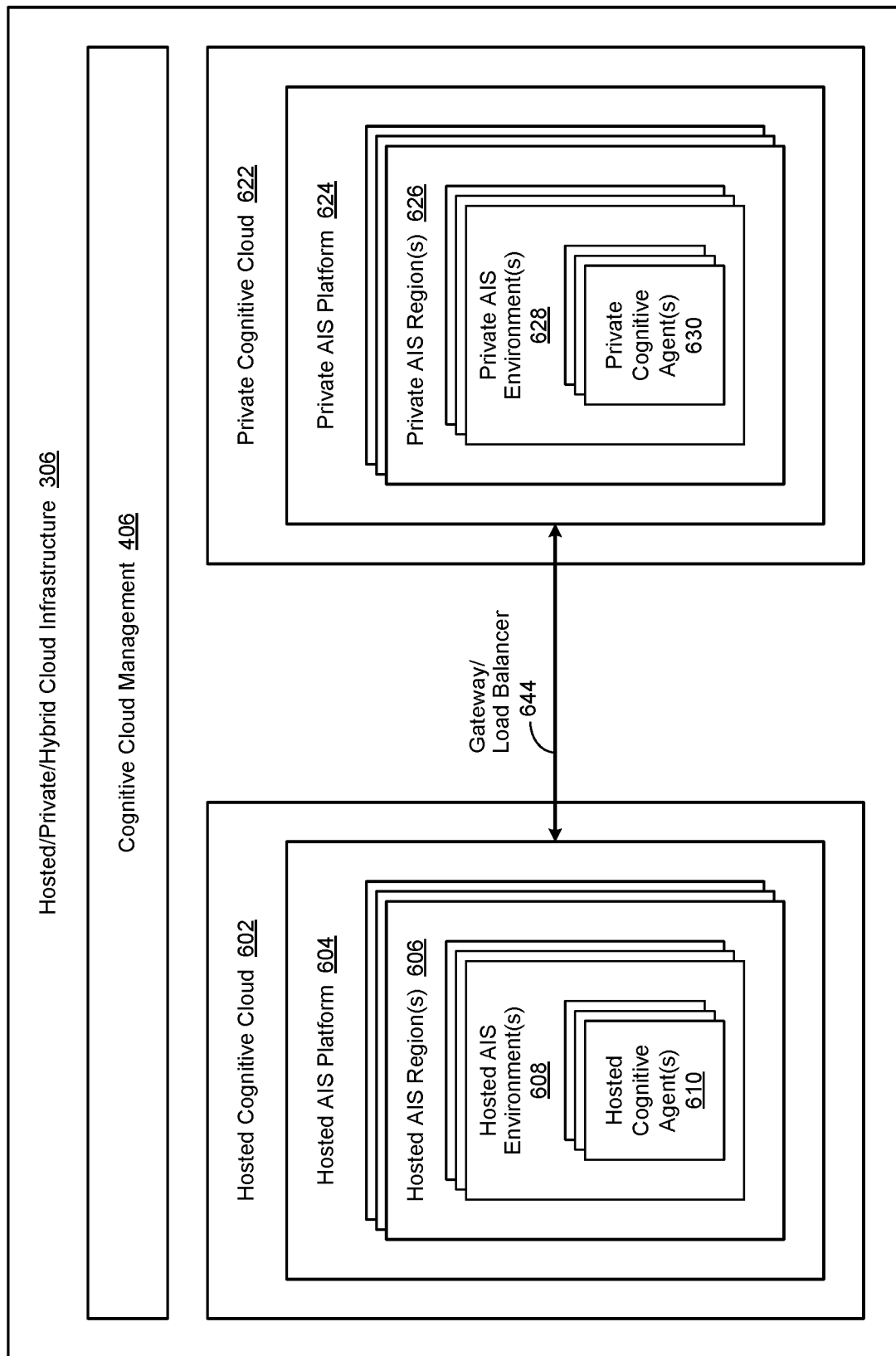
FIG. 6 is a simplified block diagram of a plurality of AIS platforms implemented within a hybrid cloud environment.

FIG. 6 is a simplified block diagram of a plurality of augmented intelligence system (AIS) platforms implemented in accordance with an embodiment of the invention within a hybrid cloud infrastructure. In certain embodiments, the hybrid cloud infrastructure 304 may be implemented to include a cognitive cloud management 402 platform, a hosted 602 cognitive cloud environment, and a private 622 cognitive cloud environment. In certain embodiments, the private 622 cognitive cloud environment may be implemented in a private network, such as commonly implemented by corporation or government organization.

In certain embodiments, the hosted 602 and private 622 cognitive cloud environment may respectively be implemented to include a hosted 604 and private 624 AIS platform. Likewise, in certain embodiments, the hosted 604 and private 624 AIS platforms may respectively be implemented to include one or more hosted 626 and private 626 AIS regions. As used herein, a hosted 606 AIS region broadly refers to a designated instantiation of an AIS implemented to execute on a corresponding hosted 604 platform. As likewise used herein, a private 626 AIS region broadly refers to a designated instantiation of an AIS implemented to execute on a corresponding private 624 platform. In certain embodiments, the designated instantiation of a hosted 606 or private 626 AIS region may be defined by a set of associated parameters.

As an example, the designation parameters associated with a hosted 606 or private 626 AIS region, individually or in combination, may to correspond to a defined geographic area. To continue the example, the designation parameters associated with a particular hosted 606 AIS region may correspond to certain defining information associated with the state of Texas. Likewise, the designation parameters associated with a first and second private 626 AIS region may respectively correspond to certain defining information associated with Dallas and Harris counties, both of which are located in the state of Texas. In this example, the hosted 606 AIS region may be implemented to provide various cognitive insights related to the state government of Texas to various county governments. Likewise, the first and second private 626 AIS regions may be respectively implemented to provide cognitive insights specific to the county governments of Dallas and Harris counties.

As another example, the designation parameters associated with a hosted 606 or private 626 AIS region, individually or in combination, may to correspond to various aspects of an organization. To continue the example, the designation parameters associated with a particular hosted 606 AIS region may correspond to certain defining information associated with an automobile dealer network. Likewise, the designation parameters associated with a first and second private 626 AIS region may respectively correspond to certain defining information associated with two independent automobile dealers, both of which are located in the same city and sell the same brand of automobiles. In this example, the hosted 606 AIS region may be implemented to provide various cognitive insights related to certain aspects of the automobile brand. Likewise, the first and second private 626 AIS regions may be respectively implemented to provide cognitive insights specific to certain aspects of the two automobile dealers, such as their respective inventories, customer demographics, and past promotional activities.

In certain embodiments, each hosted 606 and private 626 AIS regions may be implemented to include one hosted 608 or private 628 AIS environments. As used herein, a hosted 608 AIS environment broadly refers to an operating environment within which a particular hosted 608 AIS environment is implemented. As likewise used herein, a private hosted 628 AIS environment broadly refers to an operating environment within which a particular private 628 AIS environment is implemented.

As an example, a cognitive process may first be implemented in a hosted 608 or private 628 development environment to generate a cognitive process by orchestrating certain cognitive agents, as described in greater detail herein. Once development has been completed, the resulting cognitive process may be promoted to a hosted 608 or private 628 test environment. Thereafter, once testing of the cognitive process has been completed, it may be promoted to a hosted 608 or private 628 user acceptance environment. Likewise, once the user acceptance phase has been completed, it may be promoted to a hosted 608 or private 628 production environment.

In certain embodiments, each hosted 608 and private 628 AIS environments may be implemented to include they use of one or more hosted 610 or private 630 cognitive agents, described in greater detail herein, to generate cognitive insights, likewise described in greater detail herein. In certain embodiments, a gateway/load balancer 644 may be implemented to allow the hosted 604 and private 624 AIS platforms to communicate with one another. In certain embodiments, the ability to communicate with one another allows the hosted 604 and private 624 AIS platforms to work collaboratively when generating cognitive insights described in greater detail herein.

Figure 7:
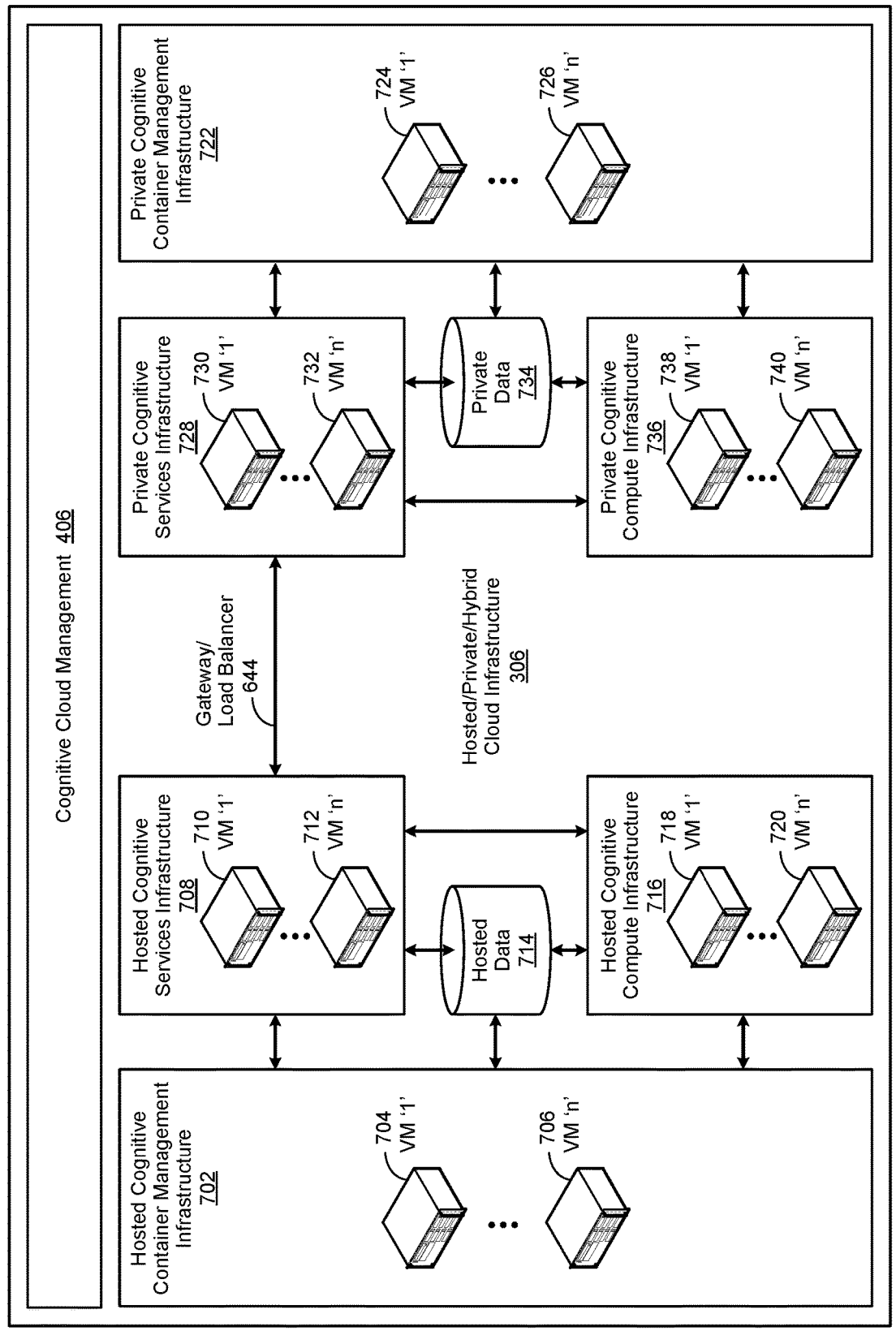
FIG. 7 shows components of a plurality of AIS platforms implemented within a hosted/private/hybrid cloud environment.

FIG. 7 shows components of a plurality of augmented intelligence system (AIS) platforms implemented in accordance with an embodiment of the invention within a hosted/private/hybrid cloud environment. In certain embodiments, the hybrid cloud infrastructure 304 may be implemented to include a cognitive cloud management 406 platform, a hosted 702 cognitive container management infrastructures, and a private 722 cognitive container management infrastructure. In certain embodiments, the hosted 702 and private 722 cognitive container management infrastructures may be implemented to respective include one or more virtual machines (VMs) '1' 704 through 'n' 706 and VMs '1' 724 through 'n' 726.

In certain embodiments, the hybrid cloud infrastructure 304 may likewise be implemented to include hosted 708 and private 728 cognitive services infrastructures, hosted 716 and private 736 cognitive compute infrastructures, and a gateway/load balancer 644. In certain embodiments, the hosted 708 and private 728 cognitive services infrastructures may be implemented to respective include one or more virtual machines (VMs) '1' 710 through 'n' 712 and VMs '1' 730 through 'n' 732. In certain embodiments, the hosted 716 and private 736 cognitive compute infrastructures may likewise be implemented to respective include one or more virtual machines (VMs) '1' 718 through 'n' 720 and VMs '1' 738 through 'n' 740.

Likewise, in certain embodiments the hybrid cloud infrastructure 304 may be implemented to include various repositories of hosted 714 and private 734 data. As used herein, a repository of hosted 714 or private 734 data broadly refers to a collection of knowledge elements that can be used in certain embodiments to generate one or more cognitive insights, described in greater detail herein. In certain embodiments, these knowledge elements may include facts (e.g., milk is a dairy product), information (e.g., an answer to a question), descriptions (e.g., the color of an automobile), abilities (e.g., the knowledge of how to install plumbing fixtures), and other classes of knowledge familiar to those of skill in the art. In these embodiments, the knowledge elements may be explicit or implicit. As an example, the fact that water freezes at zero degrees centigrade is an explicit knowledge element, while the fact that an automobile mechanic knows how to repair an automobile is an implicit knowledge element.

In certain embodiments, the knowledge elements within a repository of hosted 714 or private 734 data may also include statements, assertions, beliefs, perceptions, preferences, sentiments, attitudes or opinions associated with a person or a group. As an example, user 'A' may prefer the pizza served by a first restaurant, while user 'B' may prefer the pizza served by a second restaurant. Furthermore, both user 'A' and 'B' are firmly of the opinion that the first and second restaurants respectively serve the very best pizza available. In this example, the respective preferences and opinions of users 'A' and 'B' regarding the first and second restaurant may be included in a universal knowledge repository as they are not contradictory. Instead, they are simply knowledge elements respectively associated with the two users and can be used in various embodiments for the generation of certain cognitive insights, as described in greater detail herein.

In certain embodiments, individual knowledge elements respectively associated with the repositories of hosted 714 and private 734 data may be distributed. In certain embodiments, the distributed knowledge elements may be stored in a plurality of data stores familiar to skilled practitioners of the art. In certain embodiments, distributed knowledge elements may be logically unified for various implementations of the repositories of hosted 714 and private 734 data.

In certain embodiments, the repositories of hosted 714 and private 734 data may be respectively implemented in the form of a hosted or private universal cognitive graph, described in greater detail herein. In certain embodiments, individual nodes within a hosted or private universal cognitive graph may contain one or more knowledge elements. In certain embodiments, the repositories of hosted 714 and private 734 data may be respectively implemented to include a repository of hosted and private AIS components, such as the AIS component repository 402 shown in FIG. 4 and described in its associated descriptive text.

In certain embodiments, the repositories of hosted 714 and private 734 data may respectively include one or more repositories of application data, proprietary data, and proprietary transaction data. In certain embodiments, the repositories of hosted or private transaction data may include credit or debit card transaction data, financial services data of all kinds (e.g., mortgages, insurance policies, stock transfers, etc.), purchase order data, invoice data, shipping data, receipt data, or any combination thereof. In various embodiments, the repositories of hosted or private transaction data may likewise include blockchain-associated data, smart contract data, or any combination thereof.

In certain embodiments, hosted and private transaction data may be exchanged through the implementation of a transaction data exchange implemented on the gateway/load balancer 644. In certain embodiments, the implementation of such a transaction data exchange may allow the hosted 716 cognitive compute infrastructure to access certain private transaction data. Conversely, the private 736 cognitive compute infrastructure may be allowed to access certain hosted transaction data. In certain embodiments, the transaction data exchange may be implemented with permission and identity management controls to determine the degree to which certain hosted and private transaction data may be respectively accessed by the hosted 716 and private 736 cognitive compute infrastructures.

In certain embodiments, the repositories of hosted or private transaction data may include data associated with a public blockchain. As used herein, a public blockchain broadly refers to a blockchain that has been implemented as a permissionless blockchain, meaning anyone can read or write to it. One advantage of such a public blockchain is it allows individuals who do not know each other to trust a shared record of events without the involvement of an intermediary or third party.

In certain embodiments, a repository of private transaction data may be implemented to include data associated with a proprietary blockchain. As likewise used herein, a proprietary blockchain broadly refers to a blockchain where its participants are known and are granted read and write permissions by an authority that governs the use of the blockchain. For example, proprietary blockchain participants may belong to the same or different organizations within an industry sector. In certain embodiments, these relationships may be governed by informal relationships, formal contracts, or confidentiality agreements.

Skilled practitioners of the art will recognize that while many transactions may benefit from the decentralized approach typically implemented by a public blockchain, others are more suited to being handled by an intermediary. Such intermediaries, while possibly adding additional complexities and regulation, can often provide demonstrable value. In certain embodiments, an intermediary associated with a proprietary blockchain may have the ability to veto or rescind suspect transactions, provide guarantees and indemnities, and deliver various services not generally available through a public blockchain.

Furthermore, proprietary blockchains have several advantages, including the use of cryptographic approaches known to those of skill in the art for identity management and verification of transactions. These approaches not only prevent the same transaction taking place twice, such as double-spending a digital currency, they also provide protection against malicious activities intended to compromise a transaction by changing its details. Moreover, permission controls typically associated with proprietary blockchains can provide dynamic control over who can connect, send, receive and enact individual transactions, based upon any number of parameters that may not be available or implementable in public blockchains. Accordingly, full control can be asserted over every aspect of a proprietary blockchain's operation, not only in accordance with the consensus of its various participants, but its administrative intermediary as well.

In certain embodiments, the hosted 708 or private 728 cognitive services infrastructure may be implemented to manage the identity of a user, group or organization in the performance of blockchain-associated cognitive insight operations. In certain embodiments, the hosted 708 or private 728 cognitive services infrastructure may be implemented to perform various cognitive identity management operations. In certain embodiments, the cognitive identity management operations may include the use of cognitive personas, cognitive profiles, or a combination thereof, to perform blockchain-associated cognitive insight operations associated with a particular user, group or organization. In certain embodiments, the cognitive identity management operations may be implemented to verify the identity of a user, group or organization in the performance of a blockchain-associated cognitive insight operation.

In certain embodiments, the cognitive identity management operations may likewise involve the generation, and ongoing management of, private keys, shared keys, public/private key pairs, digital signatures, digital certificates, or any combination thereof, associated with a particular user, group or organization. Likewise, in certain embodiments the cognitive identity management operations may involve the encryption of one or more cognitive insights, one or more smart contracts, or some combination thereof, during the generation of a blockchain-associated cognitive insight. Those of skill in the art will recognize that many such embodiments are possible. Accordingly, the foregoing is not intended to limit the spirit, scope or intent of the invention.

In various embodiments, the gateway/load balancer 644 may be implemented for the hosted 708 cognitive services infrastructure provide certain hosted data and knowledge elements to the private 728 cognitive services infrastructure, In certain embodiments, the provision of certain hosted data and knowledge elements allows the hosted 714 repository of data to be replicated as the private 724 repository of data. In certain embodiments, the provision of certain hosted data and knowledge elements to the private 728 cognitive services infrastructure allows the hosted 714 repository of data to provide updates to the private 734 repository of data. In certain embodiments, the updates to the private 734 repository of data do not overwrite other data. Instead, the updates are simply added to the private 734 repository of data.

In certain embodiments, knowledge elements and data that are added to the private 734 repository of data are not respectively provided to the hosted 714 repository of data. As an example, an airline may not wish to share private information related to its customer's flights, the price paid for tickets, their awards program status, and so forth. In various embodiments, certain knowledge elements and data that are added to the private 724 repository of data may be provided to the hosted 714 repository of data. As an example, the owner of the private 734 repository of data may decide to license certain knowledge elements and data to the owner of the hosted 714 repository of data. To continue the example, certain knowledge elements or data stored in the private 734 repository of data may be anonymized prior to being provided for inclusion in the hosted 714 repository of data.

In certain embodiments, only private knowledge elements or data are stored in the private 734 repository of data. In certain embodiments, the private 736 cognitive compute infrastructure may use knowledge elements and data stored in both the hosted 714 and private 734 repositories of data to generate cognitive insights. Skilled practitioners of the art will recognize that many such embodiments are possible. Accordingly, the foregoing is not intended to limit the spirit, scope or intent of the invention.

Figure 8A:
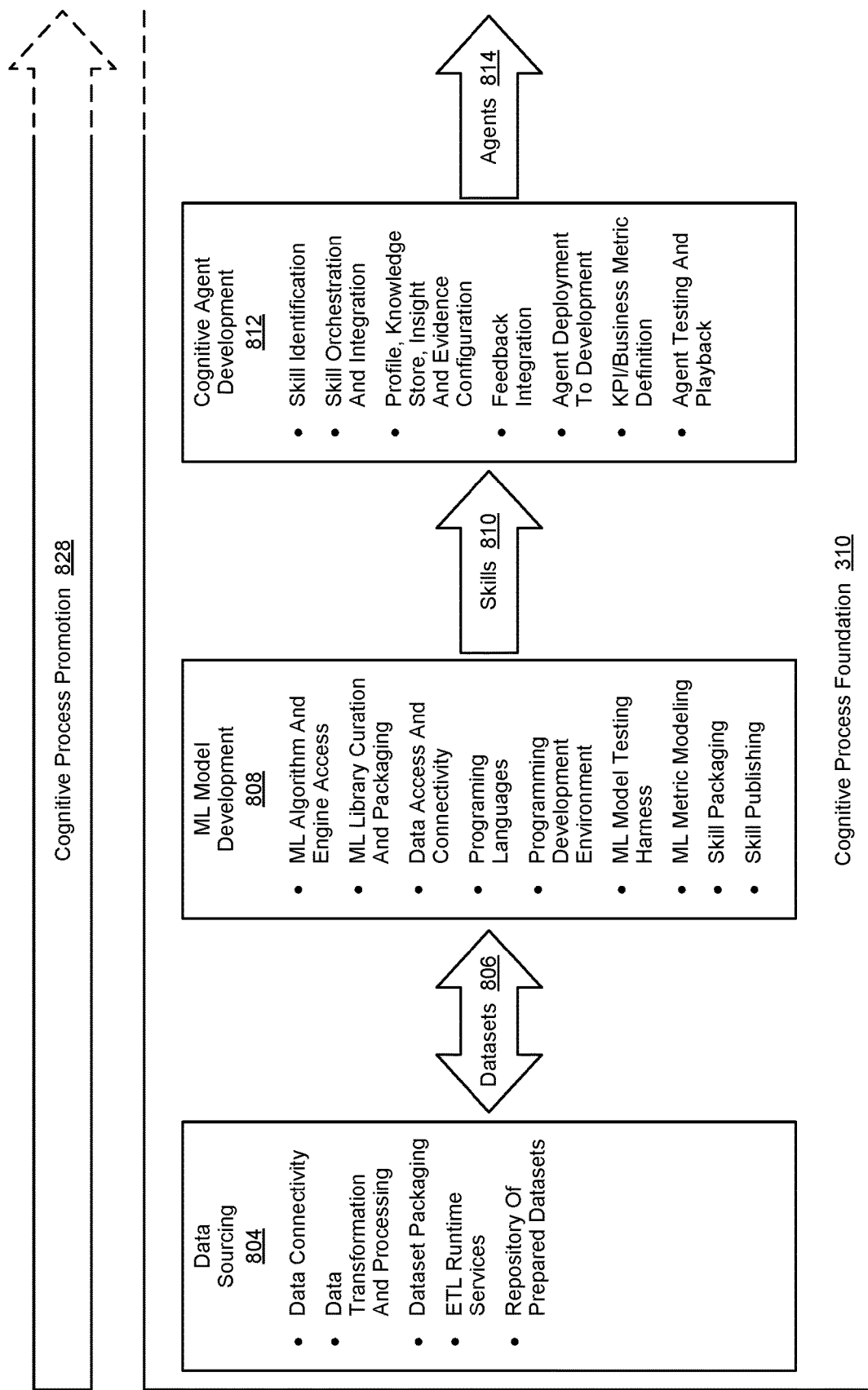
FIGS. 8a and 8b are a simplified process diagram showing the performance of cognitive process promotion operations.
Figure 8B:
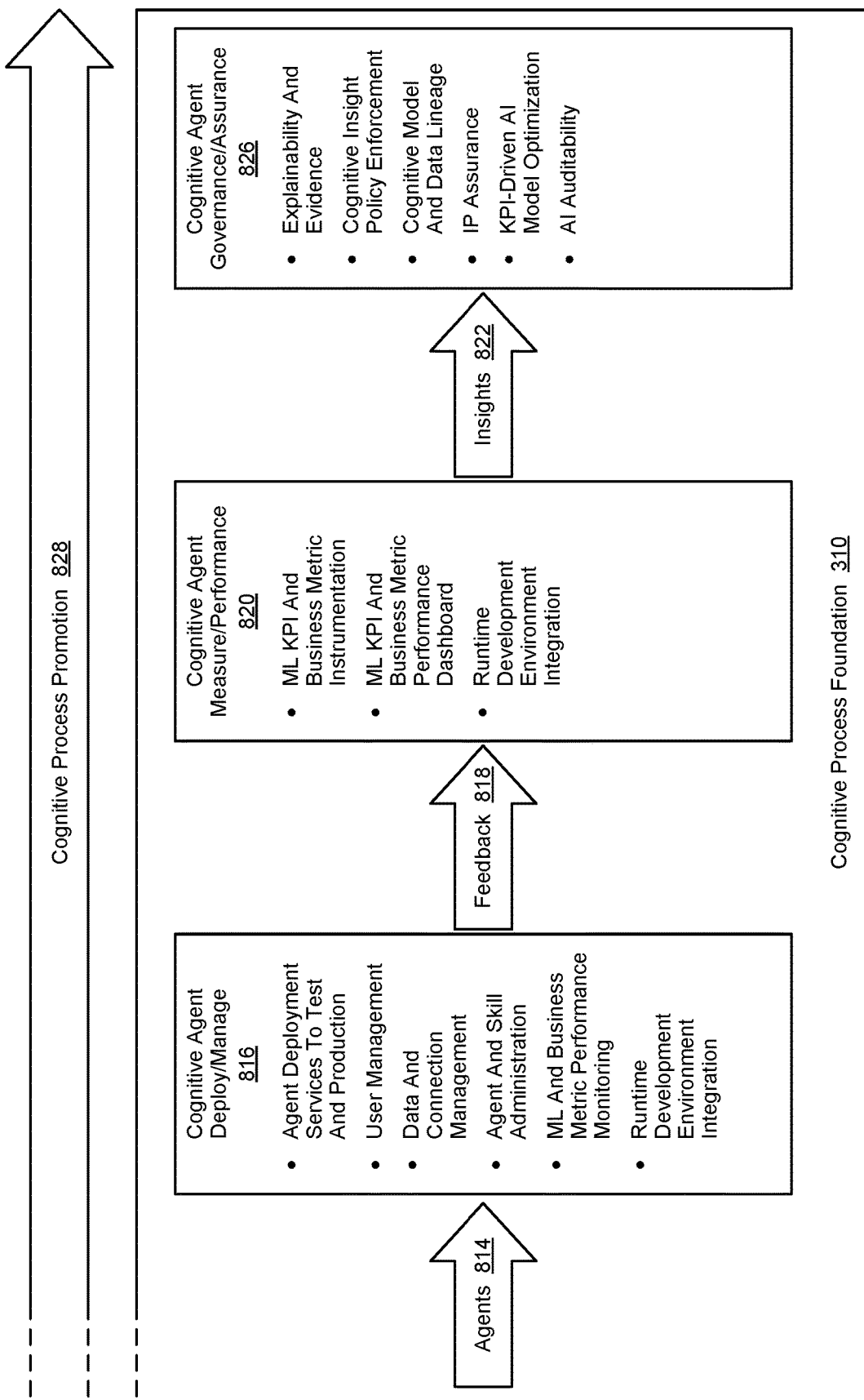

FIGS. 8*a* and 8*b* are a simplified process diagram showing the performance of cognitive process promotion operations implemented in accordance with an embodiment of the invention. In various embodiments, a cognitive process foundation 310, described in greater detail herein, may be implemented to perform certain cognitive process promotion 828 operations associated with promoting a particular cognitive process from one operating environment to another.

As shown in FIG. 8*a*, certain operations may be performed in a data sourcing 804 phase, which results in the generation various data sets 806, which are then used in a machine learning (ML) model development 808 phase. In turn, the resulting ML model may be incorporated into one or more cognitive skills 810, which are then used in a cognitive agent development 812 phase to generate various cognitive agents 814.

The resulting cognitive agents 814, as shown in FIG. 8*b*, may then be implemented in a cognitive agent deployment and management 816 phase, which results in certain feedback 818. In turn, the feedback 818 may be used in a cognitive agent measurement and performance 820 phase, which results in the generation of various cognitive insights 822. The resulting cognitive insights 822 may then be used in a cognitive agent governance and assurance 826 phase. In various embodiments, the cognitive agent governance and assurance 826 phase may be implemented to perform certain cognitive agent governance and assurance operations. In various embodiments, the cognitive agent governance and assurance 826 phase may be performed via a cognitive assurance agent.

In certain embodiments, the cognitive agent governance and assurance operations may include the provision of AIS explainability. As used herein and as it relates to AI assurance, AIS explainability broadly refers to transparently conveying to a user the structural and operational details of the ML model(s) used by an AIS, statistical and other descriptive properties of its associated training data, and various evaluation metrics from which its likely behavior may be inferred. In certain embodiments, the cognitive agent governance and assurance operations may include enforcement of a policy associated with the enforcement of a particular cognitive insight. In these embodiments, the particulars associated with the policy, and the method by which it is enforced, is a matter of design choice.

In certain embodiments, the cognitive agent governance and assurance operations may include governance of the creation, and use, of a particular cognitive model and the lineage of the data it may use. In these embodiments, the method by which the governance is defined, and the method by which it is enforced, is a matter of design choice. In certain embodiments, the cognitive agent governance and assurance operations may include providing assurance that intellectual property (IP) ownership rights are preserved. In certain embodiments, the IP may be associated with certain cognitive operations, cognitive processes, cognitive skills, cognitive agents, and cognitive insights, or a combination thereof.

In certain embodiments, the cognitive agent governance and assurance operations may include KPI-driven AI model optimization. In these embodiments, the definition of such KPIs, and the method by which they are used to optimize a particular AI model, is a matter of design choice. In certain embodiments, the cognitive agent governance and assurance operations may include the provisions of AI auditability. In certain embodiments, AI auditability may include the ability to provide explainability, and associated lineage, of how a particular cognitive operation, cognitive process, cognitive skill, cognitive agent, or cognitive insight, or a combination thereof, was generated and implemented. In these embodiments, the method by which the AI auditability is achieved is a matter of design choice.

Figure 9:
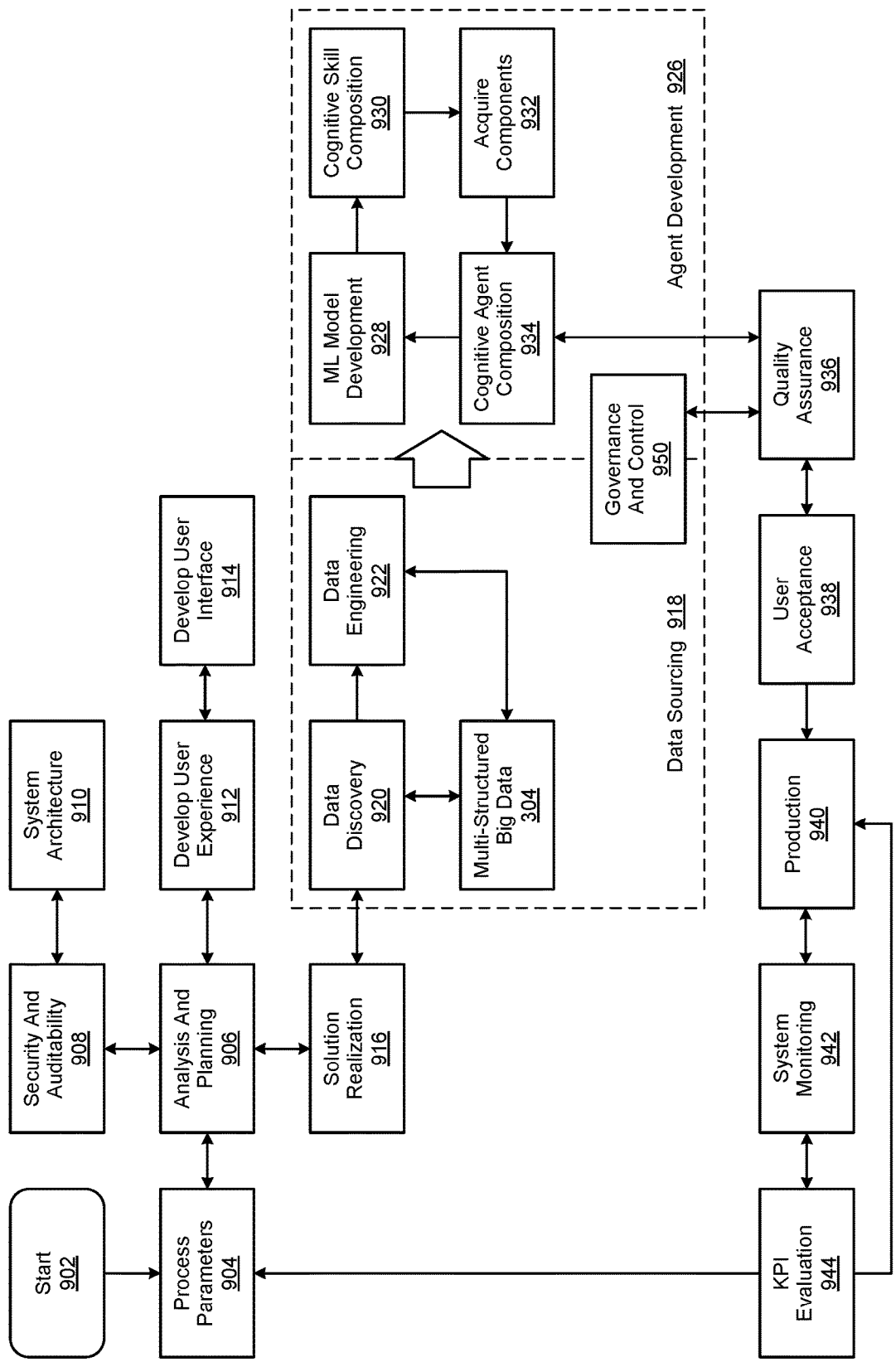
FIG. 9 is a simplified process diagram showing phases of a cognitive process lifecycle.
Figure 10A:
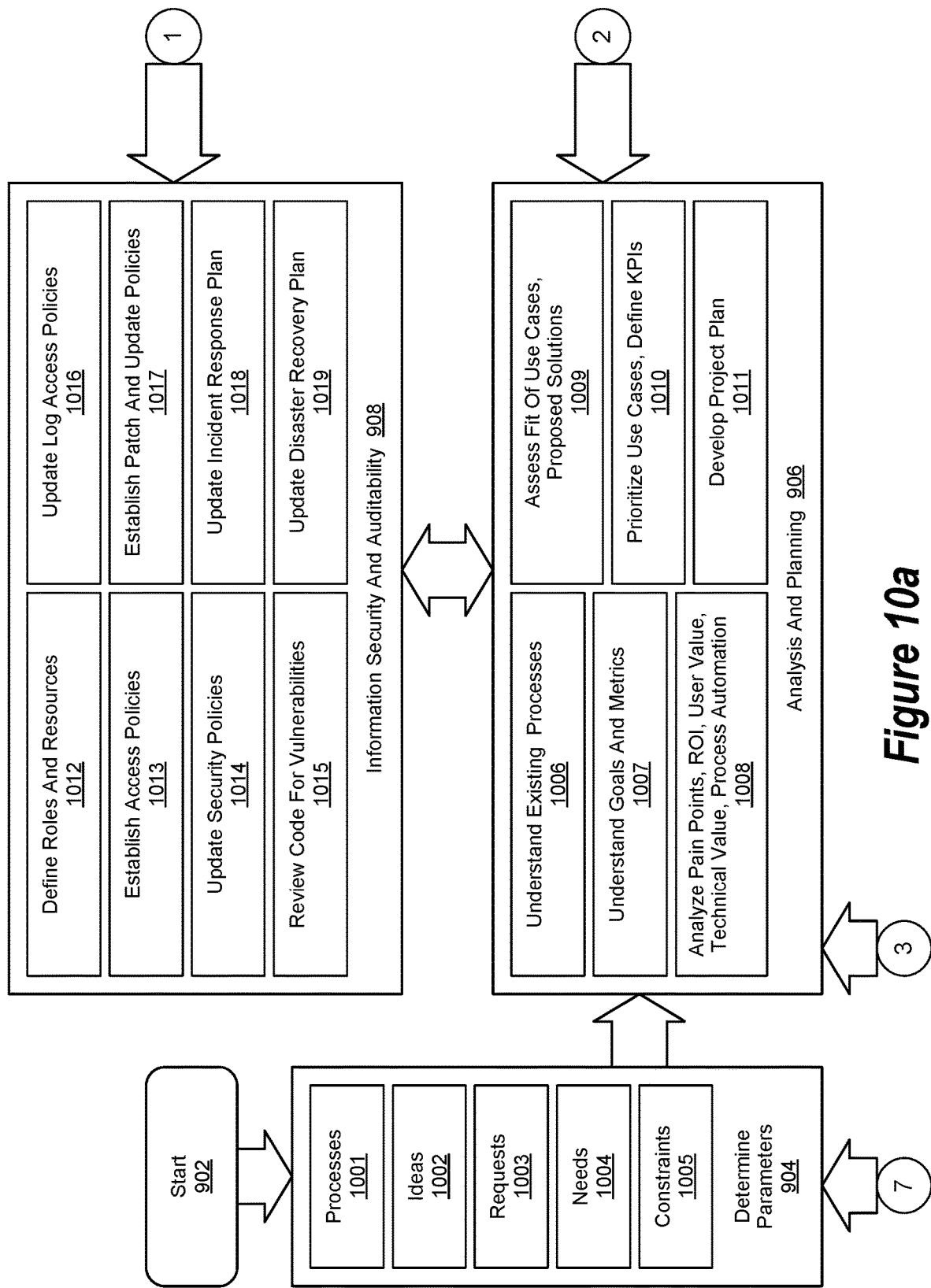
FIGS. 10a through 10f show operations performed in a cognitive process lifecycle.
Figure 10B:
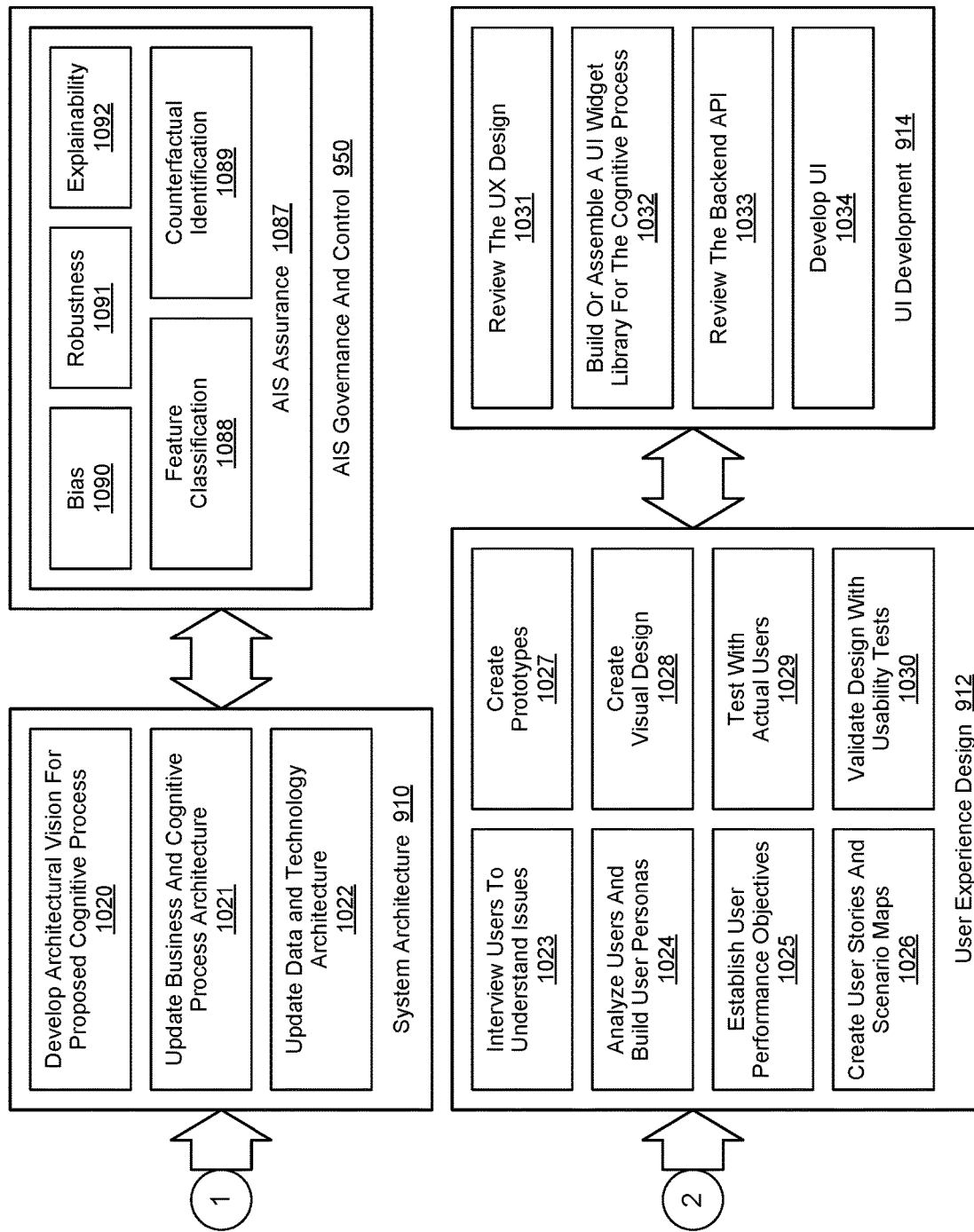
Figure 10C:
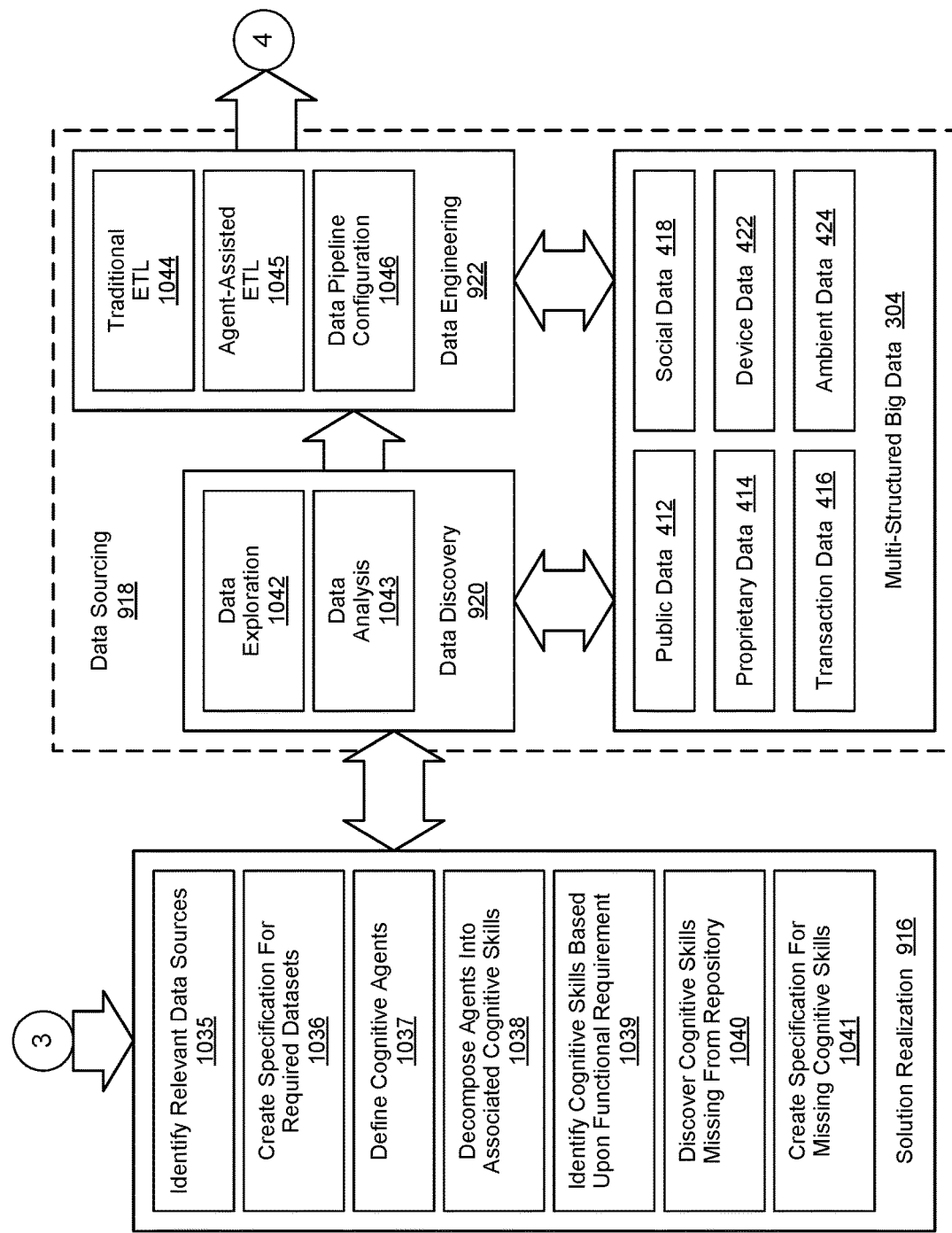
Figure 10D:
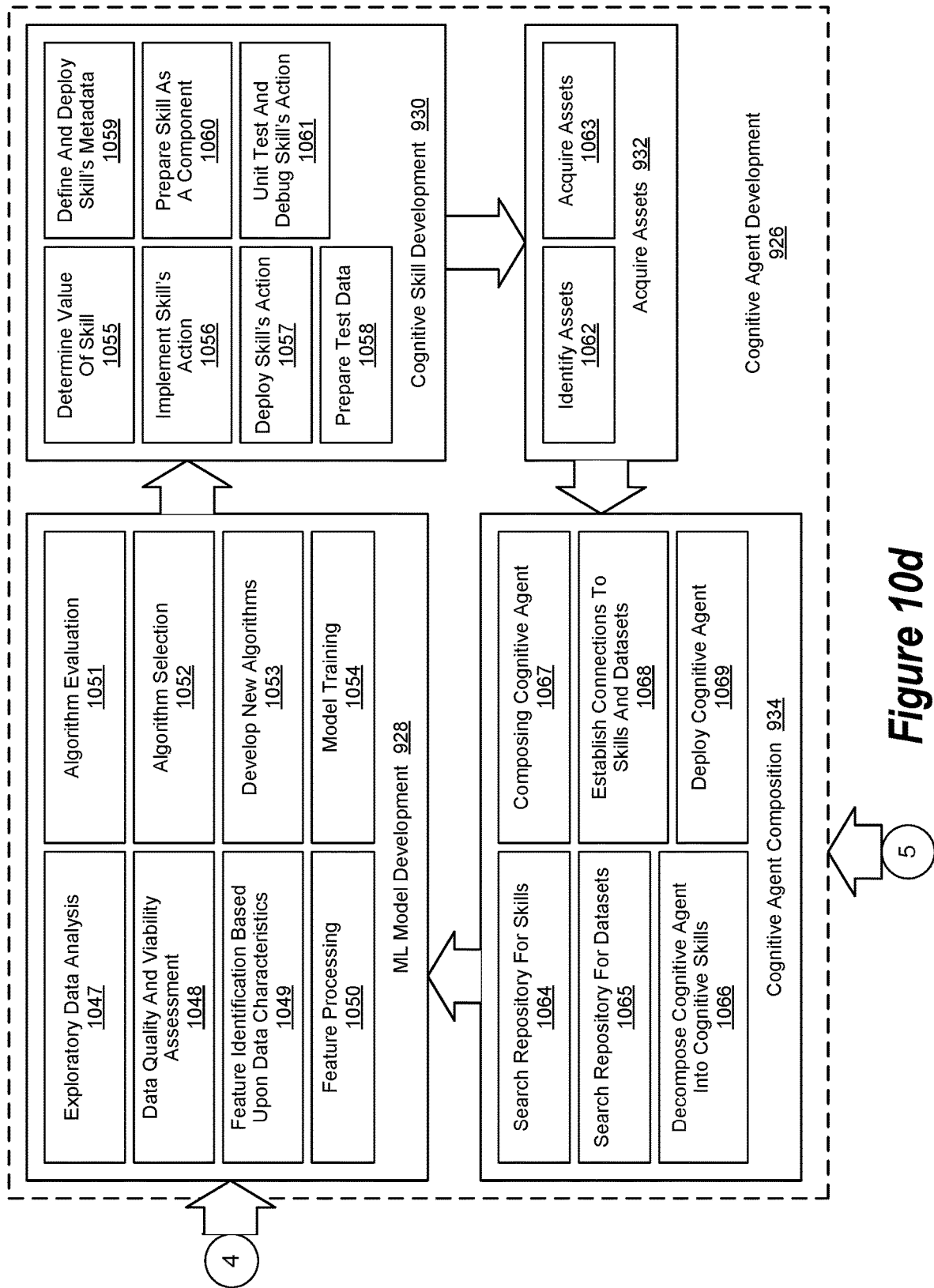
Figure 10E:
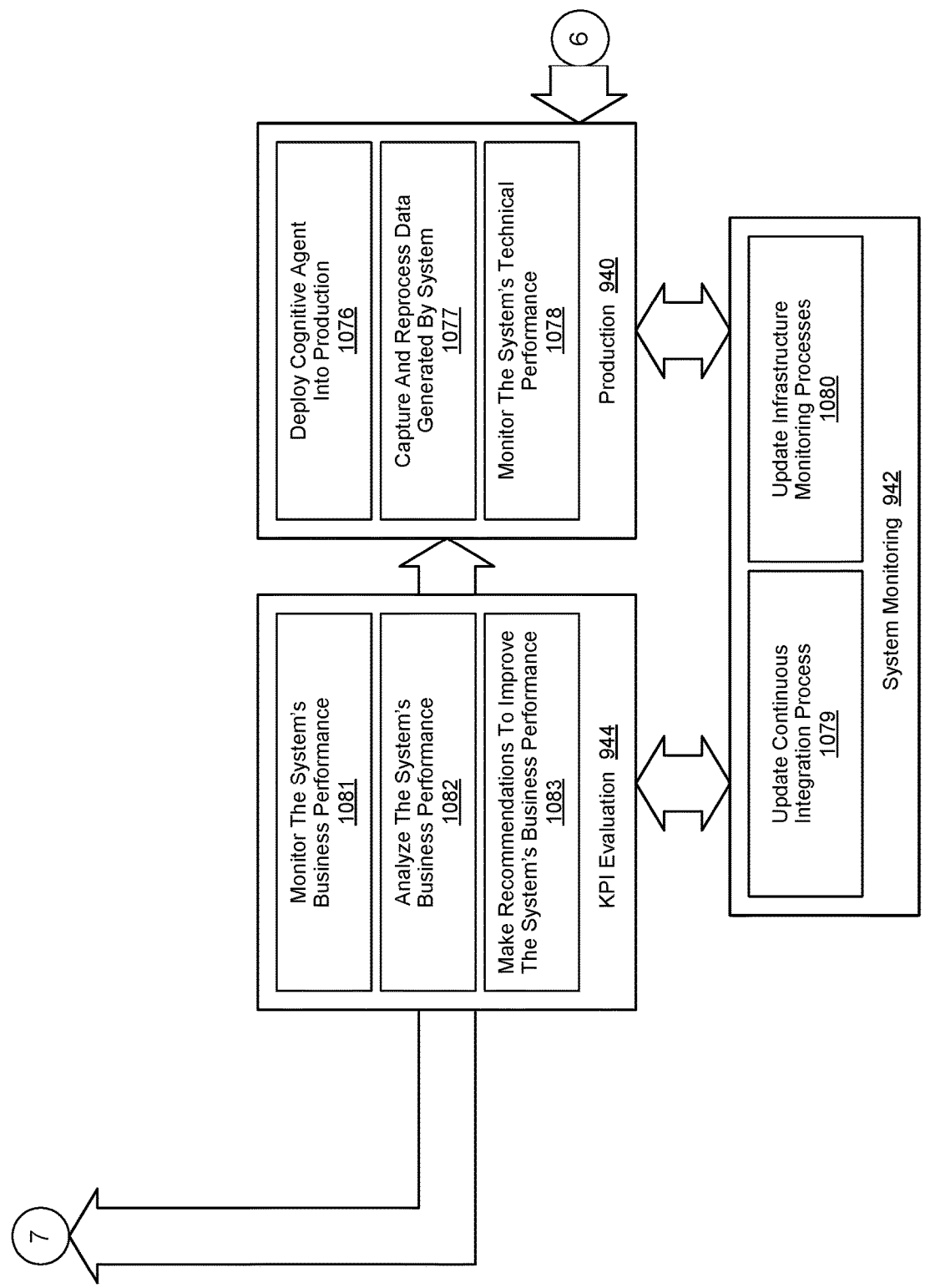
Figure 10F:
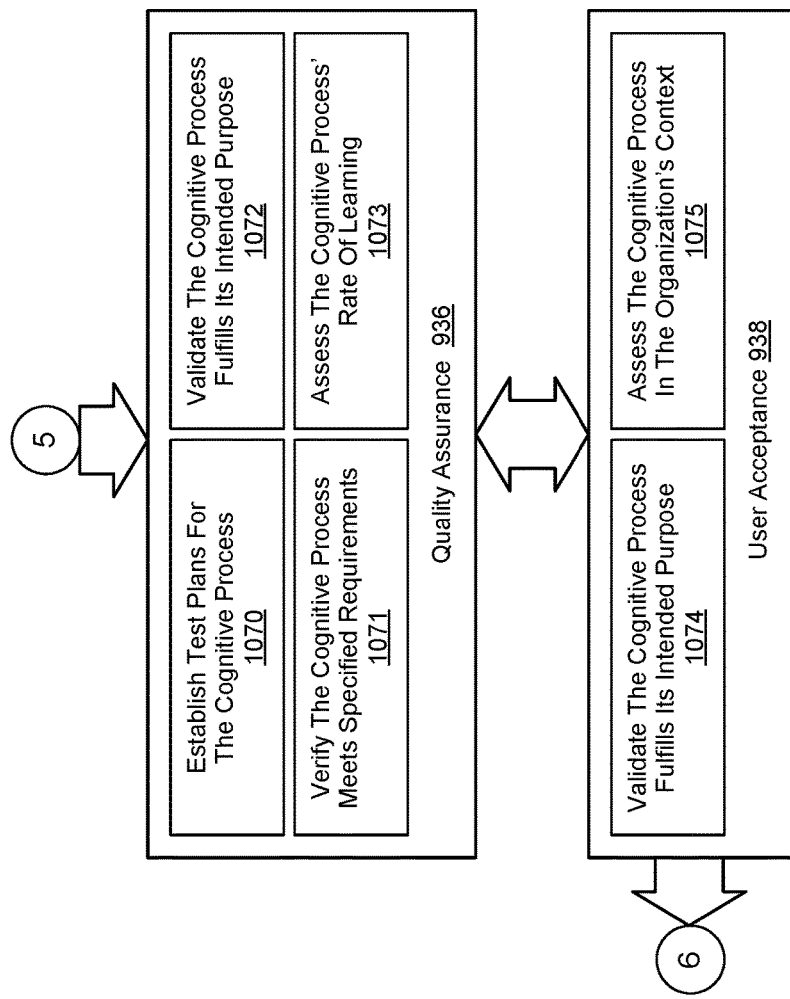

FIG. 9 is a simplified process diagram showing phases of a cognitive process lifecycle implemented in accordance with an embodiment of the invention. As used herein, a cognitive process lifecycle broadly refers to a series of phases, or individual operational steps, or a combination thereof, associated with a cognitive process, spanning its inception, development, implementation, testing, acceptance, production, revision, and eventual retirement. In certain embodiments, each phase or operational step of a cognitive process lifecycle may have associated input artifacts, roles or actors, and output artifacts.

As used herein, an input artifact broadly refers to an article of information used to perform an operation associated with completion of a certain phase, or performance of certain operational steps, of a cognitive process lifecycle. Examples of input artifacts include articles of information related to business and technical ideas, goals, needs, structures, processes, and requests. Other examples of input artifacts include articles of information related to market and technical constraints, system architectures, and use cases. Yet other examples of input artifacts include articles of information related to data sources, previously-developed technology components, and algorithms.

As likewise used herein, a role or actor broadly refers to a particular user, or certain functions they may perform, participating in certain phases or operational steps of a cognitive process lifecycle. Examples of roles or actors include business owners, analysts, and partners, user experience (UX) and user interface (UI) designers, and project managers, as well as solution, enterprise and business process architects, Other examples of roles or actors include data scientists, machine learning (ML) engineers, data, integration and software engineers, as well as system administrators.

An output artifact, as likewise used herein, broadly refers to an article of information resulting from the completion of a certain phase, or performance of certain operational steps, of a cognitive process lifecycle. Examples of output artifacts include Strength/Weaknesses/Opportunity/Threat (SWOT) analysis results, Key Performance Indicator (KPI) definitions, and project plans. Other examples of output artifacts include use case models and documents, cognitive application UX and UI designs, and project plans. Yet other examples of output artifacts include dataset, algorithm, machine learning (ML) model, cognitive skill, and cognitive agent specifications, as well as their corresponding datasets, algorithms, ML models, cognitive skills, and cognitive agents. Those of skill in the art will recognize that many examples of input artifacts, roles or actors, and output artifacts are possible. Accordingly, the foregoing is not intended to limit the spirit, scope or intent of the invention.

In this embodiment, a cognitive process lifecycle is begun in step 902, followed by determining certain operational and performance parameters related to an associated cognitive process in step 904. The resulting operational and performance parameters are then used in step 906 for use in various business analysis and planning purposes, described in greater detail herein. Information security and audibility issues associated with the cognitive process are then identified and addressed in step 908, followed by reviews of the existing system and cognitive architecture, and any resulting updates, being performed in step 910. Likewise, the user experience (UX) and one or more user interfaces (UIs) associated with the cognitive process are respectively developed in steps 912 and 914.

Thereafter, solution realization operations, described in greater detail herein, are performed in step 916 to identify requirements and generate specifications associated with data sourcing 918 and cognitive agent development 926 phases of the cognitive process lifecycle. Once solution realization operations are completed in step 916, data sourcing 918 operations are begun in step 920 with the performance of various data discovery operations, described in greater detail herein. In certain embodiments, the data discovery operations may be performed by accessing various multi-structured, big data 304 sources, likewise described in greater detail herein. Once the data discovery operations have been completed, then certain data engineering operations are performed in step 922 to prepare the sourced data for use in the cognitive agent development 926 phase. As used herein, data engineering refers to processes associated with data collection and analysis as well as validation of the sourced data. In various embodiments, the data engineering operations may be performed on certain of the multi-structured, big data 304 sources.

Once the data sourcing 918 phase has been completed, the cognitive agent development 926 phase is begun in step 928 with development of one or more machine learning (ML) models associated with the cognitive process. Any cognitive skills associated with the cognitive process that may not currently exist are composed in step 930. In certain embodiments, an ML model developed in step 928 may be used to compose a cognitive skill in step 930. Associated cognitive process components are then acquired in step 932 and used in step 934 to compose a cognitive agent. The foregoing steps in the cognitive agent development 926 phase are then iteratively repeated until all needed cognitive agents have been developed.

Once the cognitive agent development 926 phase has been completed, quality assurance and user acceptance operations associated with the cognitive process are respectively performed in step 936 and 938. The cognitive process is then promoted, as described in greater detail herein, into a production phase in step 940. Once the cognitive process is operating in a production phase, ongoing system monitoring operations are performed in step 942 to collect certain performance data. The performance data resulting from the monitoring operations performed in step 942 is then used in step 944 to perform various Key Performance Indicator (KPI) evaluation operations.

In turn, the results of the KPI evaluations are then used as feedback to improve the performance of the cognitive process. In certain embodiments, the results of the KPI evaluations may be provided as input in step 904 to determine additional operational and performance parameters related to the cognitive process. In certain embodiments, these additional operational and performance parameters may be used to repeat one or more steps associated with the lifecycle of the cognitive process to revise its functionality, improve its performance, or both.

FIGS. 10*a* through 10*f* show operations performed in a cognitive process lifecycle implemented in accordance with an embodiment of the invention. In this embodiment, a cognitive process lifecycle is begun in step 902, followed by determining certain operational and performance parameters related to an associated cognitive process in step 904. In certain embodiments, the operational and performance parameters determined in step 904 may include parameters related to business and technical processes 1001, ideas 1002, requests 1003, needs 1104, and constraints 1105, or a combination thereof.

In certain embodiments, the operational and performance parameters resulting from step 904 may then be used for various business analysis and planning purposes in step 906. In certain embodiments, the business and planning purposes may include understanding existing business and technical processes 1006. In certain embodiments, the business and planning purposes may include understanding business and technical goals and metrics 1007. In certain embodiments, the business and planning purposes may include analyzing business and technical pain points, return on investment (ROI), user value, technical value, and process automation, or a combination thereof 1008.

In certain embodiments, the business and planning purposes may include assessing business and technical fit of use cases and proposed solutions 1009. In certain embodiments, the business and planning purposes may include prioritizing use cases and defining Key Performance Indicators (KPIs) 1010. In certain embodiments, the business and planning purposes may include development of a project plan 1011.

In certain embodiments, information security and audibility issues associated with the cognitive process may be identified and addressed in step 908. In certain embodiments, the information security and auditability issues may include defining roles and resources 1012, establishing access policies 1013, updating security policies 1014, and reviewing code for vulnerabilities 1015, or a combination thereof. In certain embodiments, the information security and auditability issues may include updating log access policies 1016, establishing patch and update policies 1017, and updating incidence response 1018 and disaster recovery 1019 plans, or a combination thereof.

In certain embodiments, reviews of the existing system and cognitive architecture, and any resulting updates, may be performed in step 910. In certain embodiments, reviews of the existing system and cognitive architecture, and any resulting updates, may include developing an architectural vision for a proposed cognitive process 1020. In certain embodiments, reviews of the existing system and cognitive architecture, and any resulting updates, may include updating certain business and cognitive process architectures 1021. In certain embodiments, reviews of the existing system and cognitive architecture, and any resulting updates, may include updating certain data and technology architectures 1022.

In certain embodiments, the user experience (UX) and one or more user interfaces (UIs) associated with the cognitive process may be respectively developed in steps 912 and 914. In certain embodiments, development of the UX design may include interviewing user to understand issues 1023 associated with the cognitive process. In certain embodiments, development of the UX design may include analyzing users and building user personas 1024 associated with the cognitive process. In certain embodiments, development of the UX design may include establishing user performance objectives 1025 associated with the cognitive process.

In certain embodiments, development of the UX design may include creating user stories and scenario maps 1026 associated with the cognitive process. In certain embodiments, development of the UX design may include the creation of one or more visual designs 1027 associated with the cognitive process. In certain embodiments, development of the UX design may include testing UX designs associated with the cognitive process with actual users 1029. In certain embodiments, development of the UX design may include validating design of the UX associated with the cognitive process with usability tests 1030.

In certain embodiments, development of the UI may include reviewing the UX design 1031 associated with the cognitive process. In certain embodiments, development of the UI may include building or assembling a UI widget library 1032 associated with the cognitive process. In certain embodiments, development of the UI may include reviewing the backend Application Program Interface (API) associated with the cognitive process. In certain embodiments, development of the UI may include developing one or more UIs associated with the cognitive process.

In certain embodiments, solution realization operations may be performed in step 916 to identify requirements and generate specifications associated with data sourcing 918 and cognitive agent development 926 phases of the cognitive process lifecycle. In certain embodiments, the solution realization operations may include identification of data sources 1035 relevant to the cognitive process. In certain embodiments, the solution realization operations may include the creation of specifications for datasets 1036 required by the cognitive process. In certain embodiments, the solution realization operations may include the definition of various cognitive agents 1037 associated with the cognitive process.

In certain embodiments, the solution realization operations may include the decomposition of one or more cognitive agents into corresponding cognitive skills 1038 associated with the cognitive process. In certain embodiments, the solution realization operations may include identifying various cognitive skills based upon functional requirements 1039 associated with the cognitive process. In certain embodiments, the solution realization operations may include discovery of missing cognitive skills 1040 associated with the cognitive process. In certain embodiments, the solution realization operations may include creating specifications for missing cognitive skills 1041 associated with the cognitive process.

In certain embodiments, the data sourcing 918 phase may be initiated in step 920 with the performance of various data discovery operations. In certain embodiments, the data discovery operations may include various data exploration 1042 and data analysis 1043 operations, described in greater detail herein. In certain embodiments, the data discovery operations may be performed by accessing various multi-structured, big data 304 sources. In certain embodiments, as described in greater detail herein, the multi-structured big data 304 sources may include public data 412, proprietary data 414, transaction data 416, social data 418, device data 422, ambient data 424, or a combination thereof.

In various embodiments, once the data discovery operations have been completed, certain data engineering operations may be performed in step 922 to prepare the sourced data for use in the cognitive agent development 926 phase. In various embodiments, the data engineering operations may be performed on certain of the multi-structured, big data 304 sources. In certain embodiments, the data engineering operations may include traditional 1044 extract, transform, load (ETL) operations. In certain embodiments, the data engineering may include cognitive agent-assisted ETL 1045 operations. In certain embodiments, the data engineering operations may include data pipeline configuration 146 operations to skilled practitioners of the art.

In certain embodiments, once the data sourcing 918 phase has been completed, the cognitive agent development 926 phase may be initiated in step 928 with development of one or more machine learning (ML) models associated with the cognitive process. In various embodiments, operations associated with the ML model development may include exploratory data analysis 1047, data quality and viability assessment 1048, and feature identification based upon certain data characteristics, or a combination thereof. In certain embodiments, operations associated with the ML model development may include feature processing 1050, algorithm evaluation 1051 and assessment 1052, development of new algorithms 1053, and model training 1054, or a combination thereof.

In certain embodiments, any cognitive skills associated with the cognitive process that may not currently exist may then be developed in step 930. In certain embodiments, an ML model developed in step 928 may be used to develop a cognitive skill in step 930. In certain embodiments, operations associated with the development of a cognitive skill may include determining the value of a particular cognitive skill 1055, implementing one or more actions 1056 associated with a cognitive skill, and deploying a cognitive skill's action 1057, or a combination thereof. In various embodiments, operations associated with the development of a cognitive skill may include the preparation of certain test data 1058.

In certain embodiments, operations associated with the development of a cognitive skill may include defining and deploying a particular cognitive skill's metadata 1059. In certain embodiments, operations associated with the development of a cognitive skill may include preparing a particular cognitive skill as a cognitive process component 1060, described in greater detail herein. In certain embodiments, operations associated with the development of a cognitive skill may include unit testing and debugging 1061 one or more actions associated with a particular cognitive skill. In certain embodiments, operations associated with acquiring cognitive process components may then be performed in step 932. In certain embodiments, the operations may include identifying 1062 and acquiring 1063 one or more cognitive process components.

In certain embodiments, operations associated with composing a cognitive agent may then be performed in step 934. In certain embodiments, cognitive process components acquired in step 932 may be used to compose the cognitive agent. In certain embodiments, the operations associated with composing a cognitive agent may include searching a repository of cognitive process components for cognitive skills 1064 or datasets 1065 associated with the cognitive process.

In certain embodiments, the operations associated with composing a cognitive agent may include decomposing a cognitive agent into associated cognitive skills 1066. In certain embodiments, the operations associated with composing a cognitive agent may include composing a cognitive agent 1067, establishing connections to associated cognitive skills and data sets 1068, and deploying the cognitive agent 1069, or a combination thereof. In certain embodiments, the foregoing steps in the cognitive agent development 926 phase may then be iteratively repeated until all needed cognitive agents have been developed.

In certain embodiments, once the cognitive agent development 926 phase has been completed, quality assurance and user acceptance operations associated with the cognitive process are respectively performed in step 936 and 938. In certain embodiments, the quality assurance operations may include establishing test plans 1070 for the cognitive process. In certain embodiments, the quality assurance operations may include verifying the cognitive process meets specified requirements 1071 associated with the cognitive process.

In certain embodiments, the quality assurance operations may include validating the cognitive process fulfill its intended purpose 1072. In certain embodiments, the quality assurance operations may include assessing the cognitive process' rate of learning 1073. In certain embodiments, the use acceptance operations may include validating the cognitive process fulfills its intended purpose 1074. In certain embodiments, the user acceptance operations may include assessing the cognitive process in the context of the user's organization 1073.

In certain embodiments, the cognitive process is then promoted in step 940, as described in greater detail herein, into a production phase. In certain embodiments, operations associated with the production phase may include deploying one or more cognitive agents into production 1076. In certain embodiments, operations associated with the production phase may include capturing and reprocessing data generated by the system 1077. In certain embodiments, operations associated with the production phase may include monitoring the system's technical performance 1078.

In certain embodiments, once the cognitive process is operating in the production phase, ongoing system monitoring operations are performed in step 942 to collect certain performance data. In certain embodiments, the system monitoring operations may include updating a continuous integration process 1079. In certain embodiments, the system monitoring operations may include updating infrastructure monitoring processes 1080.

In certain embodiments, the performance data resulting from the monitoring operations performed in step 942 may them be used in step 944 to perform various Key Performance Indicator (KPI) evaluation operations. In certain embodiments, the KPI evaluation operations may include monitoring 1081 and analyzing 1082 the system's business performance. In certain embodiments, the KPI evaluation operations may include making recommendations to improve 1083 the systems business performance.

In certain embodiments, the results of the KPI evaluations may be used as feedback to improve the performance of the cognitive process in the production 940 phase. In certain embodiments, the results of the KPI evaluations may be provided as input in step 904 to determine additional operational and performance parameters related to the cognitive process. In certain embodiments, these additional operational and performance parameters may be used to repeat one or more steps associated with the lifecycle of the cognitive process to revise its functionality, improve its performance, or both.

Figure 11A:
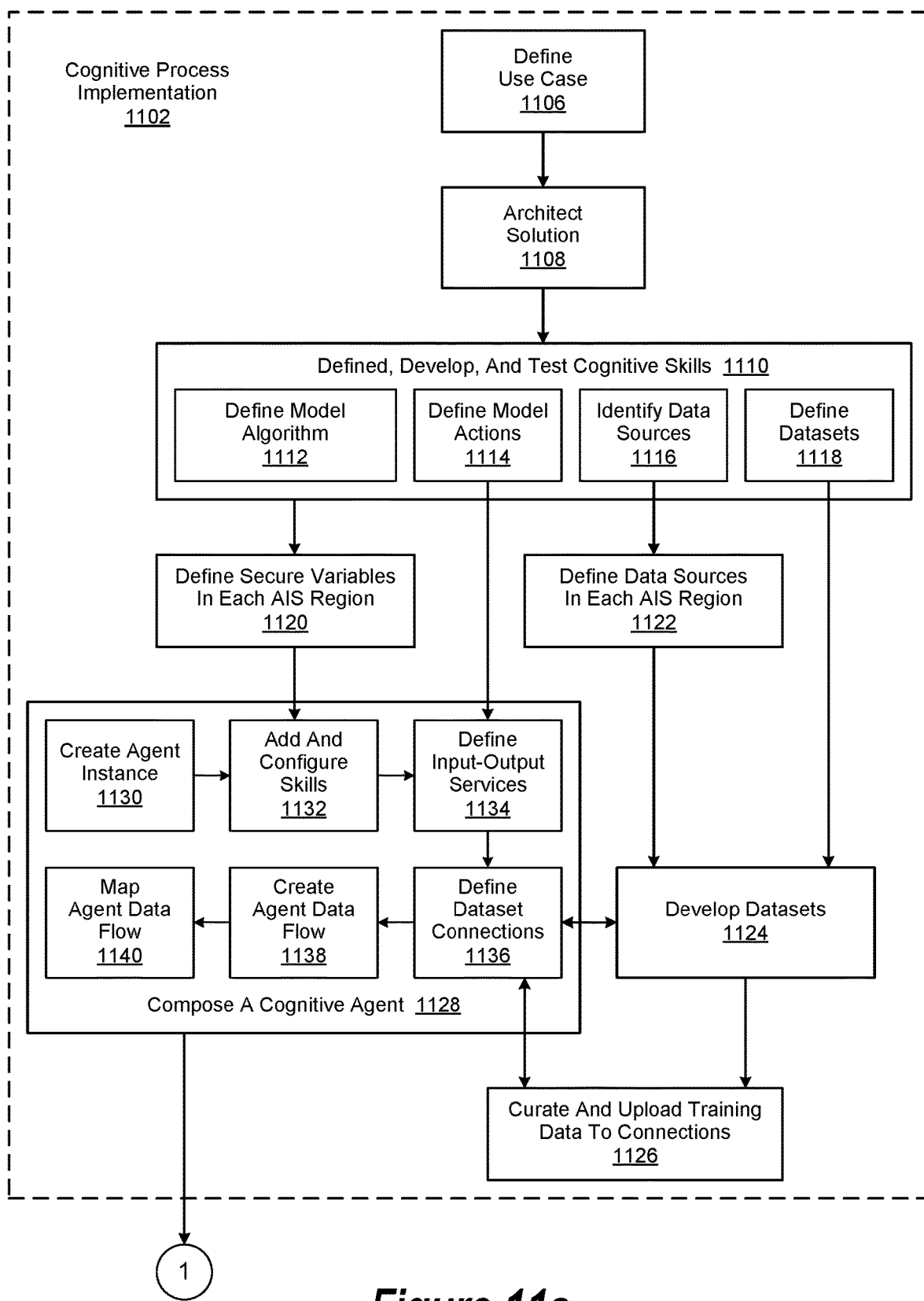
FIG. 11a and 11b are a simplified process flow showing the lifecycle of cognitive agents implemented to perform AIS operations.
Figure 11B:
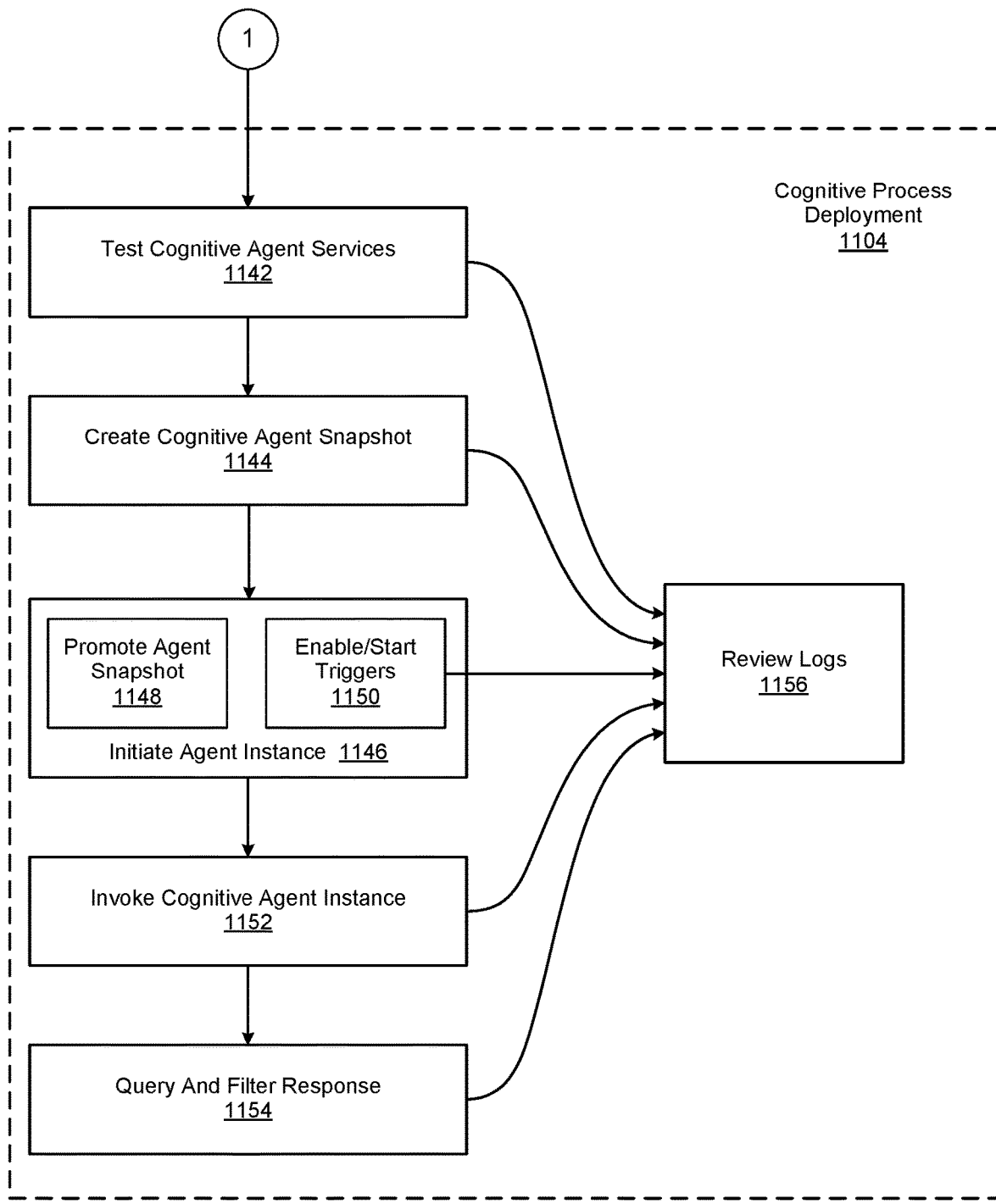

FIGS. 11a and 11b are a simplified process flow showing the lifecycle of augmented intelligence agents implemented in accordance with an embodiment of the invention to perform augmented intelligence system (AIS) operations. In certain embodiments, a cognitive agent lifecycle may include a cognitive agent composition 1102 phase and a cognitive agent confirmation 1104 phase. In certain embodiments, the cognitive agent composition 1102 phase may be initiated with the definition of a cognitive process use case in step 1106, followed by architecting an associated solution in step 1108.

One or more cognitive skills associated with the architected solution are then defined, developed and tested in step 1110. In certain embodiments, a machine learning (ML) model associated with the architected solution is defined in step 1112. In certain embodiment, cognitive actions, described in greater detail herein, are defined for the ML model in step 1114. In certain embodiments, data sources for the architected solution are identified in step 1116 and corresponding datasets are defined in step 1118.

The ML model definitions defined in step 1112 are then used in step 1120 to define variables that need to be secured in the implementation of each associated AIS region, described in greater detail herein. Likewise, the data sources identified in step 1116 are used in step 1122 to define data sources corresponding to each associated AIS region. Thereafter, the data sources defined in step 1122 and the datasets defined in step 1118 are used in step 1124 to define datasets that will be used to compose a cognitive agent in step 1128. Once the datasets have been developed in in step 1124, they are used to curate and upload training data to associated data source connections in step 1126.

Cognitive agent compositions operations are then initiated in step 1128 by creating a cognitive agent instance in step 1130. Once created, the secured variables defined in step 1120 are added to one or more cognitive skills, which in turn are configured in step 1132. The ML model actions defined in step 914 are then used in step 1134 to define input and output services for the one or more cognitive skills configured in step 1132. Thereafter, the datasets developed in step 1124 are used in step 1136, along with the training data curated and uploaded in step 1126 to define dataset connections. A dataflow is then created for the cognitive agent in step 1138 and mapped in step 1140.

The cognitive agent confirmation 1104 phase is then initiated in step 1142 by testing various service associated with the cognitive agent composed in step 1128. Thereafter, a cognitive agent snapshot 1144, described in greater detail herein, is then created in step 1144. In certain embodiments, the cognitive agent snapshot 1144 may include versioning and other descriptive information associated with the cognitive agent.

An instance of the cognitive agent is then initiated in step 1146. In certain embodiments, initiation of the cognitive agent may include promoting a snapshot of the cognitive agent in step 1148 and enabling start and stop triggers in step 1150. The instance of the cognitive agent that was initiated in step 1146 is then invoked for execution in step 1152, followed by performing queries and filtering associated responses in step 1154. In certain embodiments, log entries corresponding to the operations performed in step 1142 through 1154 are reviewed in step 1156.

Figure 12:
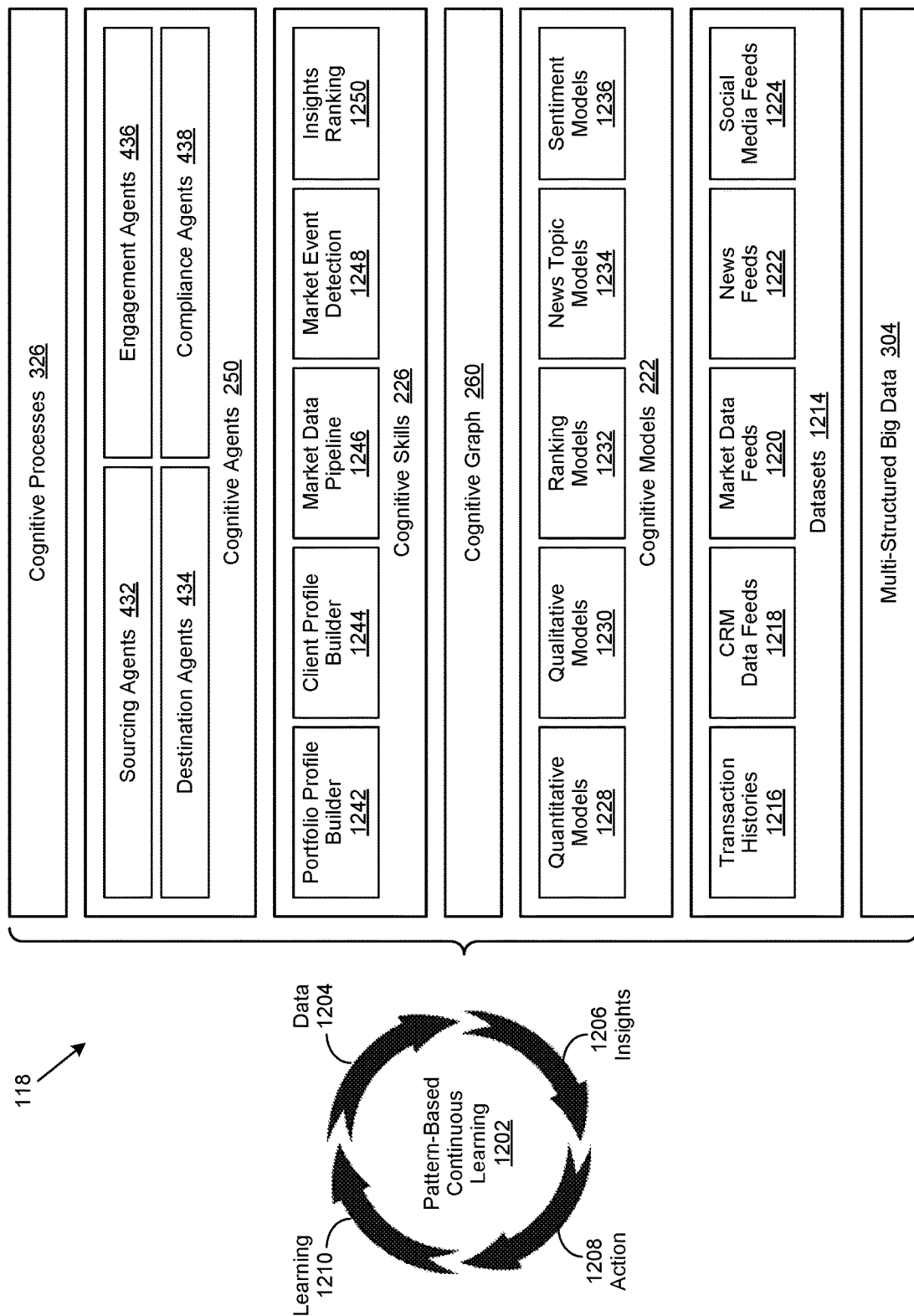
FIG. 12 is a simplified block diagram of an AIS used to perform pattern-based continuous learning operations.

FIG. 12 is a simplified block diagram of an augmented intelligence system (AIS) implemented in accordance with an embodiment of the invention to perform pattern-based continuous learning operations. In certain embodiments, the pattern-based continuous learning operations 1202 may include a data ingestion and processing 1204 phase, followed by the performance of certain cognitive processes, described in greater detail, during a cognitive insights 1206 phase. In certain embodiments, the cognitive insight 1206 phase is followed by a cognitive action 1208 phase, which in turn is followed by a cognitive learning 1210 phase. In certain embodiments, the process is continued, proceeding with the data ingestion and processing 1204 phase.

In certain embodiments, multi-structured big data sources 304 may be dynamically ingested during the data ingestion and processing 1204 phase. In certain embodiments, based upon a particular context, extraction, parsing, and tagging operations are performed on language, text and images they contain to generate associated datasets 1214. In certain embodiments, the resulting datasets may include various transaction histories 1216, customer relationship management (CRM) feeds 1218, market data feeds 1220, news feeds 1222, social media feeds 1224, and so forth.

In certain embodiments automated feature extraction and modeling operations may be performed on the datasets 1214 to generate one or more cognitive models 222, described in greater detail herein. In certain embodiments, the cognitive models 222 may include quantitative 1228 models, qualitative 1230 models, ranking 1232 models, news topic 1234 models, sentiment 1236 models, and so forth. In various embodiments, the resulting cognitive models may be implemented to map certain datasets 1214 to a cognitive graph 260, described in greater detail herein.

In various embodiments, the cognitive models 222 and the datasets 1214 mapped to the cognitive graph 260 may be used in the composition of certain cognitive skills 226, as likewise described in greater detail herein. In certain embodiments, the cognitive skills 226 may include a portfolio profile builder 1242 skill, a client profile builder 1244 skill, a market data pipeline 1246 skill, a market event detection 1248 skill, a cognitive insights ranking 1250 skill, and so forth. As likewise described in greater detail herein, the resulting cognitive skills 226 may then be used in various embodiments to generate certain cognitive agents 250. In certain embodiments, the resulting cognitive agents 250 may include sourcing 432 agents, destination 434 agents, engagement 436 agents, compliance 438 agents, and so forth.

In certain embodiments, the sourcing 432 agent may be implemented to source various multi-structured big data 304 sources, described in greater detail herein. In certain embodiments, the sourcing 432 agent may include a batch upload agent, an Application Program Interface (API) connectors agent, a real-time streams agent, a Structured Query Language (SQL)/Not Only SQL (NoSQL) databases agent, a message engines agent, a transaction sourcing agent, or some combination thereof. Skilled practitioners of the art will recognize that many such examples of sourcing 432 agents are possible. Accordingly, the foregoing is not intended to limit the spirit, scope or intent of the invention.

In certain embodiments, the resulting cognitive agents 250 may be implemented during the cognitive insights 1206 phase, as described in greater detail herein, to perform various cognitive processes 326. In various embodiments, the performance of certain cognitive processes 326 may result in the generation of one or more cognitive insights. In various embodiments, the cognitive insights may include the provision of certain actionable recommendations and notifications to a user during the cognitive action 1208 phase. In various embodiments, certain features from newly-observed data may be automatically extracted from user feedback during the learning 1010 phase to improve various cognitive models 222.

As an example, a first query from a user may be submitted to the AIS 118 system during the cognitive insights 1206 phase, which results in the generation of a first cognitive insight, which is then provided to the user. In response, the user may respond by providing a first response, or perhaps a second query, either of which is provided in the same context as the first query. The AIS 118 receives the first response or second query, performs various AIS 118 operations, and provides the user a second cognitive insight. As before, the user may respond with a second response or a third query, again in the context of the first query. Once again, the AIS 118 performs various AIS 118 operations and provides the user a third cognitive insight, and so forth. In this example, the provision of cognitive insights to the user, and their various associated responses, results in a stateful dialog that evolves over time.

Figure 13:
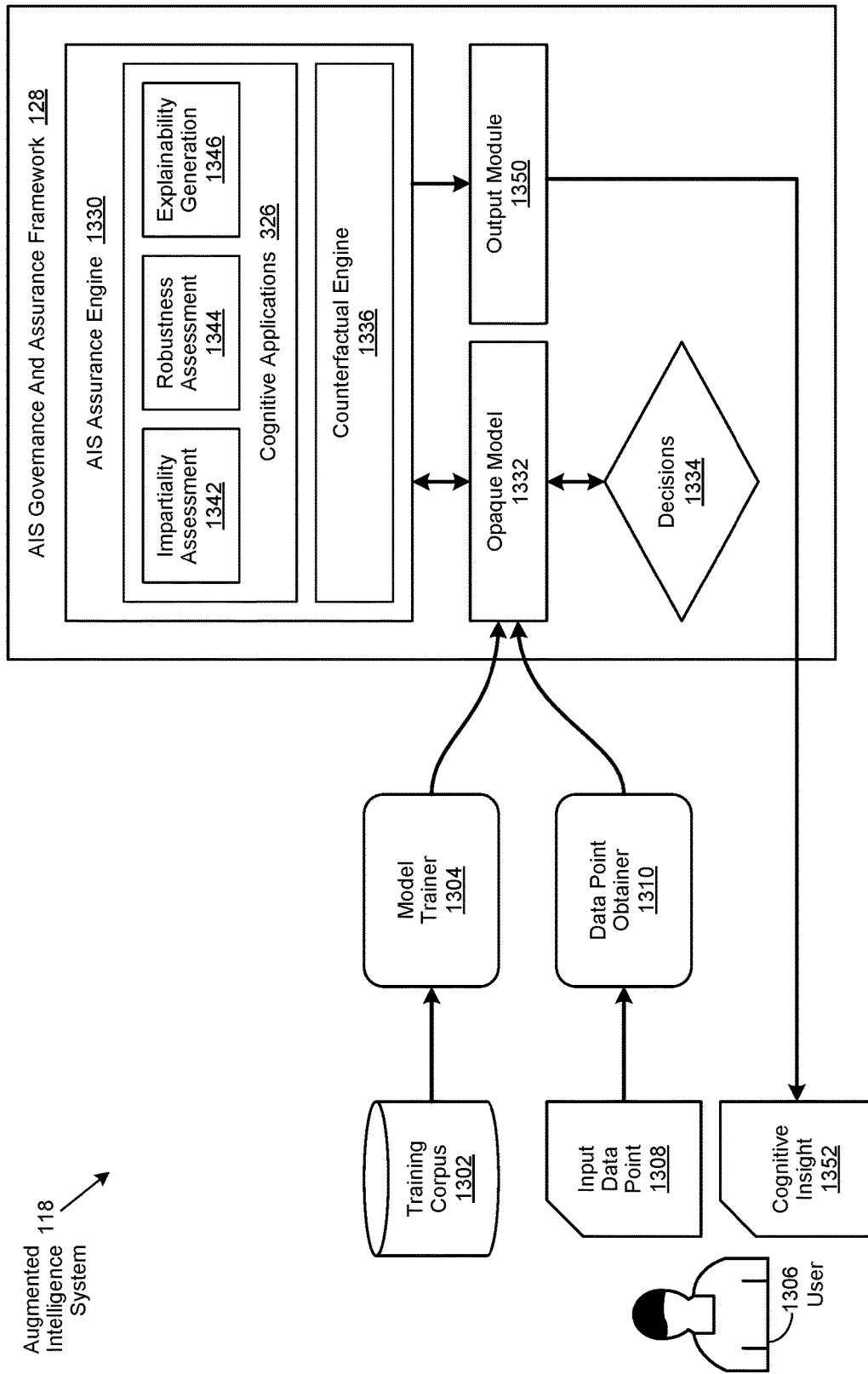
FIG. 13 is a simplified block diagram of components associated with an AIS governance and control framework implemented to provide AIS assurance.

FIG. 13 is a simplified block diagram of components associated with the operation of an augmented intelligence system (AIS) governance and assurance framework implemented in accordance with an embodiment of the invention to provide AIS assurance. Certain embodiments of the invention reflect an appreciation that the practices and processes associated with AI assurance, described in greater detail herein, ideally provide an effective framework for the management of AI bias, robustness, and explainability. AI bias, as used herein, broadly refers to an outcome of a cognitive computing operation deviating from a standard resulting in disproportionate favor of or against one concept, thing, action, decision, person, or group compared with another, usually in a way considered to be prejudicial, discriminatory or inequitable.

Certain embodiments of the invention likewise reflect an appreciation that such deviation may take many forms. For example, the deviation may take the form of statistical bias, in which an estimate deviates from a statistical standard or a true population value. As another example, the deviation may take the form of a judgement, decision, or action that diverges from a moral norm. As yet another example, the deviation may take the form of disregard or avoidance of regulatory or legal statutes. As yet still another example, the deviation may take the form of cultural, racial, gender, physiological, psychological, geographical, and socioeconomic prejudices. Those of skill in the art will recognize that many types of bias and associated deviation are possible. Accordingly, the foregoing is not intended to limit the spirit, scope or intent of the invention.

Certain embodiments of the invention reflect an appreciation that the occurrence of AI bias may result in a disparate impact upon the outcome of an associated cognitive computing operation. Certain embodiments of the invention likewise reflect an appreciation that AI bias may not be intentional. Likewise, certain embodiments of the invention reflect an appreciation that AI bias may be inherent in data used to train machine learning models. Furthermore, certain embodiments of the invention reflect an appreciation that the determination of whether the outcome of a particular cognitive computing operation constitutes AI bias may be subjective. Accordingly, such determination, and the degree to which a particular outcome embodies AI bias, is a matter of design choice.

As used herein, machine learning (ML) broadly refers to a class of learning algorithms that include artificial neural networks, decision trees, support vector machines, and so forth. Skilled practitioners of the art will be aware that such algorithms are able to learn from examples and can typically improve their performance by processing more data over time. Those of skill in the art will likewise be aware that the data used to train a learning algorithm may include a variety of unstructured data forms including free-form text, spoken language, images, and so forth.

As likewise used herein, an ML model is a mathematical representation of a real-world process that can be facilitated by a cognitive computing operation. Skilled practitioners of the art will likewise be aware an ML model is typically generated by providing certain training data to one or more learning algorithms associated with the model. In turn, the learning algorithm finds patterns in the training data such that certain input parameters correspond to a particular target. The output of the training process is an ML model which can then be used to make predictions. In certain embodiments, the training data may provide the basis for the learning algorithm to provide recommendations, perform medical diagnoses, make investment decisions, allow autonomous vehicles to recognize stop signs, and so forth.

Certain embodiments of the invention reflect an appreciation that machine learning is a statistical approach to AI, and as such, may be difficult to interpret and validate. Furthermore, certain embodiments likewise reflect an appreciation that automated learning operations that use inherently biased data will likely lead to biased results. Accordingly, various embodiments of the invention reflect an appreciation that AI bias may unintentionally be inherent in the design of certain ML models used to perform a cognitive computing operation.

Likewise, certain embodiments of the invention reflect an appreciation that artificial agents used in the performance of a cognitive computing operation, described in greater detail herein, may impose systematic disadvantages on subgroups based upon patterns learned via procedures that appear reasonable and nondiscriminatory on face value. Furthermore, certain embodiments of the invention reflect an appreciation that artificial agents may paradoxically learn autonomously from human-derived data, which may in turn result in inadvertently learned human biases, whether good or bad. Moreover, certain embodiments of the invention reflect an appreciation that while autonomous systems, such as an AIS 118, might be regarded as neutral or impartial, they may nonetheless employ biased algorithms that result in significant harm that could go unnoticed and uncorrected, possibly until it is too late.

As likewise used herein, and as it relates to AI assurance, AI robustness broadly refers to the ability of an ML model to withstand, and overcome, perturbations that may have an adverse effect on its intended operation. Certain embodiments of the invention reflect an appreciation that there is an inherent level of risk, unpredictability, and volatility in real-world settings where AI systems, such as an AIS 118, operate. Accordingly, certain embodiments of the invention likewise reflect an appreciation that ML models typically used by such systems need to be resilient to unforeseen events and adversarial attacks that can result in damage or manipulation. Likewise, certain embodiments of the invention reflect an appreciation that various approaches to achieving AI robustness may include avoiding known risks, self-stabilization, and graceful degradation.

Certain embodiments of the invention likewise reflect an appreciation that examples of challenges to AI robustness include distributional shift, adversarial inputs, and unsafe exploration. Likewise, certain embodiments of the invention reflect an appreciation that ML models are prone to various attacks and threats. For example, deep learning models are known to have performed well when performing image recognition tasks. However, it is also known that such models are prone to adversarial attacks. To continue the example, two images may look essentially the same to a human, but when presented to a model, they may produce different outcomes. In this example, the two images are input data points that may vary slightly, and as such, represent an adversarial attack. Accordingly, while the differences in the two images may seem indistinguishable to a human, they may be different enough to an ML model to result in different outcomes.

Likewise, AI explainability, as used herein and as it relates to AI assurance, broadly refers to transparently conveying to a user the structural and operational details of the ML model(s) used by an AIS, statistical and other descriptive properties of its associated training data, and various evaluation metrics from which its likely behavior may be inferred. Certain embodiments of the invention reflect an appreciation that as AI approaches become more sophisticated, decisions are increasingly being made by ML models whose design, and the rationale of its decision making processes, are opaque to the user. Certain embodiments of the invention likewise reflect an appreciation that the opaqueness of such ML models hinders AI explainability, and by extension, undermines a user's trust of the outcomes it produces. Accordingly, certain embodiments of the invention reflect an appreciation that AI explainability ideally provides a user interpretable insight into how and why an ML model performed certain actions or arrived at a particular decision.

Certain embodiments of the invention reflect an appreciation that many AI applications use ML models that essentially operate as black boxes, offering little if any discernible insight into how they reach their outcomes. Certain embodiments of the invention likewise reflect an appreciation that such opaque operation may be suitable for modest or fairly inconsequential decisions, such as recommending apparel to wear or a movie to view. However, certain embodiments of the invention likewise reflect an appreciation that a user's trust in an opaque ML model begins to diminish when the decision is related to something more complex or important, such as recommendations for healthcare or financial investments. As an example, how many users would trust an opaque ML model's diagnosis rather than a physician's without some degree of clarity regarding how the model arrived at its recommendation? In this example, the model's diagnosis may in fact be more accurate.

However, lack of explainability may lead to a lack of trust. Accordingly, certain embodiments of the invention reflect an appreciation that AI explainability can assist in making a black box ML model's decision making process less opaque in a way that is comprehensible to humans. As used herein, as it relates to a black box ML model's decision making process, less opaque broadly refers to providing sufficient visibility into the method by which a particular decision was made, the factors contributing to the decision, and their respective effect on the decision, such that a user can understand how and why the decision was made. Certain embodiments of the invention reflect an appreciation that the extent of, or degree of detail, such visibility may need to be provided may vary according to the particular needs of the user, the complexity of the decision, the context of the decision, or a combination thereof. Accordingly, the extent of such visibility, and the method by which it is generated and provided, is a matter of design choice.

Referring now to FIG. 13, an AIS 118 may be implemented in certain embodiments to include an AIS governance and assurance framework 128. In certain embodiments, the AIS governance and assurance framework 128 may in turn be implemented to include an AIS assurance engine 1330, an opaque model 1332, and an output module 1350. In various embodiments, the AIS assurance engine 1330 may be implemented to include a counterfactual engine 1336, and certain cognitive applications 326. In certain embodiments, the opaque model 1332 may be variously implemented as an opaque ML model, an opaque cognitive model, an opaque classifier, black box ML model, a black box classifier, and so forth. Skilled practitioners of the art will recognize that many such embodiments of an opaque model 1332 are possible. Accordingly, the foregoing is not intended to limit the spirit, scope or intent of the invention. In certain embodiments, the counterfactual engine 1336 may be implemented as a Counterfactual Explanations for Robustness, Transparency, Interpretability, and Fairness of Artificial Intelligence (CERTIFAI) tool.

In certain embodiments, the AIS assurance engine 1330 may be implemented to perform an AIS assurance operation. In certain embodiments, the AIS assurance operation may include the performance of an AIS impartiality assessment operation, an AIS robustness assessment operation, an AIS explainability operation, an AIS explainability with recourse operation, or a combination thereof, as described in greater detail herein. In certain embodiments, the AIS assurance operation may be performed on a service provider server, described in greater detail herein. In certain embodiments, performance of the AIS assurance operation may be provided as an AIS assurance service.

In certain embodiments, the AIS assurance service may be referred to as AIS Trust as a Service. Certain embodiments of the invention reflect an appreciation that trust, as it relates to a an AIS 118 used to generate a particular decision 1334, may be subjective. However, certain embodiments of the invention likewise reflect an appreciation that the performance of an AIS assurance operation, whether provided as AIS trust as a service or in some other form, may contribute to establishing, and reinforcing, a user's 1306 trust in the decisions 1334 generated by an opaque model 1332.

In various embodiments, the AIS assurance engine 1330 may be implemented as a foundation layer, described in greater detail herein, for certain cognitive applications 326. In certain embodiments, the cognitive applications 326 may be implemented to include an AIS impartiality assessment 1342 engine, an AIS robustness assessment 1344 engine, and an AIS explainability generation 1346 engine, or a combination thereof. In certain embodiments, the AIS impartiality assessment 1342 engine may be implemented to perform an AIS impartiality assessment operation. In certain embodiments, the AIS impartiality assessment operation may be performed to detect the presence of bias in a particular ML model, such as the opaque model 1332, and if detected, assess its effect on the outcome of an associated cognitive computing operation.

In certain embodiments, the AIS robustness assessment 1344 module may be implemented to perform an AIS robustness assessment operation. In certain embodiments, the AIS robustness assessment operation may be performed to assess the robustness of a particular ML model, such as the opaque model 1332. In certain embodiments, the AIS explainability generation 1346 module may be implemented to perform an AIS explainability operation. In certain embodiments, the AIS explainability operation may be performed to provide a user interpretable insight into how and why a particular ML model, such as the opaque model 1332, performed certain actions or arrived at a particular decision 1334. In certain embodiments, the decision 1334 may be implemented as a classification, a determination, a conclusion, a prediction, an outcome, or a combination thereof.

In certain embodiments, a training corpus 1302, familiar to those of skill in the art, may be used by a model trainer 1304, likewise familiar to skilled practitioners of the art, to train the opaque model 1332. In certain embodiments, the training corpus 1302 may include one or more datasets pertinent to the training of the opaque model 1332. In certain embodiments, the model trainer 1304 may be implemented to perform a classifying operation. In certain embodiments, performing the classifying operation results in certain data elements included in the training corpus 1302 being trained for use by the opaque model 1332. In certain embodiments, an opaque model 1332 developer may select, or provide, a particular training corpus 1302 and a particular model trainer 1304 to train the opaque model 1332. In these embodiments, the selection of which training corpus 1302 and model trainer 1304 are used to train the opaque model 1332 is a matter of design choice.

In certain embodiments, a data point obtainer 1310 may be implemented to obtain one or more input data points 1308 associated with a particular user 1306, a group of users 1306, or other entity. As used herein, an input data point 1308 broadly refers to any discrete unit of information that may be used by an opaque model 1332 to produce a decision 1334. In certain embodiments, the data point obtainer 1310 may likewise be implemented to provide one or more obtained input data points 1308 to the opaque model 1332 for processing. In certain embodiments, one or more decisions 1334 may be generated by the opaque model 1332 according to the one or more input data points 1308.

As described in greater detail herein, certain aspects of the invention reflect an appreciation that the adoption of ML models, including various implementations of an opaque model 1332, is currently increasing at an unprecedented pace. Certain aspects of the invention likewise reflect an appreciation that such adoption has led to a variety of considerations related to potential ethical, moral, and social consequences of the decisions 1334 made by such models. For example, one such consideration may be related to being able to determine whether the opaque model 1332 been partial to, or biased against, a particular user 1306, group of users 1306, or other entity.

Another consideration may be related to being able to determine how easily an opaque model 1332 might be deceived, broken, or otherwise compromised. Yet another consideration may be related to how a user 1306 of such models, or their developer, might be able to understand how a particular opaque model 1332 makes its decisions 1334. Yet still another consideration may be related to what a particular user 1306, group of users 1306, or other entity, might be able to do to change an unfavorable outcome resulting from a decision 1334 made by an opaque model 1332.

To provide an example of how such considerations may be applicable to supporting MS assurance for a particular decision 1334 generated by an opaque model 1332, a user 1306 may have provided certain input data points 1308 in the course of applying for a loan. In this example, the input data points 1308 provided to the opaque model 1332 may have resulted in a decision 1334 to decline the user's 1306 loan application. However, the decision making process of the opaque model 1332 is not visible to the user 1306. As a result, the user 1306 may have no way of understanding why their loan application was declined without the provision of corresponding AIS explainability.

In certain embodiments, the counterfactual engine 1336 may be implemented to perform a counterfactual generation operation. In certain embodiments, the counterfactual generation operation may be performed to generate one or more counterfactuals. As used herein, a counterfactual broadly refers to another data point that is close to a particular input data point 1308 whose use would result in an ML model, such as the opaque model 1332, producing a different outcome corresponding to the input data point 1308. In certain embodiments, the generation of one or more such counterfactuals by the counterfactual engine 1336 may contribute to the provision of AIS explainability with recourse to one or more decisions 1334, assessing the AIS robustness of the opaque model 1332, the extent of any bias it may embody, or a combination thereof.

In certain embodiments, the counterfactual engine 1336 may be implemented to generate one or more counterfactuals, which can then be used by the AIS explainability generation 1346 engine to perform an AIS explainability with recourse operation. As used herein, AIS explainability with recourse broadly refers to the provision of AIS explainability to a user 1306, in combination with one or more counterfactuals that the user 1306 may employ as a recourse to changing a particular decision 1334 made by the opaque model 1332. In certain embodiments, the explainability with recourse operation may be performed by the AIS explainability generation 1346 engine as one aspect of an AIS assurance operation.

In certain embodiments, the explainability with recourse operation may be performed to provide an AIS assurance explanation to a user 1306. As used herein, an AIS assurance explanation broadly refers to an explanation of how a particular decision 1334 was made by the opaque model 1332, the factors contributing to the decision 1334, and their respective effect on the decision 1334, such that a user 1306 can be assured of the validity of the decision 1334. In certain embodiments, the AIS assurance explanation provided to the user 1306 may include one or more counterfactuals that may change a particular decision 1334 made by the opaque model 1332. In certain embodiments, a counterfactual may be provided to the user 1306 in the form of a recourse. In certain embodiments, the AIS assurance explanation may be implemented to contain one or more assertions related to one or more counterfactuals that may change a particular decision 1334 made by the opaque model 1332. In certain embodiments, the AIS assurance explanation may be provided to the user 1306 in the form of a cognitive insight 1352.

In certain embodiments the AIS assurance explanation provided to the user 1306 may include two or more AIS assurance explanations so they can choose which changes might be made to achieve a desired outcome. For example, as previously described in greater detail herein, the opaque model 1332 may have processed certain input data points 1308 submitted by a user 1306 in the course of applying for a loan. As likewise described in greater detail herein, the loan application submitted may have been processed by the opaque model 1332, resulting in the application being declined.

To further extend the previous example, the AIS assurance explanation may be, "Had your income been $5,000.00 greater per year, or if your credit score had been 30 points higher, your loan would have been approved." Accordingly, such counterfactuals may be implemented in various embodiments to not only provide a way of explaining decisions 1334 made by an opaque model 1332 to a user 1306, but also recourses that may be used to identify actionable ways of changing certain behaviors or other factors to obtain favorable outcomes. In certain embodiments, such counterfactuals may be implemented to audit the impartiality and robustness of an opaque model 1332.

In certain embodiments, the counterfactual engine 1336 may be implemented to use a genetic algorithm to generate one or more counterfactuals. As used herein, a genetic algorithm broadly refers to a mathematical approach to solving both constrained and unconstrained optimization problems, based upon natural selection, the process that drives biological evolution. In typical implementations, a genetic algorithm repeatedly modifies a population of individual solutions. At each step, the genetic algorithm selects individuals at random from the current population to be parents and uses them to produce the children for the next generation. Over successive generations, the population evolves toward an optimal solution. In certain embodiments, a customized genetic algorithm may be implemented to iteratively improve the set of generated data points such that they become closer to a particular input data point 1308 while simultaneously ensuring the opaque model 1332 gives decisions 1334 for the generated data points that differ from a decision 1334 corresponding to the input data point 1308.

Skilled practitioners of the art will be aware that genetic algorithms can be applied to solve a variety of optimization problems that are not well suited for standard optimization algorithms, including problems in which the objective function is discontinuous, non-differentiable, stochastic, or highly nonlinear. Likewise, genetic algorithms can be implemented to address problems of mixed integer programming, where some components are restricted to be integer-valued. As typically implemented, a genetic algorithm uses three types of rules at each step of selection to create the next generation from the current population. First, selection rules are used to select certain individuals, referred to as parents, that contribute to the population at the next generation. Second, crossover rules combine two parents to form children for the next generation, and third, mutation rules apply random changes to individual parents to form children.

Certain embodiments of the invention reflect an appreciation that the use of a genetic algorithm to allows the generation of counterfactuals for both linear and nonlinear models (e.g. deep networks), and for any form of input data, from mixed tabular data to image data, without any approximations to, or assumptions for, the opaque model 1332. In certain embodiments, a user 1306 may both define a range for any particular feature and restrict which features can change. As used herein, a feature broadly refers to an individual measurable property or characteristic of a phenomenon being observed. In certain embodiments, the counterfactual engine 1336 may be implemented to constrain the values of sampled points based upon those choices, allowing the generated counterfactuals to reflect a user's 1306 understanding of how much it is possible to change their associated features.

Certain embodiments of the invention reflect an appreciation that careful selection of informative, discriminating, and independent features may contribute to the efficacy of algorithms used in pattern recognition, classification, and regression. Certain embodiments of the invention likewise reflect an appreciation that while features are often numeric, structural features such as strings and graphs are often used in syntactic pattern recognition. Likewise, certain embodiments of the invention reflect an appreciation that the concept of such features is related to the concept of an explanatory variable used in statistical techniques such as linear regression. In certain embodiments, the input data point 1308 may be implemented to include multiple features.

In certain embodiments, the data point obtainer 1310 may be implemented to provide a particular input data point 1308 x to the opaque model 1332, where it is used by the counterfactual engine 1336 f to generate a feasible counterfactual c, as follows:

$$\min_c d(x, c) \quad (1)$$
$$\text{s.t.} \quad f(c) \neq f(x)$$

where d(x, c) is the distance between x and c.

In certain embodiments, the counterfactual engine 1336 may be implemented to avoid using approximations to, or assumptions for, the opaque model 1332 by using a customized genetic algorithm to solve the prior equation. In these embodiments, the customized genetic algorithm may be implemented to work for any black box model, such as the opaque model 1332, and input data types, such as input data point 1308 x. Accordingly, in certain embodiments, the customized genetic algorithm may be implemented to be model-agnostic. Likewise, a certain degree of flexibility in the generation of counterfactuals may be provided in various embodiments of the invention through the use of the customized genetic algorithm.

In certain embodiments, the counterfactual engine may be implemented to solve the optimization problem posed by equation (1) through the process of natural selection, as described in greater detail herein. In certain embodiments, the only mandatory inputs for the customized genetic algorithm are the counterfactual engine 1336 f and a particular input data point 1308 x. In general, for an n-dimensional input vector x, let $W \in \mathbb{C}^n$ represent the space from which individuals can be generated and P be the set of points with the same prediction as x, as follows:

$$P = \{p | f(p) = f(x), p \in W\} \quad (2)$$

where the possible set of individuals $c \in I$ are defined such that:

$$I = W \backslash P \quad (3)$$

with each individual $c \in I$ being a candidate counterfactual.

Certain embodiments of the invention reflect an appreciation that the goal of this approach is to find the fittest possible c* to x constrained on $c^* \in I$. Accordingly, the fitness for an individual c is defined as:

$$\text{fitness} = \frac{1}{d(x, c)} \quad (4)$$

Here $c^*$ will then be the point closest to x such that $c^* \in I$. For a multi-class case, if a user wants the counterfactual c to belong to a particular class j, we define Q as:

$$Q=\{q|f(q)=j, q \in W\} \quad (5)$$

Accordingly, equation (3) then becomes:

$$I=(W\backslash P) \cap Q \quad (6)$$

In certain embodiments, the customized genetic algorithm is carried out as follows: first, a set $I_c$ is built by randomly generating points such that they belong to I. Individuals $c \in I_c$ are then evolved through three rules processes: selection, mutation, and crossovers, as described in greater detail herein. Accordingly, the selection rules process chooses individuals that have the best fitness scores resulting from equation (4). A proportion of these individuals, dependent upon $p_m$, the probability of mutation, are then subjected to mutation, which involves arbitrarily changing some feature values. A proportion of individuals, dependent on $p_c$, the probability of crossover, are then subjected to crossover, which involves randomly interchanging some feature values between individuals. The resulting population is then restricted to the individuals that meet the required constraint from equation (3) or equation (6), and the fitness scores of the new individuals are calculated. This process is repeated until the maximum number of generations is reached. Finally, the individual(s) $c^*$ with the best fitness scores are chosen as the desired counterfactuals.

In certain embodiments, the choice of distance function used in equation (1) may depend upon details provided by the opaque model 1332 creator and the type of data being considered. For example, if the data is tabular, the $L_1$ norm normalized by the median absolute deviation (MAD) is better than using the $L_1$ or $L_2$ norm for counterfactual generation. Accordingly, in certain embodiments the $L_1$ norm for continuous features (NormAbs) and a simple matching distance for categorical features (SimpMat) are chosen as a default for tabular data, In certain embodiments, using MAD for normalization in model development is not possible when training data, such as a training corpus 1302, is unavailable. However, when access to training data is available, normalization is possible, with the distance metric determined as follows:

$$d(x,c) = \frac{n_{con}}{n} NormAbs(x,c) + \frac{n_{cat}}{n} SimpMat(x,c) \quad (7)$$

where $n_{con}$ and $n_{cat}$ are the number of continuous and categorical features, respectively, and n is the total number of features ($n_{con}+n_{cat}=n$).

Certain embodiments of the invention reflect an appreciation that for image data, the Euclidean distance and absolute distance between two images are not good measures of image similarity. Accordingly, Structural Similarity Index Measure (SSIM) may be used in certain embodiments for image data, as it generally provides a better measure of what humans consider to be similar images. As typically implemented, SSIM values lie between 0 and 1, where a higher SSIM value means that two images look more similar to each other. Accordingly, for input data point 1308 image x and counterfactual image c, the distance can be determined as follows:

$$d(x,c) = \frac{1}{SSIM_{(x,c)}} \quad (8)$$

In certain embodiments, the outcomes produced by the customized genetic algorithm used by the opaque model 1332 may be improved through the use of additional inputs beyond a particular input data point 1308.

In certain embodiments, auxiliary constraints may be incorporated to ensure feasible solutions by restricting the space defined by the set W which represents the space from which individuals can be generated. As an example, for an n-dimensional input, let W be the Cartesian product of the sets $W_1, W_2 \ldots W_n$. As another example, for continuous features, $W_i$ can be constrained as $W_i \in [W_{imin}, W_{imax}]$, and categorical features can be constrained as $W_i \in \{W_1, W_2 \ldots W_j\}$. However, in various embodiments certain variables might be immutable (e.g., a person's race). In these embodiments, a feature i for an input x can be muted by setting $W_i = x_i$.

As an example, a user 1306 whose loan application was declined may be provided an AIS assurance explanation, described in greater detail herein, that the loan was not approved due to insufficient income. In this example, a counterfactual may have been generated by the counterfactual engine 1336, with a suggested recourse stating the loan may have been granted if the user's 1306 income was increased from $10,000 a year to $900,000. To continue the example, such an increase may not be feasible for the user 1306, and as a result, employing the counterfactual is not a practical option for the user 1306. Accordingly, an appropriate constraint might be applied, such as $W_i \in [\$10,000, \$15,000]$ to constrain the increase in income to an amount that may be achievable. Likewise, the number of counterfactuals k can also be set. To continue the example further, the counterfactual engine 1332 may be configured to choose the top k individuals (with k=1 as default), where different features have changed, such that the user 1306 can be provided multiple and diverse explanations.

In certain embodiments, the AIS robustness assessment 1344 engine may be configured to receive the one or more counterfactuals from the counterfactual engine 1336. In certain embodiments, the AIS robustness assessment 1344 engine may be implemented to determine distances between an input data point 1308 and a plurality of proximate counterfactuals, as described in greater detail herein. As used herein, as it relates to the distance separating an input data point 1308 and a particular counterfactual, proximate broadly refers to those counterfactuals that are nearest to the input data point 1308 (i.e., have the shortest relative distance vectors), as described in greater detail herein. In certain embodiments, the AIS robustness assessment 1344 engine may be configured to use such distances to determine the robustness of a target opaque model 1332 based upon a statistical operation performed on the determined distances of the plurality of proximate counterfactuals. For example, a statistic may be a mean of the distances.

Certain embodiments of the invention reflect an appreciation that the maximum distance used to determine whether a particular counterfactual is proximate to the input data point may be subjective. Certain embodiments of the invention likewise reflect an appreciation that the maximum distance selected to determine whether a particular counterfactual is proximate to the input data point may be used to determine which, and how many, counterfactuals are proximate. Accordingly, the maximum distance used in these embodiments to determine whether a particular counterfactual is proximate to the input data point, and the method by which it is selected, is a matter of design choice.

Certain embodiments of the invention reflect an appreciation that given two black-box models, such as the opaque model 1332, one network would be more difficult to deceive if the counterfactuals across classes, on average, are farther away from the input instances, such as an input data point 1308, compared to the other network. In certain embodiments, the counterfactual engine 1336 may be implemented to provide a measure of distance d(x,c), which can be used in to generate a Counterfactual Explanation-based Robustness Score (CERScore), for a particular opaque model 1332.

As used herein, CERScore is defined herein as the expected distance between the input instances (e.g., input data point 1304) and their corresponding counterfactuals, such that:

$$CERScore(model) = \mathbb{E}_x [d(x, c^*)] \qquad (9)$$

where a higher CERScore implies that the associated opaque model 1332 is more robust.

In certain embodiments, the counterfactual engine 1336 may be implemented to provide the CERScore solely through the use of the opaque cognitive model's 1332 predictions, or decisions 1334, without a priori knowledge of its internal structure or operation.

In certain embodiments, the AIS robustness assessment 1344 engine may be implemented to perform an AIS robustness assessment operation. In certain embodiments, performance of the robustness assessment operation may include the generation of a CERScore for a particular opaque model 1332. In certain embodiments, the AIS robustness assessment operation may be performed to provide an AIS assurance explanation to a user 1306. In certain embodiments, the AIS assurance explanation provided to a user 1306 may be implemented to include a CERScore for a particular opaque model 1332. In certain embodiments, the AIS assurance explanation may be provided to the user 1306 in the form of a cognitive insight 1352.

In certain embodiments, the cognitive insight 1352 provided to a user may be in the form of an electronic message, on-screen display, printed page, or the like. In certain embodiments, the output module 1350 may be implemented to provide the cognitive insight 1352 to a particular user 1306. In certain embodiments, the AIS assurance explanation may be presented to the developer of the model, such that the developer can modify the model, such as the opaque model 1332, the training corpus 1302, the model trainer 1304, or a combination thereof. Those of skill in the art will recognize that the described presentation of the AIS assurance explanation as an cognitive insight 1352 provides the developer of the opaque model 1332 a basis for modifying the model, the training corpus 1302, the model trainer 1304, or a combination thereof, to achieve more robust results.

In certain embodiments, the AIS impartiality assessment 1342 engine may be configured to receive the one or more counterfactuals from the counterfactual engine 1336. In certain embodiments, the AIS impartiality assessment 1342 engine may be implemented to contrast features between a subject data point (e.g., input data point 1304) and the received counterfactuals and identify significant contrasts between them. As used herein, significant contrast broadly refers to a noteworthy difference in the respective value of a particular feature shared by a subject data point and an associated counterfactual. In various embodiments, the significance of the contrast between the one or more counterfactuals and the subject data point may be determined according to whether a particular threshold is exceeded, or certain features are outside a particular range, or a combination thereof.

Certain embodiments of the invention reflect an appreciation that the determination of what constitutes a significant contrast may be subjective. As an example, a subject data point and an associated counterfactual may share the common feature of "color." To continue the example, the value of the "color" feature for the subject data point may be "violet," while the corresponding value of the "color" feature for the counterfactual may be "lilac." In this example, the respective values of "violet" and "lilac" for the shared "color" feature may be considered to be of significant contrast.

In a variation of the preceding example, the value of the "color" feature for the subject data point may be "lavender," while its corresponding value for the counterfactual may be "lilac." In this variation of the example, the respective values of "lavender" and "lilac" for the "color" feature of the subject data point and counterfactual may or may not be considered to be of significant contrast. Accordingly, in certain embodiments, the method by which the respective value of a particular feature shared by a subject data point and an associated counterfactual are considered to be of significant contrast is a matter of design choice.

In certain embodiments, the AIS impartiality assessment 1342 engine may be configured to obtain bias ranges of features; compare the identified significant contrasts to obtained bias ranges, and determine which of the identified significant contrasts fall outside the obtained bias ranges. In certain embodiments, the significance of the contrast may be based upon the ranking of greatest absolute or relative differences. In certain embodiments, the AIS impartiality assessment 1342 engine may be implemented to present identified significant contrasts as an explanation of the classification of the subject data point.

In certain embodiments, the AIS impartiality assessment 1342 engine may be implemented to perform an AIS impartiality assessment operation. In certain embodiments, performance of the AIS impartiality assessment operation may include assessing the impartiality of a particular ML model, such as the opaque model 1332. In certain embodiments, the AIS impartiality assessment of a particular opaque model 1332 may be provided for decisions 1334 it produces for an individual user 1306, a group of users 1306, or other entity.

In certain embodiments, performance of the AIS impartiality assessment operation may include the identification of significant contrasts associated with a particular opaque model 1332. In certain embodiments, the AIS impartiality assessment 1342 engine may be implemented to use a particular CERScore in combination with a corresponding fitness measure resulting from the use of equation (4) to perform the AIS impartiality assessment operation. In certain embodiments, the impartiality assessment operation may be performed to provide an AIS assurance explanation to a user 1306. In certain embodiments, the AIS assurance explanation may be provided to the user 1306 in the form of a cognitive insight 1352.

In certain embodiments, the cognitive insight 1352 provided to a user may be in the form of an electronic message, on-screen display, printed page, or the like. In certain embodiments, the output module 1350 may be implemented to provide the cognitive insight 1352 to a particular user 1306. In certain embodiments, the AIS assurance explanation may be presented to the developer of the model, such that the developer can modify the model, such as the opaque model 1332, the training corpus 1302, the model trainer 1304, or a combination thereof. Those of skill in the art will recognize that the described presentation of the AIS assurance explanation as an cognitive insight 1352 provides the developer of the opaque model 1332 a basis for modifying the model, the training corpus 1302, the model trainer 1304, or a combination thereof, to achieve more robust results.

Certain embodiments of the invention reflect an appreciation that, for a particular individual instance, the customized genetic algorithm may be implemented to generate different counterfactuals with different values of a protected feature (e.g., race, age). Certain embodiments of the invention likewise reflect an appreciation that a user 1306 can achieve a desired outcome, such as decisions 1334, more easily than when those features could not be changed. Accordingly, certain embodiments of the invention reflect an appreciation that the ability of a user 1306 to better understand how to achieve a desired outcome lessens the possibility of the user 1306 claiming the opaque model 1332 was biased against them.

In certain embodiments, the counterfactual engine 1336 may be configured to determine whether a valid counterfactual can be generated, or a particular user 1306 can achieve a better score, or a combination thereof, by changing one or more protected features. In certain embodiments, the AIS impartiality 1342 assessment engine may be configured to compare scores for different groups of users 1306 according to their association with a protected group (e.g., male, female, etc.) to determine whether it is more difficult for individuals in one group to change a particular decision 1334 than individuals in another group. In certain embodiments, the counterfactual engine 1336 may be implemented for use by a developer of an opaque model 1332 to audit the AIS impartiality of the opaque model 1332 for various groups of observations. In certain embodiments, the counterfactual engine 1336 may be implemented in combination with the AIS impartiality assessment 1342 engine to perform the audit.

In these embodiments, a fitness measure that is markedly different for counterfactuals generated for different partitions of a feature's domain value may indicate the opaque model 1332 is biased towards one of the partitions. For example, if the gender feature is partitioned into two values, male and female, and the average fitness values of generated counterfactuals are lower for females than for males, this could be used as evidence that the opaque model 1332 may be biased against females.

In certain embodiments, counterfactuals and the distance function may be used in combination to calculate the overall burden for a group, as follows:

$$\text{Burden}(g) = \underset{g}{E}[d(x, c^*)] \qquad (10)$$

where g is a partition defined by the distinct values for a specified feature set.

Accordingly, Burden is related to CERScore, as it is the expected value over a group. Certain embodiments of the invention reflect an appreciation that certain known impartiality auditing models focus on single features. However, Burden, as implemented in various embodiments, does not have that limitation and can be applied to any combination of features In certain embodiments, Burden may be implemented to evaluate the impartiality of a particular opaque model 1332 for a particular group of individuals. As an example, individuals in the training corpus 1302 used to train the opaque model 1332 may have an associated feature of "race." In this example, the opaque model 1332 may generate an unfavorable decision 1334 for a certain group of the individuals who happen to be a particular race, which can be referenced as a Burden value (i.e., a Burden score) for the group. To continue the example, the Burden value for the group may be higher than the Burden value for groups of other races that likewise receive an unfavorable decision 1334.

Accordingly, a higher Burden value may be used in certain embodiments as measure of bias inherent in the opaque model 1332 used to generate the unfavorable decision 1334. Accordingly, the opaque model 1332 imposes a greater burden on the group with a higher Burden value. In certain embodiments, a higher Burden value may indicate that an associated user 1306 may have to make more changes to have the opaque model 1332 make a more favorable decision 1332 than a user who has a lower Burden value. Those of skill in the art will recognize that there are many ways in which the Burden value described herein may be used to determine the presence of bias within a particular opaque model 1332. Accordingly, the foregoing is not intended to limit the spirit, scope, or intent of the invention.

In certain embodiments, the AIS impartiality assessment 1342 engine may be implemented to present identified significant contrasts that fall outside the obtained bias ranges of features as a cognitive insight 1352. In certain embodiments, the cognitive insight 1352 may be in the form of an electronic message, an on-screen display, a printed page, or the like. In certain embodiments, the output module 1350 may be implemented to provide the cognitive insight 1352 to a particular user 1306. In certain embodiments, the identified significant contrasts may be presented as a cognitive insight 1352 to the developer of the model, such that the developer can modify the opaque model 1332, the training corpus 1302, the model trainer 1304, or a combination thereof, to achieve less biased results. Skilled practitioners of the art will recognize that the described presentation of identified significant contrasts as a cognitive insight 1352 provides the developer of the opaque model 1332 a basis for modifying their model, the training corpus 1302, the model trainer 1304, or a combination thereof.

FIG. 14 shows a subject patient chart provided as an input data point used to generate counterfactuals implemented in accordance with an embodiment of the invention. In certain embodiments, a counterfactual engine, described in greater detail herein, may be implemented to use a genetic algorithm, likewise described in greater detail herein, to generate a counterfactual. As likewise described in greater detail herein, the resulting counterfactual may be used in certain embodiments to provide explainability for decisions generated by a machine learning (ML) model. In certain embodiments, a decision provided by a machine learning model may be in the form of prediction.

In certain embodiments, the ML model may be implemented as an opaque ML model, described in greater detail herein. In certain embodiments, the opaque ML model may be implemented as an opaque cognitive model, likewise described in greater detail herein. In certain embodiments, counterfactuals may be implemented to a user to understand which features have the most bearing on a particular ML model's decision behavior.

As an example, a patient profile 1402, which can serve as an input data point, is shown in FIG. 14. In this example, the patient profile 1402 may include a patient identifier (ID) 1404, a predicted diabetic diagnosis 1406, various patient attributes 1408, and associated results generated by an ML model. To continue the example, certain patient attributes 1408 may include non-modifiable 1428 and modifiable 1430 diabetes factors. Examples of non-modifiable 1428 diabetes factors may include the patient's age 1415, the number of pregnancies they may have had 1414, and the thickness of their skin 1416. Likewise, examples of modifiable 1430 diabetes factors may include the patient's glucose level 1418, their blood pressure 1420, their insulin level 1422, and body mass index (BMI) 1424.

In various embodiments, an ML model, such as an opaque cognitive model, may be implemented to process the patient attributes 1408, and their associated results generated by the ML model, to arrive at the predicted diabetic diagnosis 1406. For example, as shown in the patient profile 1402, the predicted diabetic diagnosis 1406 for the patient is positive. In certain embodiments, the patient attributes 1408 may be processed by a counterfactual engine, as described in greater detail herein, to generate a different set of results 1434, which may contain one or more counterfactuals, which in turn may result in the predicted diabetic diagnosis 1436 for the patient being negative.

For example, as shown in the counterfactual patient profile 1432, lowering the subject patient's 1404 glucose level 1418 may be the most optimal 1440 counterfactual, while lowering their BMI 1424 may be a less optimal 1438 counterfactual. In this example, the most optimal 1440 and less optimal 1442 counterfactuals represent the least amount of changes to the subject patient's profile 1402 that will lead to a more preferred outcome of the predicted diabetic diagnosis 1436 being negative. Accordingly, lowering the subject patient's 1404 glucose level 1418 may be interpreted as the modifiable diabetes factor 1430 most important to change.

In certain embodiments, a counterfactual engine may be implemented to keep certain features constant, such as the non-modifiable 1430 diabetes factors, while investigating features that have the ability to change, such as the modifiable 1432 diabetes factors shown in FIG. 14. Accordingly, certain embodiments of the invention reflect an appreciation that while the modification of various features, such as the modifiable 1432 diabetes factors, may result in a useful counterfactual, while other features, such as the non-modifiable 1430 diabetes factors, may likewise result in useful counterfactuals, albeit not as preferred. Furthermore, certain embodiments of the invention reflect an appreciation that a symbiotic relationship may exist between certain features, whether modifiable or not, which could affect the efficacy of a particular counterfactual.

Figure 15A:
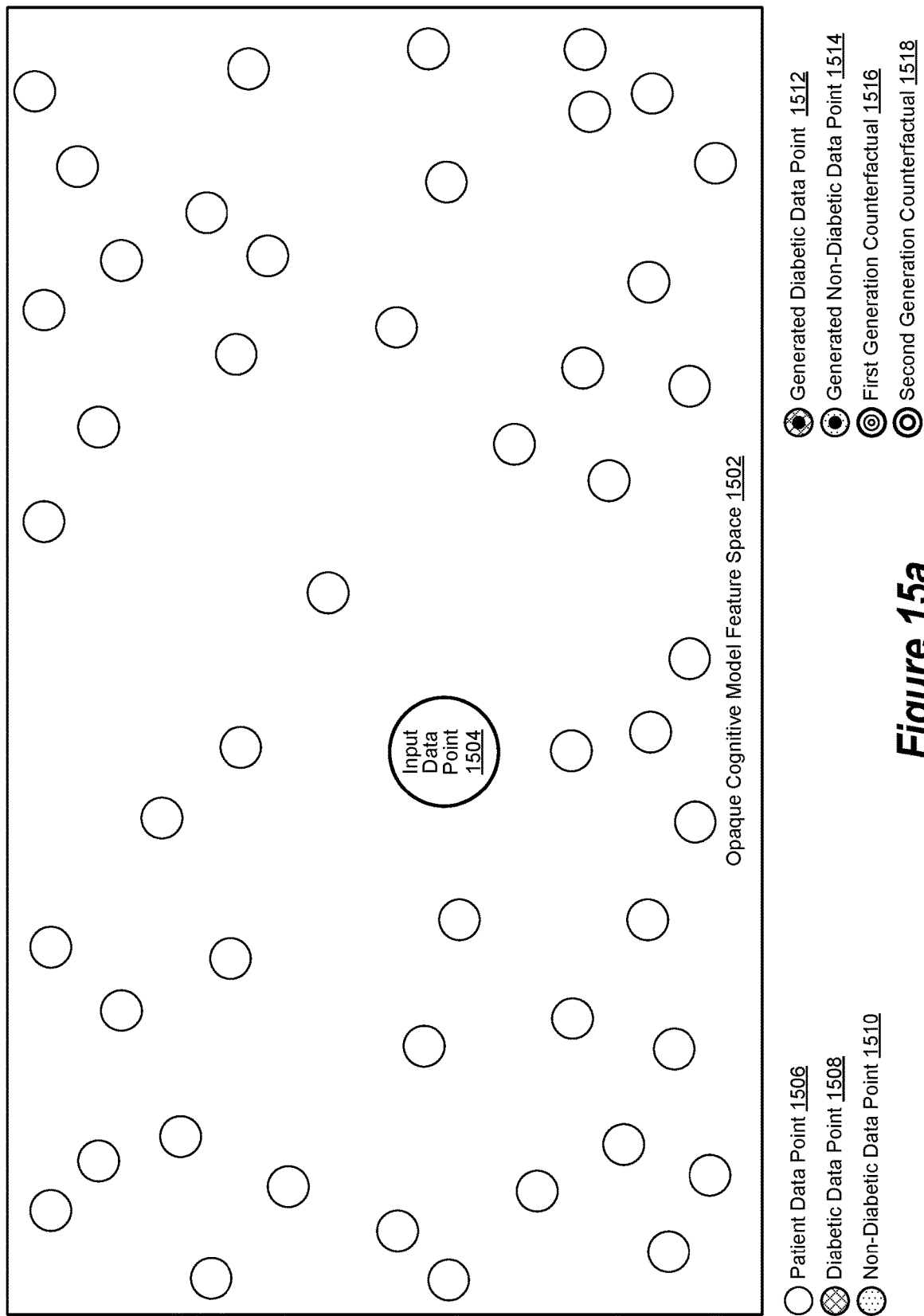
FIGS. 15a through 15f show a simplified depiction of the generation of counterfactuals.

FIGS. 15a through 15f show a simplified depiction of the generation of counterfactuals implemented in accordance with an embodiment of the invention. As shown in FIG. 15a, an input data point 1504 and a plurality of associated patient data points 1506 are respectively mapped to an opaque cognitive model feature space 1502 according to the values of their associated features. As used herein, a feature space broadly refers to an n-dimensional collection of features used to describe data used by a machine learning (ML) model to generate a decision, as described in greater detail herein. Accordingly, as likewise used herein, an opaque cognitive model feature space 1502 broadly refers to a feature space used by an opaque cognitive model to generate a decision, as likewise described in greater detail herein.

In this depiction, the data input point 1504 represents a subject patient whose associated features have been used by an opaque cognitive model to generate a predicted diagnosis of being diabetic. Examples of such features may include the subject patient's age, gender, body mass index (BMI), glucose level, and other factors commonly used to predict diabetes in a patient. As likewise shown in FIG. 15a, associated patient 1506 data points represent individual patients whose associated features can likewise be used by the opaque cognitive model to generate a corresponding predicted diagnosis of whether or not they have diabetes.

Figure 15B:
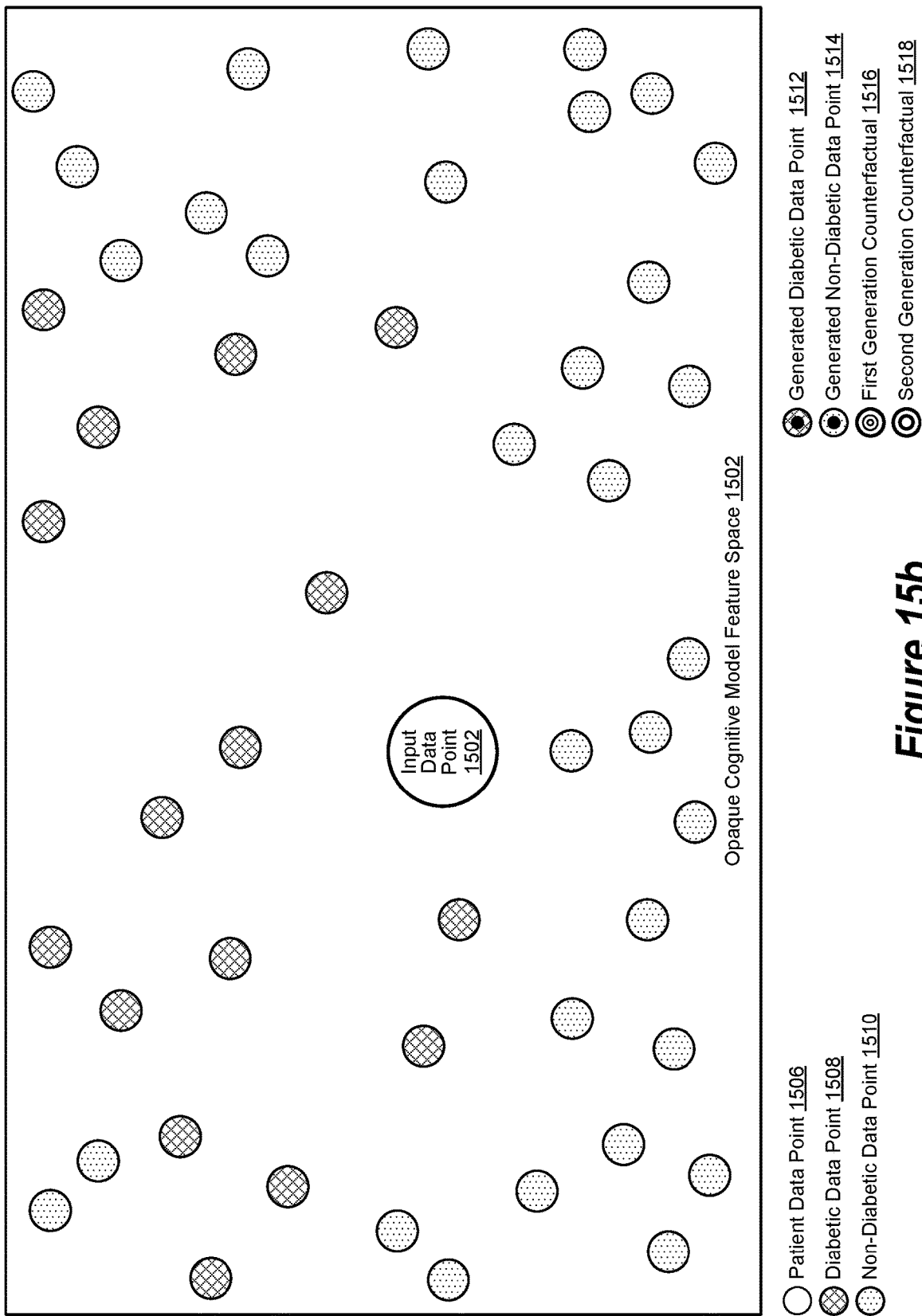

Referring now to FIG. 15b, the predicted diagnosis of individual patients may be achieved by the performance of a decision generation operation by an opaque cognitive model that classifies each associated patient data point 1506 shown in FIG. 15a as either a diabetic 1508 or non-diabetic 1510 data point. Certain embodiments of the invention reflect an appreciation that classification models make predictions based upon some calculated boundary that separates different possible decisions, such as classifications, within in its associated feature space. Certain embodiments of the invention likewise reflect an appreciation that decision boundaries within a feature space, such as the opaque cognitive model feature space 1502, are typically unknown in advance and are often difficult to discover. In certain embodiments, a counterfactual engine, described in greater detail herein, may be implemented to facilitate the determination of decision boundaries within a feature space by generating and classifying new data points that are proximate to existing classified data points. In certain embodiments, the newly generated and classified points may be used in combination with existing classified data points to provide more granular definition of a decision boundary.

Figure 15C:
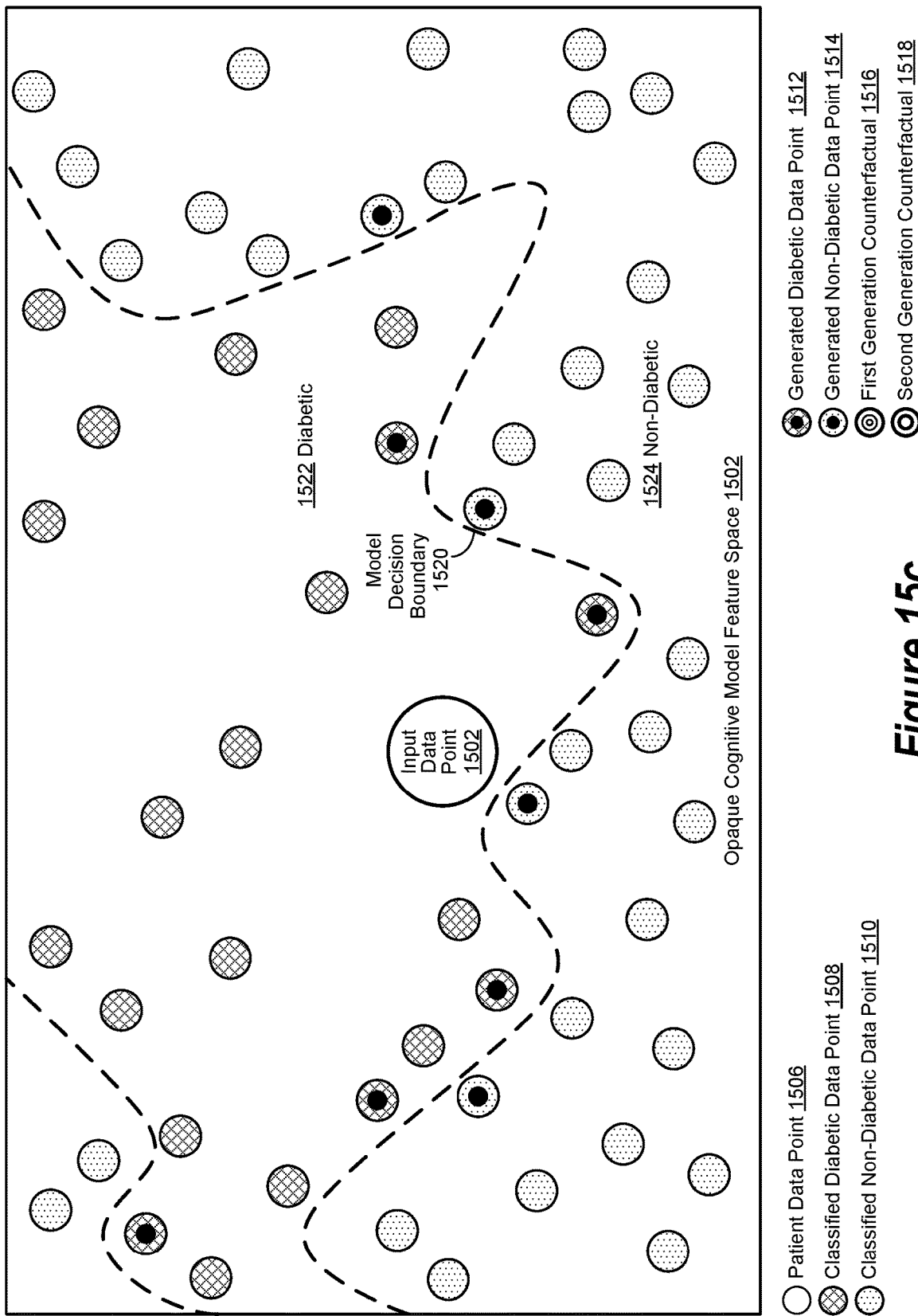
Figure 15D:
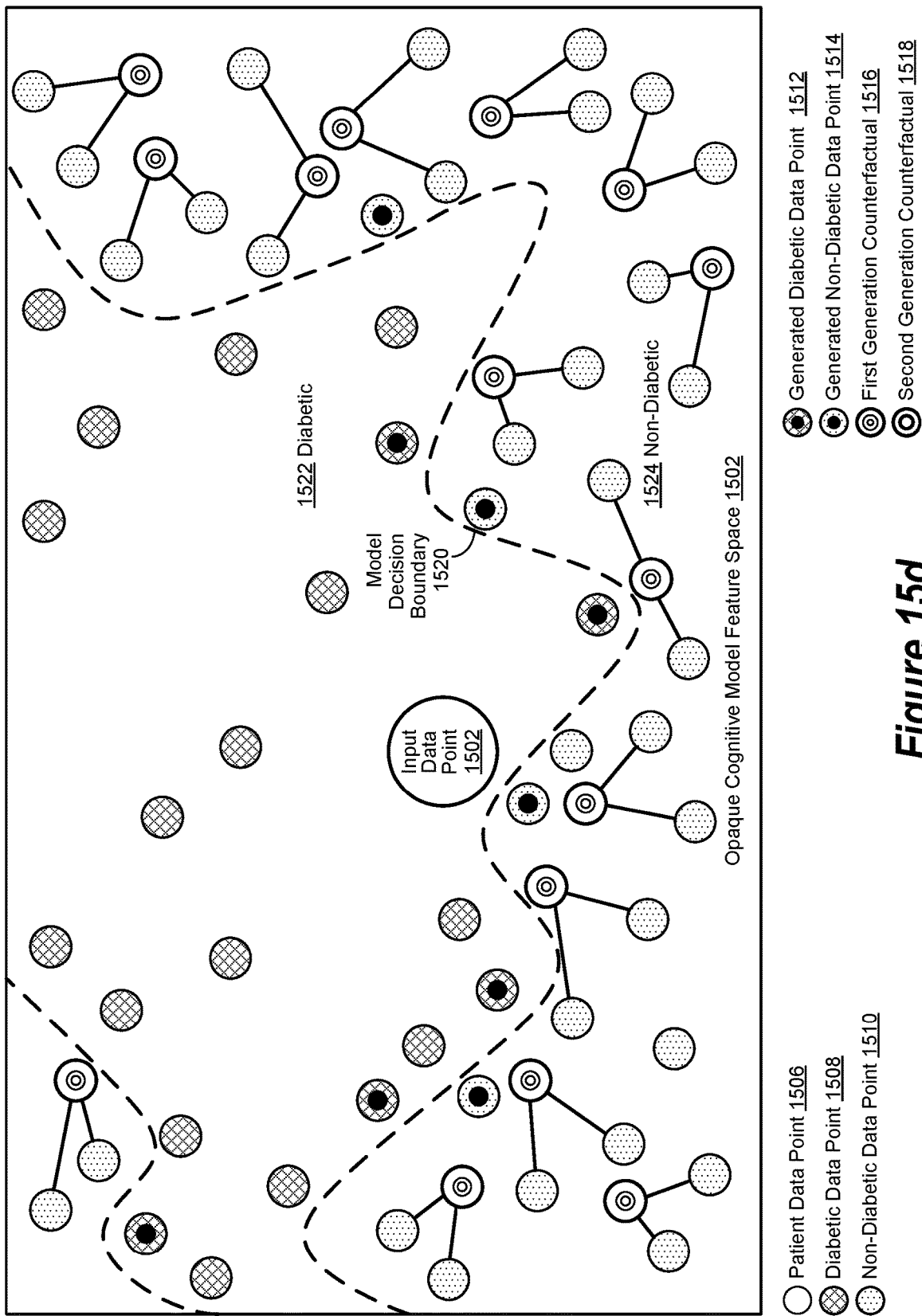

For example, as shown in FIG. 15c, a counterfactual engine may use an opaque cognitive model to generate new diabetic 1512 and non-diabetic 1514 data points, which a that are respectively plotted to be proximate to previously classified diabetic 1508 and non-diabetic 1510 data points. In turn, the plotted data points 1512, 1514 can then be used in combination with the previously classified data points 1508, 1510 by the counterfactual engine to plot a model decision boundary 1520. As likewise shown in FIG. 15c, the resulting model decision boundary 1520 separates two outcomes, which are whether a patient has a predicted diagnosis of being diabetic 1522 or non-diabetic 1524. Certain embodiments of the invention reflect an appreciation that while the resulting model decision boundary 1520 may be shown as a two-dimensional representation in FIG. 15c for visualization purposes, the model decision boundary 1520 actually exists in a high-dimensional mathematical space.

In certain embodiments, a counterfactual engine may be implemented to use a genetic algorithm, as described in greater detail herein, to iteratively generate counterfactuals. In certain embodiments, the genetic algorithm may use existing classified data points, such as the existing classified non-diabetic 1510 data points shown in FIGS. 15c and 15d to generate a first generation of counterfactuals, such as the first generation 1516 counterfactuals likewise shown in FIG. 15d.

Figure 15E:
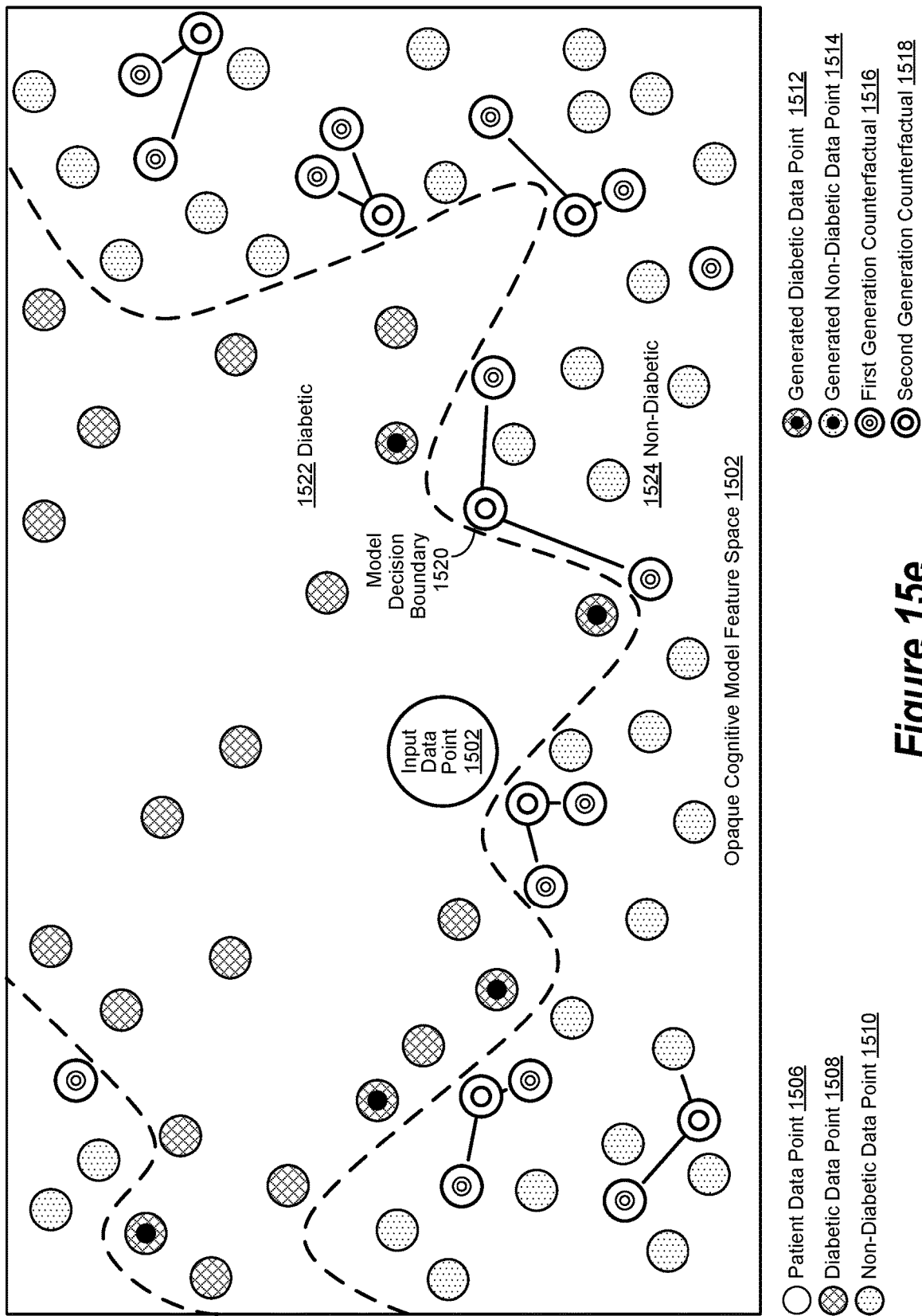

In certain embodiments, the resulting first generation 1516 counterfactuals may in turn be used, as depicted in FIG. 15e, by the genetic algorithm to generate second generation 1518 counterfactuals. In certain embodiments, additional generations of counterfactuals may be iteratively generated by the counterfactual engine over time as needed or desired. In these embodiments, the number of counterfactual generations, and the interval of time over which they may be generated, is a matter of design choice. In certain embodiments, the genetic algorithm may be implemented to generate each generation of counterfactuals through mutations and crossovers, as described in greater detail herein, ultimately producing new, diverse data points.

In certain embodiments, the counterfactual engine may be implemented to search for the minimum feasible changes that can be made such that an opaque cognitive model predicts a different and more preferred outcome. In certain embodiments, such minimum feasible changes are associated with counterfactuals that are proximate to the model decision boundary 1520, as shown in FIG. 15e. In certain embodiments, the most optimal counterfactuals may be selected according to their respective distance vector d from the input data point 1502. As used herein, an optimal counterfactual broadly refers to a counterfactual separated from the input data point 1502 by a distance vector d that does not exceed a particular distance value. In these embodiments, the determination of the number of optimal counterfactuals, and the maximum distance value of the distance vector d used to define them, is a matter of design choice.

Figure 15F:
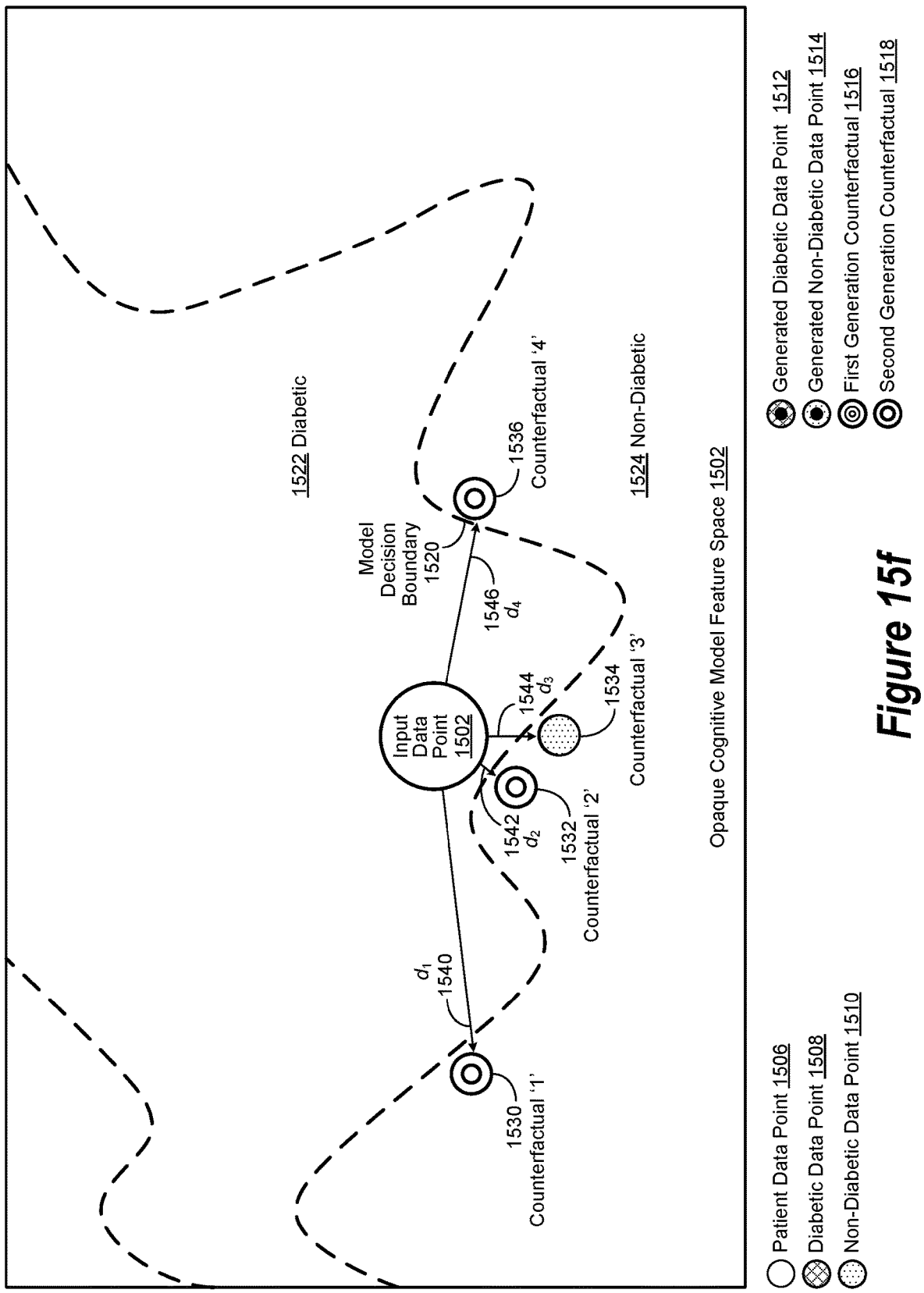

For example, as shown in FIG. 15f, counterfactuals '1' 1530, '2' 1532, '3' 1534, and '4' 1536 have been determined by a counterfactual engine to be closest to the model decision boundary 1520 of the opaque cognitive model feature space 150. Furthermore, their associated distance vectors $d_1$ 1540, $d_2$ 1542, $d_3$ 1544, and $d_4$ 1546 do not exceed a particular distance value. Accordingly, counterfactuals '1' 1530, '2' 1532, '3' 1534, and '4' 1536 are considered optimal. Furthermore, counterfactual '2' 1352, has the shortest distance vector $d_2$ separating it from the input data point 1502, is considered to be the most optimal. Certain embodiments of the invention reflect an appreciation that while counterfactual '2' 1352 may be considered to be the most optimal, counterfactuals '1' 1530, '3' 1534, and '4' 1536 may likewise provide meaningful paths to a preferable outcome.

Figure 16A:
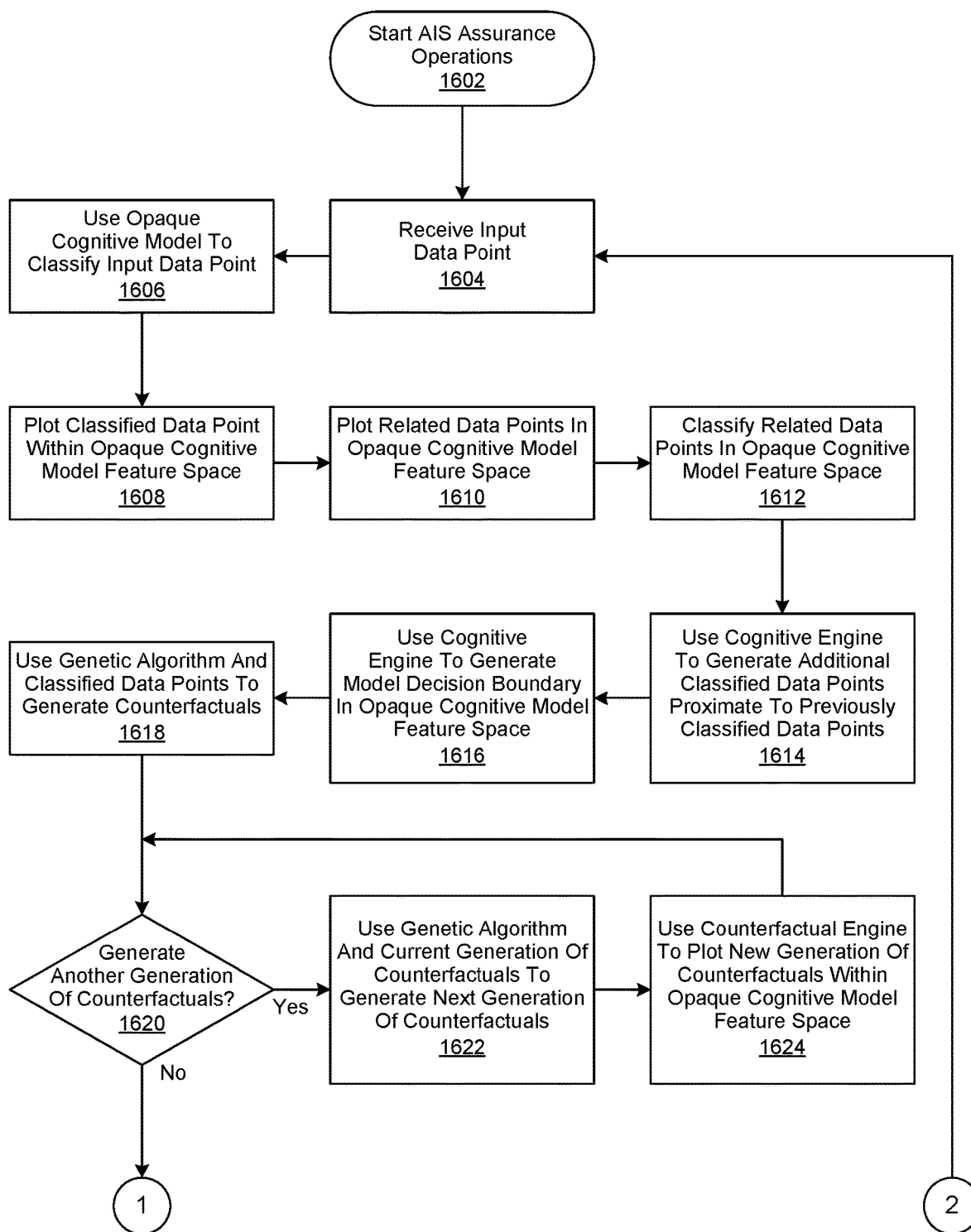
FIGS. 16a and 16b show a generalized flowchart showing the performance of AIS assurance operations.
Figure 16B:
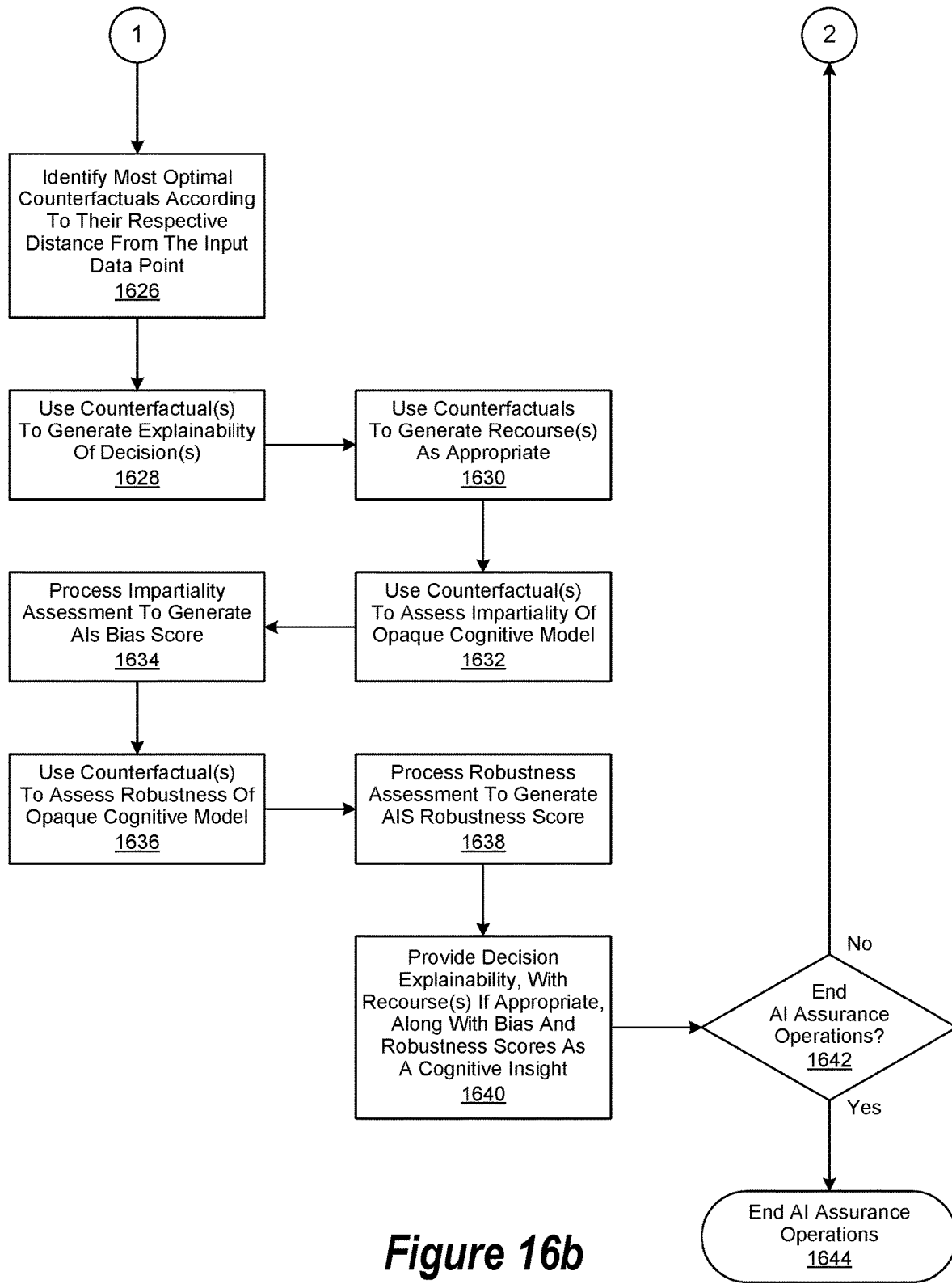

FIG. 16 is a generalized flowchart showing the performance of AIS governance and control operations implemented in accordance with an embodiment of the invention. In this embodiment, AIS assurance operations are begun instep 1602, followed by the receipt of an input data point, described in greater detail herein, in step 1604. An opaque cognitive model is then used in step 1606 to perform a classification operation to classify the input data point. The resulting classified input data point is then plotted in step 1608 within an opaque cognitive model feature space associated with the opaque cognitive model used to perform the classification operation.

The opaque cognitive model is then used in step 1610 to plot data points that are associated with the input data point within the opaque cognitive model feature space, as described in greater detail herein. Thereafter, the opaque cognitive model is likewise used to classify the plotted data points in step 1612. Once all data points have been classified and plotted, a counterfactual engine is used in step 1614, as likewise described in greater detail herein, to generate and classify additional data points that are proximate to the previously classified data points.

As likewise described in greater detail herein, the counterfactual engine is then used in step 1616 to generate a model decision boundary in the opaque cognitive model feature space. Thereafter, the counterfactual engine uses a genetic algorithm, as described in greater detail herein, to generate counterfactuals in step 1618, followed by a determination being made in step 1620 whether to generate an additional generation of counterfactuals. If so, then the previously-generated counterfactuals are used by the genetic algorithm in step 1622 to generate a new generation of counterfactuals, which are in turn plotted within the opaque cognitive model feature space in step 1624. The process is then continued, proceeding with step 1620.

However, if it was determined in step 1620 to not generate an additional generation of counterfactuals, then the most optimal counterfactuals are identified, as described in greater detail herein, by their respective distance from the input data point within the opaque cognitive model feature space. As likewise described in greater detail herein, the optimal counterfactuals are then used in step 1628 to generate explainability of their associated decisions, as well as in step 1630 to generate recourses as appropriate. In turn, the counterfactuals are used in step 1632 to assess the impartiality of the opaque cognitive model, followed by using the impartiality assessment in step 1634 to generate an AIS score, as likewise described in greater detail herein. Likewise, as described in greater detail herein, the counterfactuals are then used in step 1636 to assess the robustness of the opaque cognitive model, followed by using the robustness assessment in step 1638 to generate an AIS robustness score.

The resulting decision explainability, with explainability recourse(s), if appropriate, along with AIS bias and robustness scores, are then provided as a cognitive insight in step 1640. A determination is then made in step 1642 whether to continue AIS assurance operations. If so, then they are continued, proceeding with step 1604. Otherwise, AIS assurance operations are ended in step 1644.

Although the present invention has been described in detail, it should be understood that various changes, substitutions and alterations can be made hereto without departing from the spirit and scope of the invention as defined by the appended claims.

What is claimed is:

1. A computer-implementable method for cognitive information processing, comprising:
   receiving data from a plurality of data sources;
   processing the data from the plurality of data sources to provide cognitively processed insights via an augmented intelligence system, the augmented intelligence system executing on a hardware processor of an information processing system, the augmented intelligence system and the information processing system providing a cognitive computing function;
   performing an impartiality assessment operation via an impartiality assessment engine, the impartiality assessment operation detecting a presence of bias in an outcome of the cognitive computing function, the impartiality assessment operation generating a burden score representing the presence of bias in the outcome; and,
   providing the cognitively processed insights to a destination, the destination comprising a cognitive application, the cognitive application enabling a user to interact with the cognitive insights.

2. The method of claim 1, wherein:
   the impartiality assessment engine is implemented within the augmented intelligence system, the augmented intelligence system comprising a cognitive process foundation.

3. The method of claim 2, wherein:
   the cognitive process foundation performs an augmented intelligence assurance operation using the burden score.

4. The method of claim 1, wherein:
   the impartiality assessment operation includes assessing an effect of the presence of bias on the outcome of the cognitive computing function.

5. The method of claim 4, wherein:
   the impartiality assessment engine receives a counterfactual; and,
   the impartiality assessment operation contrasts features between an input subject data point and the counterfactual and identifies contrasts between the input data point and the counterfactual.

6. The method of claim 1, wherein:
the cognitive computing function is performed using an opaque model; and,
the burden score represents a bias of the opaque model for a particular group of individuals.

7. A system comprising:
a hardware processor;
a data bus coupled to the hardware processor; and
a non-transitory, computer-readable storage medium embodying computer program code, the non-transitory, computer-readable storage medium being coupled to the data bus, the computer program code interacting with a plurality of computer operations and comprising instructions executable by the hardware processor and configured for:
receiving data from a plurality of data sources;
processing the data from the plurality of data sources to provide cognitively processed insights via an augmented intelligence system, the augmented intelligence system executing on a hardware processor of an information processing system, the augmented intelligence system and the information processing system providing a cognitive computing function;
performing an impartiality assessment operation via an impartiality assessment engine, the impartiality assessment operation detecting a presence of bias in an outcome of the cognitive computing function, the impartiality assessment operation generating a burden score representing the presence of bias in the outcome; and,
providing the cognitively processed insights to a destination, the destination comprising a cognitive application, the cognitive application enabling a user to interact with the cognitive insights.

8. The system of claim 7, wherein:
the impartiality assessment engine is implemented within the augmented intelligence system, the augmented intelligence system comprising a cognitive process foundation.

9. The system of claim 8, wherein:
the impartiality assessment engine is implemented within the augmented intelligence system, the augmented intelligence system comprising a cognitive process foundation.

10. The system of claim 7, wherein:
the impartiality assessment operation includes assessing an effect of the presence of bias on the outcome of the cognitive computing function.

11. The system of claim 10, wherein:
the impartiality assessment engine receives a counterfactual; and,
the impartiality assessment operation contrasts features between an input subject data point and the counterfactual and identifies contrasts between the input data point and the counterfactual.

12. The system of claim 7, wherein:
the cognitive computing function is performed using an opaque model; and,
the burden score represents a bias of the opaque model for a particular group of individuals.

13. A non-transitory, computer-readable storage medium embodying computer program code, the computer program code comprising computer executable instructions configured for:
receiving data from a plurality of data sources;
processing the data from the plurality of data sources to provide cognitively processed insights via an augmented intelligence system, the augmented intelligence system executing on a hardware processor of an information processing system, the augmented intelligence system and the information processing system providing a cognitive computing function;
performing an impartiality assessment operation via an impartiality assessment engine, the impartiality assessment operation detecting a presence of bias in an outcome of the cognitive computing function, the impartiality assessment operation generating a burden score representing the presence of bias in the outcome; and,
providing the cognitively processed insights to a destination, the destination comprising a cognitive application, the cognitive application enabling a user to interact with the cognitive insights.

14. The non-transitory, computer-readable storage medium of claim 13, wherein:
the impartiality assessment engine is implemented within the augmented intelligence system, the augmented intelligence system comprising a cognitive process foundation.

15. The non-transitory, computer-readable storage medium of claim 14, wherein:
the cognitive process foundation performs an augmented intelligence assurance operation using the burden score.

16. The non-transitory, computer-readable storage medium of claim 13, wherein:
the impartiality assessment operation includes assessing an effect of the presence of bias on the outcome of the cognitive computing function.

17. The non-transitory, computer-readable storage medium of claim 16, wherein:
the impartiality assessment engine receives a counterfactual; and,
the impartiality assessment operation contrasts features between an input subject data point and the counterfactual and identifies contrasts between the input data point and the counterfactual.

18. The non-transitory, computer-readable storage medium of claim 13, wherein:
the cognitive computing function is performed using an opaque model; and,
the burden score represents a bias of the opaque model for a particular group of individuals.

* * * * *